United States Patent
Takahashi et al.

[11] Patent Number: 6,029,068
[45] Date of Patent: Feb. 22, 2000

[54] DATABASE SYSTEM, DATA MANAGEMENT SYSTEM AND COMMUNICATION TERMINAL

[75] Inventors: Oh Takahashi; Shouichi Nagatomo, both of Tokyo, Japan

[73] Assignee: Casio Computer Co., Ltd., Tokyo, Japan

[21] Appl. No.: 08/921,653

[22] Filed: Aug. 26, 1997

[30] Foreign Application Priority Data

Aug. 30, 1996 [JP] Japan ................................. 8-230962
Aug. 26, 1997 [JP] Japan ................................. 9-229595

[51] Int. Cl.[7] .................................................. H04Q 7/24
[52] U.S. Cl. .................... 455/426; 455/517; 455/433; 707/104
[58] Field of Search .......................... 707/1, 10, 3, 103, 707/104, 200, 203; 455/433, 422, 517, 403, 412, 413, 426; 340/825.44

[56] References Cited

U.S. PATENT DOCUMENTS

| | | | |
|---|---|---|---|
| 5,475,838 | 12/1995 | Fehskens et al. | 395/185.1 |
| 5,689,701 | 11/1997 | Ault et al. | 395/610 |
| 5,737,599 | 4/1998 | Rowe et al. | 395/615 |
| 5,742,668 | 4/1998 | Pepe et al. | 379/58 |
| 5,742,808 | 4/1998 | Hasuo | 395/601 |
| 5,742,905 | 4/1998 | Pepe et al. | 455/461 |
| 5,787,442 | 7/1998 | Hacherl et al. | 707/201 |
| 5,826,253 | 10/1998 | Bredenberg | 707/2 |
| 5,845,282 | 12/1998 | Alley et al. | 707/10 |
| 5,857,201 | 1/1999 | Wright, Jr. et al. | 707/104 |

*Primary Examiner*—Paul V. Kulik
*Attorney, Agent, or Firm*—Frishauf, Holtz, Goodman, Langer & Chick, P.C.

[57] ABSTRACT

In addition to a central paging controller, a database system includes a service center, connected to a public switched telephone network, for supplying voice information. A pager/pagers, which are to be paged from the central paging controller, have a data transmission function. The service center stores ID information containing code data, in association with the voice information. The stored ID information is transmitted to the pager(s) through the central paging controller and a transmitting base station. Using the transmission function, the pager(s) transmits the received ID information to the service center through the public switched telephone network. Thus, the voice information stored in the service center can be output through the public switched telephone network.

26 Claims, 50 Drawing Sheets

| CODE DATA | VOICE INFOMATION DATABASE MEMORY ADDRESS | RECORDING TIME |
|---|---|---|
| ] ] 0 1 | TB1 AD1 | 11 : 05 |
| ] ] 0 2 | TB1 AD2 | 11 : 10 |
| FREE WORD MESSAGE DATA | TB1 AD3 | 11 : 30 |
| ......... | ......... | ......... |

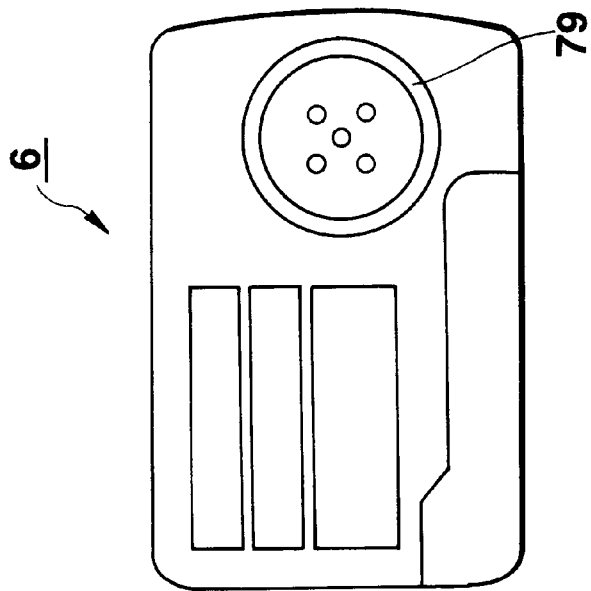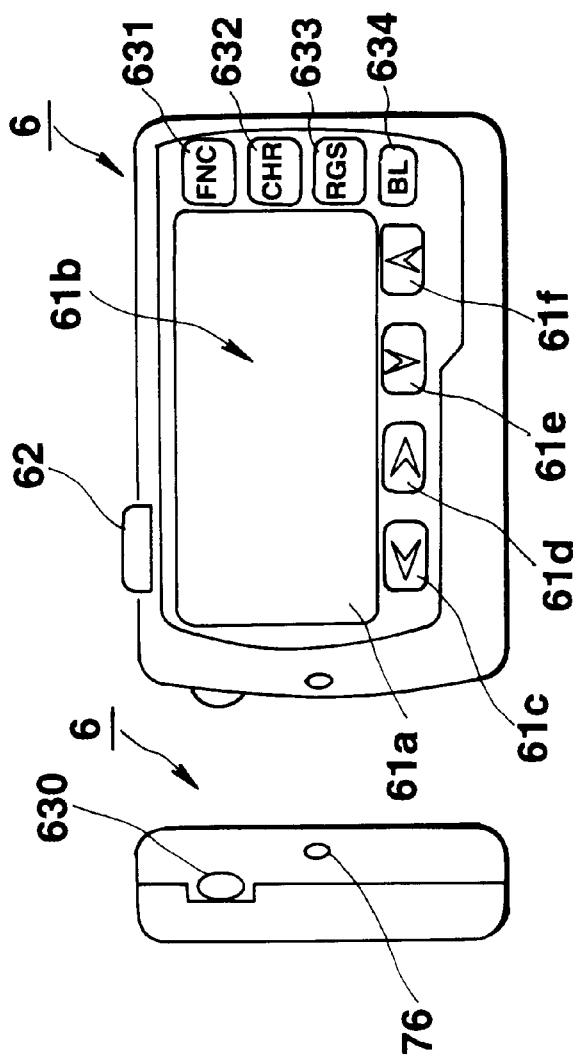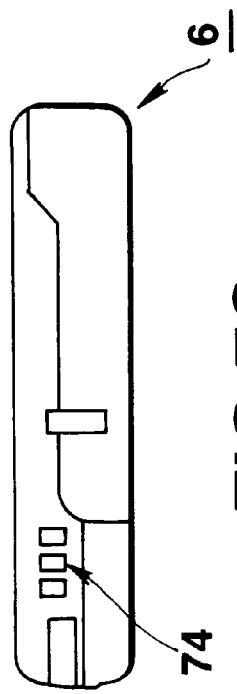

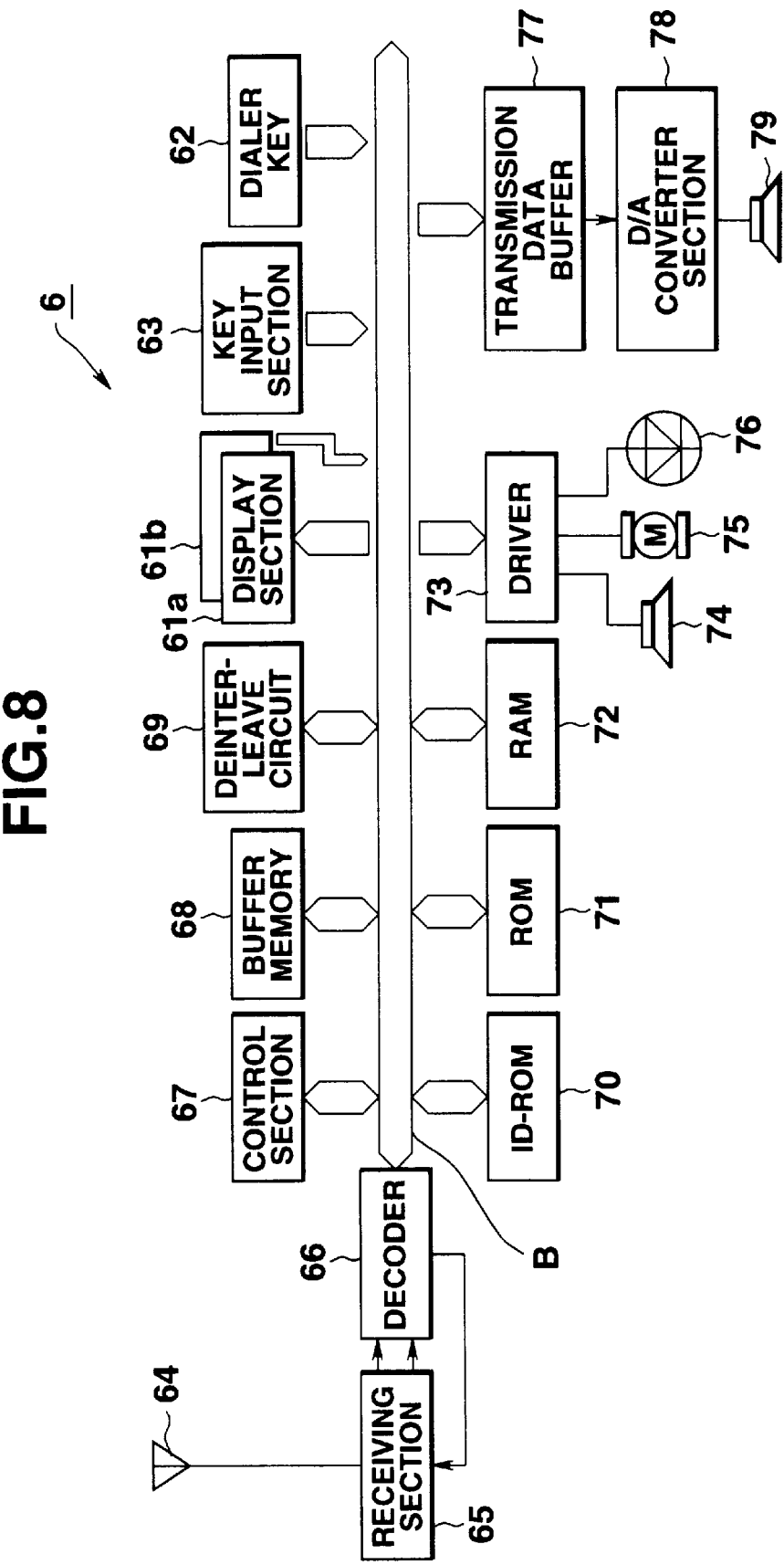

| | |
|---|---|
| DISPLAY CONTROL PROGRAM MEMORY | DM1 |
| DISPLAY CONTROL PROGRAM MEMORY | DM2 |
| FREE WORD CHARACTER MATRIX MEMORY | FM |
| PROGRAM MEMORY | PM |

71

DM1

| ADDRESS DATA | DISPLAY CONTROL CONTENTS | TEL NO. |
|---|---|---|
| #A (FIRST ADDRESS DATA) | LIGHT UP SEGMENT 「A」 | |
| #B (SECOND ADDRESS DATA) | LIGHT UP SEGMENT 「B」 | |
| #C (VOICE INFORMATION SERVICE ADDRESS DATA) | DISPLAY "ARTIST TICKET INFO" ON DISPLAY SECTION 61a | 0 0 0 0<br>- 0 0 0<br>- 0 0 0 |

FIG.11

| CODE DATA | DISPLAY CONTROL CONTENTS |
|---|---|
| ] ] 0 1 | [ SELL YOU ] + RECORDING TIME |
| ] ] 0 2 | [ SELL ME ] + RECORDING TIME |
| FREE WORD MESSAGE DATA | [ FREE WORD MESSAGE CONTENTS ] + RECORDING TIME |

|   |      | 0    | 1    | 2    | 3    | 4    | 5    | 6    | 7    | 8    | 9    | DIAL DATA |
|---|------|------|------|------|------|------|------|------|------|------|------|-----------|
|   |      | 0000 | 0001 | 0010 | 0011 | 0100 | 0101 | 0110 | 0111 | 1000 | 1001 | BIT PATTERN |
| 0 | 0000 | 0    | 1    | 2    | 3    | 4    | 5    | 6    | 7    | 8    | 9    |           |
| 1 | 0001 | A    | B    | C    | D    | E    | F    | G    | H    | I    | J    |           |
| 2 | 0010 | K    | L    | M    | N    | O    | P    | Q    | R    | S    | T    |           |
| 3 | 0011 | U    | V    | W    | X    | Y    | Z    | SP   | DEL  | (    | )    |           |
| 4 | 0100 | a    | b    | c    | d    | e    | f    | g    | h    | i    | j    |           |
| 5 | 0101 | k    | l    | m    | n    | o    | p    | q    | r    | s    | t    |           |
| 6 | 0110 | u    | v    | w    | x    | y    | z    | [    | ]    | {    | }    |           |
| 7 | 0111 | !    | "    | #    | $    | %    | &    | '    | *    | +    | ,    |           |
| 8 | 1000 | —    | .    | /    | ;    | :    | <    | =    | >    | ?    | @    |           |
| 9 | 1001 | \    | ^    | _    | \|   | `    | ~    | RESERVED | RESERVED | RESERVED | RESERVED |           |

COLUMN → FM

ROW ↓

CHARACTER TO BE DISPLAYED →

FIG.14

| SUBADDRESS DATA (8bit=1byte) | SERVICE CONTENTS TO BE DISPLAYED | ACCESS NO. |
|---|---|---|
| #S | RODGER | 0000 |
| #U | CATHARINE | 0002 |
| ..... | ..... | ..... |

| DATA CONTENTS | | | | | MM |
|---|---|---|---|---|---|
| RECEIVED ADDRESS DATA | SUBADDRESS DATA | RECEIVED MESSAGE DATA | RECORDING TIME | RECEIVING TIME | |
| # A | | ...... | | 11 : 15 | |
| ............ | ............ | ............ | ............ | ............ | |

| RECEIVED ADDRESS DATA | DATA CONTENTS | | | RECORDING TIME | RECEIVING TIME |
|---|---|---|---|---|---|
| | SUBADDRESS DATA | RECEIVED DATA | | | |
| # A | | | | | 11 : 15 |
| # C | # S | ] ] 0 1 | | 11 : 05 | 12 : 00 |
| # C | # S | ] ] 0 2 | | 11 : 10 | 12 : 00 |
| # C | # S | USEFUL INFO (FREE WORD MASSAGE DATA) | | 11 : 30 | 12 : 00 |
| # C | # U | ] ] 0 2 | | 11 : 25 | 12 : 00 |
| ......... | ......... | ......... | | ......... | ......... |

FIG.25

| CODE DATA | DISPLAY CONTROL CONTENTS | RECEPTION CONTROL FLAG |
|---|---|---|
| ] ] 0 1 | [ SELL YOU ] + RECORDING TIME | 1 |
| ] ] 0 2 | [ SELL ME ] + RECORDING TIME | 0 |
| FREE WORD MESSAGE DATA | [ FREE WORD MESSAGE CONTENTS ] + RECORDING TIME | 0 |

| CODE DATA | MANAGEMENT TABLE (TBR) NO. | DATA FILE ATTRIBUTE |
|---|---|---|
| 1101 | TBR 1 | SOUND |
| 1102 | TBR 2 | DOCUMENT |
| 1103 | TBR 3 | GRAPH |
| 1104 | TBR 4 | IMAGE |
| ......... | ......... | ......... |

TMR

FIG.31

| ACCESS NO. (2) | MESSAGE DATA (CONTENTS OF MESSAGE) | ATTACHED FILE STORAGE ADDRESS | FILENAME | SIZE (KB) | RECORDING TIME |
|---|---|---|---|---|---|
| 0 0 0 0 (8A~8F, 10) | ...... | ...... | ...... | ...... | ...... |
| 0 0 0 1 (8C~8E) | SAMPLING DATA WILL BE SENT | TBR1AD1 | SAM. WAV | 70 | 11:05 |
| 0 0 0 2 (8C) | ...... | ...... | ...... | ...... | ...... |
| ...... | ...... | ...... | ...... | ...... | ...... |

TBR1

FIG.32

| ACCESS NO. (2) | MESSAGE DATA (CONTENTS OF MESSAGE) | ATTACHED FILE STORAGE ADDRESS | FILENAME | SIZE (KB) | RECORDING TIME |
|---|---|---|---|---|---|
| 0000 (8A~8F, 10) | ⋮ | ⋮ | ⋮ | ⋮ | ⋮ |
| | | | | | |
| 0001 (8C~8E) | CONTENTS OF JUL. 1 E-MAIL | TBR2AD1 | MAIL. TXT | 10 | 11:10 |
| | ----- | ----- | ----- | ----- | ----- |
| 0002 (8C) | ----- | ----- | ----- | ----- | ----- |
| ---- | ----- | ----- | ---- | ---- | ---- |

TBR2

FIG.33

| ACCESS NO. (2) | MESSAGE DATA (CONTENTS OF MESSAGE) | ATTACHED FILE STORAGE ADDRESS | FILENAME | SIZE (KB) | RECORDING TIME |
|---|---|---|---|---|---|
| 0000 (8A~8F, 10) | ------ | ------ | ------ | ------ | ------ |
| | CUSTOMER MANAGEMENT TABLE | TBR3AD2 | CUST. TBL | 10 | 11:30 |
| 0001 (8C~8E) | ------ | ------ | ------ | ------ | ------ |
| 0002 (8C) | SALES EVALUATION | TBR3AD1 | QUO. XLS | 20 | 11:25 |
| ---- | ---- | ---- | ---- | ---- | ---- |

TBR3

| | |
|---|---|
| DISPLAY CONTROL PROGRAM MEMORY | DM11 |
| DISPLAY CONTROL PROGRAM MEMORY | DM12 |
| CHARACTER GENERATOR | CG |
| PROGRAM MEMORY | PM |

91

DM11

| ADDRESS DATA | DISPLAY CONTROL CONTENTS | ACCESS NO. (1) |
|---|---|---|
| #A (FIRST ADDRESS DATA) | LIGHT UP SEGMENT 「A」 | |
| #B (SECOND ADDRESS DATA) | LIGHT UP SEGMENT 「B」 | |
| #C (THIRD ADDRESS DATA) | DISPLAY "INTRA-OFFICE" ON DISPLAY SECTION 87a | 0 0 0 0<br>- 0 0 0<br>- 0 0 0 |

FIG.37
| CODE DATA | DISPLAY CONTROL CONTENTS |
|---|---|
| 1101 | ICON "  " + FILENAME + SIZE (KB) + RECORDING TIME |
| 1102 | ICON "  " + FILENAME + SIZE (KB) + RECORDING TIME |
| 1103 | ICON "  " + FILENAME + SIZE (KB) + RECORDING TIME |
| 1104 | ICON "  " + FILENAME + SIZE (KB) + RECORDING TIME |
| 1105 | ICON "  " + FILENAME + SIZE (KB) + RECORDING TIME |
| 1106 | ICON "  " + FILENAME + SIZE (KB) + EXPANDED FILE SIZE (KB) + RECORDING TIME |
DM12

FIG.39

SMR

| SUBADDRESS DATA | CONTENTS TO BE DISPLAYED | ACCESS NO. (2) |
|---|---|---|
| #S | TO ALL STAFF MEMBERS | 0 0 0 0 |
| #T | TO SALES DEP. 1 | 0 0 0 1 |
| #U | TO PERSONAL (USER OF TERMINAL 8E) | 0 0 0 2 |

FIG.40

| RECEIVED ADDRESS DATA | SUBADDRESS DATA | F | CODE DATA | FILE NAME | SIZE | RECORDING TIME | RECEIVING TIME | MESSAGE DATA (CONTENTS OF MESSAGE) |
|---|---|---|---|---|---|---|---|---|
| # A | | | | | | | 11 : 15 | I WILL NOT BE BACK TODAY |
| ……… | ……… | ……… | ……… | ……… | ……… | ……… | ……… | ……… |

MMR

Download Confirmation Flag → F

FIG.43

| RECEIVED ADDRESS DATA | SUBADDRESS DATA | F | CODE DATA | FILE NAME | SIZE | RECORDING TIME | RECEIVING TIME | MESSAGE DATA (CONTENTS OF MESSAGE) |
|---|---|---|---|---|---|---|---|---|
| # A | | | | | | | 11 : 15 | I WILL NOT BE BACK TODAY |
| # C | # T | 0 | ]]01 | SAM. WAV | 70 | 11 : 05 | 12 : 00 | SAMPLING DATA WILL BE SENT |
| # C | # T | 0 | ]]02 | MAIL. TXT | 10 | 11 : 10 | 12 : 00 | CONTENTS OF JUL. 1 E-MAIL |
| # C | # T | 0 | ]]03 | CUST. TBL | 10 | 11 : 30 | 12 : 00 | CUSTOMER MANAGEMENT TABLE |
| # C | # U | 0 | ]]03 | QUO. XLS | 20 | 11 : 25 | 12 : 00 | SALES EVALUATION |
| ...... | ...... | | ...... | | | ...... | ...... | |

MMR

DOWNLOAD CONFIRMATION FLAG

| | INTRA-OFFICE MESSAGE |
|---|---|
| ☐ SALES DEP. 1 | SAMPLING DATA WILL BE SENT. |
| ☐ SALES DEP. 1 | CONTENTS OF JUL. 1 E- MAIL |
| ☐ SALES DEP. 1 | CUSTOMER MANAGEMENT TABLE |
| ☐ PERSONAL | SALES EVALUATION |

MESSAGE

INTRA-OFFICE
TO SALES DEP.1    JUL. 5 (SAT) 12:00    1/4

MESSAGE

SAMPLING DATA WILL BE SENT.

🔊 SAM. WAV   70KB   RECORDING TIME   11:05

DO YOU WANT TO DOWNLOAD? Y/N

FIG.57

| CODE DATA | DISPLAY CONTROL CONTENTS | RECEPTION CONTROL FLAG |
|---|---|---|
| 1 1 0 1 | ICON " " + FILENAME + SIZE ( KB ) + RECORDING TIME | 0 |
| 1 1 0 2 | ICON " " + FILENAME + SIZE ( KB ) + RECORDING TIME | 1 |
| 1 1 0 3 | ICON " " + FILENAME + SIZE ( KB ) + RECORDING TIME | 1 |
| 1 1 0 4 | ICON " " + FILENAME + SIZE ( KB ) + RECORDING TIME | 0 |
| 1 1 0 5 | ICON " " + FILENAME + SIZE ( KB ) + RECORDING TIME | 0 |
| 1 1 0 6 | ICON " " + FILENAME + SIZE (KB) + EXPANDED FILE SIZE ( KB ) + RECORDING TIME | 1 |

DM12

DATABASE SYSTEM, DATA MANAGEMENT SYSTEM AND COMMUNICATION TERMINAL

BACKGROUND OF THE INVENTION

1. Field of the Invention

The present invention relates to a database system, a data management system and a communication terminal which are for use in an information providing service system using a communication system such as a radio paging system.

2. Description of the Prior Art

A radio paging system and a home banking system are available as communication systems which transmit/receive character information through conventional telephone lines.

In particular, as regards the radio paging system among those communication systems, the standard "RCR STD-43" has been brought into practice.

The "RCR STD-43" will now be briefly described. FIG. 58 shows the data structure according to the "RCR STD-43". In FIG. 58, reference numeral 101 represents the structure of data transmitted in one hour.

Reference numeral 102 denotes the structure of 1-cycle data (hereinafter referred to as the cycle structure). Reference numeral 103 represents the structure of 1-frame data (hereinafter referred to as the frame structure). The data structure 101 includes 15-cycle data which consists of data items numbered "0" to "14", and those data items are transmitted in one hour. The cycle structure 102 includes 128 frames numbered "0" to "127", and those frames are transmitted in four minutes. The time required to transmit 1 frame is 1.875 sec., and 32 frames are transmitted per minute. The frame structure 103 shows the structure of 1-frame data, which is divided into eight in accordance with the contents of the 1-frame data.

The frame structure 103 is made up of a synchronization 1 (S1) 103A, frame information (FI) 103B, a synchronization 2 (S2) 103C, block information section (BI) 103D, an address field (AF) 103E, a vector field (VF) 103F, a message field (MF) 103G and idle blocks (IB) 103H.

The synchronization 1 (S1) 103A consists of 112 bits which have been subjected to binary FSK modulation and which are transmitted at a speed of 1600 bps. The synchronization 1 (S1) 103A stores information specifying which of the following the data modulation method or transmission speed of data transmitted by the block information section (BI) 103D and the subsequent fields and block is:

Binary FSK Modulation/1600 bps

Binary FSK Modulation/3200 bps

Quadrature FSK Modulation/3200 bps

Quadrature Modulation/6400 bps

The frame information (FI) 103B consists of a 32-bit word subjected to the binary FSK modulation and whose bits are transmitted at a speed of 1600 bps. The frame information (FI) 103B stores frame numbers, cycle numbers, information specifying the number of transmission times. The synchronization 2 (S2) 103C stores timing information for realizing the transmission timing according to the modulation method and transmission speed specified in the synchronization 1 (S1) 103A.

The information stored in the block information (BI) 103D to the idle blocks (IB) 103H is modulated by the modulation method specified in the synchronization 1 (S1) 103A, and is transmitted at the speed specified in the synchronization 1 (S1) 103A. The information stored in the block information (BI) 103D to the idle blocks (IB) 103H consists of eleven blocks each being transferred in 160 ms. The block information (BI) 103D stores information such as the number of words, the word numbers representing the starting points of the address field (AF) 103E and vector field (VF) 103F, etc., as will be described later. The address field (AF) 103E stores address data indicating the pager (or pagers) to be paged. The vector field (VF) 103F stores the number of words, the word number representing the starting point of the message field (MF) 103G, etc., as will be described later. The message field (MF) 103G stores message data according to the data format specified in the vector field (VF) 103F. The idle blocks (BI) 103H is an unused block, in which the pattern "1" or "0" is set.

Using the "RCR STD-43", a central paging controller which performs a paging service can also carry out the information providing service of supplying information messages having various service contents simultaneously to the pagers owned by a larger number of subscribers, in addition to an individual subscriber paging service.

If the subscribers desire to enjoy the "information providing service", their pagers (hereinafter referred to as the pagers of the users) can receive the information messages of various service contents which are supplied from an information providing company.

According to the "RCR STD-43", a large amount of data. can be transmitted at a time to the pagers of the users. However, in the case of the "RCR STD-43", the format prescribed thereby is a short sentence, and the amount of data which can be transmitted is limited.

The contents of the information providing service utilizing the paging system are also various and range from business information to local information connected with the area in which the information providing service is available. Accordingly, the users' needs for the information to be provided are changing from those for information like an exchange rate, which can be expressed using a set format, toward those for information like one concerning concert tickets and the sales/purchase of objects among the individual users.

In order to satisfy the users' needs, the information providing company (service center) is making an attempt to provide information which is difficult to express using the prescribed format. Basically, however, the pagers which accord with the "RCR STD-43" can receive only data having the format prescribed thereby. Since the capacities of their internal memories are limited, the pagers cannot receive a large amount of data of other formats at a time.

Meanwhile, a method is known wherein a cellular phone and a notebook-type personal computer are connected to each other through utilization of a personal communication service (PCS) system, thus allowing data files having various formats, such as an image, an electronic mail, etc., to be exchanged between the cellular phone and the personal computer, and enabling a desired data file to be downloaded from a database of the company in which a user is employed. According to the above method, however, in the case where the user, for example, downloads information stored in the database to the notebook-type personal computer after a line connection has been established between the cellular phone and the database, the user cannot discriminate which is the data file to be downloaded unless he/she searches the database.

SUMMARY OF THE INVENTION

It is accordingly an object of the present invention to provide a database system, a data management system and a communication terminal, which are capable of easily realizing and managing, through the use of a radio communication system such as a paging system, the information message (voice information) service of supplying information such as voice information difficult to express using the prescribed format, and which can be easily utilized by an information providing company who supplies the service and users who enjoy the service.

It is another object of the present invention to provide a database system, a data management system and a communication terminal, wherein a user can confirm what data file has been stored in a database, through utilization of a radio communication system such as a paging system, and wherein the stored data file can be downloaded to the communication terminal after the user has confirmed the content of received data.

According to the first aspect of the present invention, there is provided a database system which comprises a database for storing data items, management means, connected to the database and a communication line network, for managing the database, and at least one communication terminal to be connected to the communication line network;

the management means comprising
means for causing the database to store pieces of ID information identifying the above-mentioned data items, in association with those data items, and
transmission means for transmitting one of the pieces of ID information stored in the database to the at least one communication terminal through a radio communication line; and the communication terminal comprising
reception means for receiving the piece of ID information transmitted from the transmission means, and
control means, which links up with the management means in accordance with the piece of ID information received by the reception means, for controlling the database so as to output, of the data items stored in therein, one data item corresponding to that piece of ID information.

In this database system, one of the pieces of ID information which identify the data items stored in the database is transmitted from the data management system to the communication terminal. The communication terminal transmits the piece of ID information received through the communication line network to the data management system so that one of the data items which corresponds to the received piece of ID information is extracted from the database. Thus, the user of the communication terminal, who utilizes the database system, can easily use the data stored in the database. Moreover, a provider can easily supply the database with the data to be stored therein.

The management means in the above database system may further comprise
detection means for detecting storage times at which the above-mentioned data items have been stored in the database,
means for causing the database to store the storage times detected by the detection means, in association with the pieces of ID information, and
first transmission control means for controlling the transmission means so as to transmit, of the storage times stored in the database, one storage time corresponding to the aforementioned one piece of ID information to the at least one communication terminal, together with that piece of ID information.

In this case, before the user of the communication terminal makes the database output the data item corresponding to the piece of ID information received from the database, he/she can check what time the data item has been stored in the database. When the user considers the data item to be unnecessary, judging from the time at which the data item has been stored, he/she need not extract the data item from the database.

The management system in the database system may further comprise
size detection means for detecting the sizes of the data items stored in the database, and
second transmission control means for controlling the transmission means so as to transmit, of the sizes detected by the size detection means, one size corresponding to the aforementioned one piece of ID information to the at least one communication terminal, together with that piece of ID information.

In this case, before the user of the communication terminal makes the database output the data item corresponding to the piece of ID information received from the database, he/she can check the size of the data item. This avoids data having a relatively large size, compared to the memory capacity of the communication terminal, for example, from being extracted from the database.

The at least one communication terminal in the above database system may further comprise first storage means for storing the data item corresponding to the aforementioned one piece of ID information and output from the database.

The management means in the above database system may further comprise
size detection means for detecting the sizes of the data items stored in the database, and
second transmission control means for controlling the transmission means so as to transmit, of the sizes detected by the size detection means, one size corresponding to the aforementioned one piece of ID information to the at least one communication terminal, together with that piece of ID information; and the at least one communication terminal may further comprise
measurement means for measuring the remaining capacity of the first storage means,
comparison means for comparing the size received together with the aforementioned one piece of ID information by the reception means, and the remaining capacity measured by the measurement means, and
first inhibition means for inhibiting the control means from causing the database to output the data item corresponding to the aforementioned one piece of ID information.

In this case, when the remaining memory capacity of the first storage means is less than the size of the data item corresponding to the received piece of ID information, the first inhibition means inhibits the data item from being output from the database. By virtue of the presence of the first inhibition means, the output of the data item from the database is prevented when the remaining memory capacity of the first storage means is not sufficient to store the data item.

The management means in the above database system may further comprise
means for causing the database to store pieces of attribute information specifying the attributes of the data items, in association with the pieces of ID information, and third transmission control means for controlling the transmission means so as to transmit, of the pieces of attribute information, one piece of attribute information corresponding to the aforementioned one piece of ID information; and the at least one communication terminal may further comprise second storage means for storing a data processing program together with the attributes of data which can be processed using the data processing program, third storage means for storing the piece of attribute information corresponding to the aforementioned one piece of ID information and received together with that piece of ID information by the reception means, determination means for reading out, from the third storage means, the piece of attribute information received by the reception means, and for determining whether the data item corresponding to the aforementioned one piece of ID information can be processed using the data processing program stored in the second storage means, based on the read-out one piece of attribute information, and second inhibition means for inhibiting the control means from causing the database to output the data item corresponding to the aforementioned one piece of ID information when the determination means determines that the data item corresponding to the above one piece of ID information cannot be processed using the data processing program.

In this case, the second inhibition means inhibits the data item which cannot be executed by the communication terminal from being output from the database. By virtue of the presence of the second inhibition means, the data item which cannot be executed by the communication terminal is prevented from occupying a memory area of the first storage means.

The management system in the above database system may further comprise fourth transmission control means for controlling the transmission means so as to transmit the aforementioned one piece of ID information simultaneously to a group which consists of the at least one communication terminal.

The at least one communication terminal in the above database system may further comprise fourth storage means for storing, in association with the pieces of ID information, pieces of reception control information for controlling the reception means.

The at least one communication terminal may further comprise display means for displaying information, fifth storage means for storing pieces of display control information in association with pieces of ID information which are substantially same as the pieces of information stored in the database, and display control means for reading out, of the pieces of display control information stored in the fifth storage means, one piece of display control information corresponding to the piece of ID information received by the reception means, and for controlling the display means.

The at least one communication terminal may further comprise alert means for alerting the user of the communication terminal when the reception means receives the aforementioned one piece of ID information, sixth storage means for storing pieces of alert control information in association with pieces of ID information which are substantially same as the pieces of information stored in the database, and alert control means for reading out, of the pieces of alert control information stored in the sixth storage means, one piece of alert control information corresponding to the piece of ID information received by the reception means, and for controlling the alert means.

According to the second aspect of the present invention, there is provided a data management system for managing a database storing data items and connected to a communication line network to which at least one terminal is connected;

the data management system comprising means for causing the database to store pieces of ID information identifying the data items, in association with those data items, transmission means for transmitting one of the pieces of ID information stored in the database to the at least one terminal through the communication line network, reception means for receiving the piece of ID information transmitted from the at least one terminal through the communication line network, and transmission means for transmitting, of the data items stored in the database, one data item corresponding to the piece of ID information received by the reception means to the at least one terminal from which that piece of ID information is transmitted.

The above data management system may further comprise detection means for detecting storage times at which the data items have been stored in the database, means for causing the database to store the storage times detected by the detection means, in association with the pieces of ID information, and first transmission control means for controlling the transmission means so as to transmit, of the storage times stored in the database, one storage time corresponding to the aforementioned one piece of ID information to the at least one terminal, together with that piece of ID information.

The data management system may further comprise size detection means for detecting the sizes of the data items stored in the database, and second transmission control means for controlling the transmission means so as to transmit, of the sizes detected by the size detection means, one size corresponding to the aforementioned one piece of ID information to the at least one terminal, together with that piece of ID information.

The data management system may further comprise third control means for controlling the transmission means so as to transmit the aforementioned one piece of ID information simultaneously to a group which consists of the at least one terminal.

According to the third aspect of the present invention, there is provided a communication terminal, connected to a database through a communication line, for extracting a desired one of data items from the database;

the communication terminal comprising reception means for receiving pieces of ID information transmitted by radio, each of the pieces of ID information identifying one of the data items stored in the database, and extraction means, which links up with the database in accordance with desired one of the pieces of ID information received by the reception means, for extracting a data item identified by the aforementioned one piece of ID information from the database.

The above communication terminal may further comprise first storage means for storing the data item extracted from the database by the extraction means.

The communication terminal may further comprise measurement means for measuring the remaining capacity of the first storage means, detection means for detecting the size of a desired data item identified by one of the pieces of ID information received by the reception means, comparison means for comparing the size detected by the detection means with the remaining capacity measured by the measurement means, and first inhibition means for inhibiting the extraction means from extracting the data item when the size is greater than the remaining capacity as a result of the comparison performed by the comparison means.

The communication terminal may further comprise second storage means for storing a data processing program together with the attributes of data which can be processed using the data processing program, third storage means for storing pieces of attribute information in association with the pieces of ID information, each of the pieces of attribute information specifying an attribute of one of the data items identified by the pieces of ID information, determination means for reading out, from the third storage means, one of the pieces of attribute information received by the reception means, and for determining whether the data item corresponding to the aforementioned one piece of attribute information can be processed using the program stored in the second storage means, and second inhibition means for inhibiting the extraction means from extracting the data item when the determination means determines that the data item corresponding to the aforementioned one piece of attribute information cannot be processed using the data processing program stored in the second storage means.

The communication terminal may further comprise fourth storage means for storing, in association with the pieces of ID information, pieces of reception control information for controlling the reception means.

The communication terminal may further comprise display means for displaying information, fifth storage means for storing pieces of display control information in association with pieces of ID information which are substantially same as the pieces of information received by the reception means, and display control means for reading out the pieces of display control information from the fifth storage means in accordance with the pieces of ID information received by the reception means, and for controlling the display means.

The communication terminal may further comprise alert means for alerting the user of the at least one communication terminal when the reception means receives the pieces of ID information, sixth storage means for storing pieces of alert control information in association with pieces of ID information which are substantially same as the pieces of information received by the reception means, and alert control means for reading out the pieces of alert control information from the sixth storage means in accordance with the pieces of ID information received by the reception means, and for controlling the alert means.

The communication terminal may further comprise:

seventh storage means for storing, in association with each other, the pieces of ID information and pieces of link information to establish links with the database.

According to the fourth aspect of the present invention, there is provided a method for obtaining desired information from a system including a database and connected to a communication line network to which at least one terminal is to be connected, the method comprising:

a transmitting step of transmitting pieces of ID information, identifying data items stored in the database, to the at least one terminal through the communication line network;

a receiving step of receiving the pieces of ID information transmitted in the transmitting step;

a selecting step of selecting one of the pieces of ID information received in the receiving step;

an accessing step of accessing the database in accordance with the selected piece of ID information selected in he selecting step; and a data obtaining step of accessing the database in accordance with the selected piece of ID information selected in the selecting step and obtaining the data item identified by the selected piece of ID information from the database;

wherein the receiving step, the accessing step and the obtaining step are performed on the part of the at least one terminal.

BRIEF DESCRIPTION OF THE DRAWINGS

FIGS. 7A to 7D are diagrams showing the appearance of a pager 6 illustrated in FIG. 1.

FIG. 8 is a diagram showing the schematic internal structure of the pager 7 illustrated in FIG. 7.

FIG. 11 is a diagram showing the storage contents of a display control program memory DM2 illustrated in FIG. 9.

FIG. 12 is a diagram showing a conversion matrix table stored in a free word matrix memory FM illustrated in FIG. 9.

FIG. 14 is a diagram showing the storage contents of a subaddress registration memory SM illustrated in FIG. 13.

FIG. 15 is a diagram showing the storage contents of a message memory MM illustrated in FIG. 13.

FIG. 19 is a diagram showing an example of the content of data stored in the message memory MM illustrated in FIG. 13 by the receiving process shown in FIG. 18.

FIG. 25 is a diagram showing the storage contents of the display control program memory DM2 in which reception control flags have been set.

FIG. 30 is a diagram showing the storage contents of a table manager TMR of the information management table illustrated in FIG. 29.

FIGS. 31 to 33 are diagrams showing the storage contents of management tables TBR1 to TBR3 of the information management table illustrated in FIG. 29.

FIG. 37 is a diagram showing the storage contents of a display control program memory DM12 illustrated in FIG. 35.

FIG. 39 is a diagram showing the storage contents of a subaddress registration memory SMR illustrated in FIG. 38.

FIG. 40 is a diagram showing the storage contents of a message memory MMR illustrated in FIG. 38.

FIG. 43 is a diagram showing an example of the content of data stored in the message memory MMR illustrated in FIG. 40 during a receiving process performed by a portable terminal 8E.

FIG. 49 is a diagram illustrating an image which is displayed on the display section 87a by step S66 shown in FIG. 45.

FIG. 50 is a diagram illustrating an image which is displayed on the display section 87a by step S69 shown in FIG. 45.

FIG. 57 is a diagram showing the storage contents of the display control program memory DM12 in which reception control flags have been set.

DETAILED DESCRIPTION OF THE PREFERRED EMBODIMENT

First Embodiment

The first embodiment wherein the present invention has been applied to a paging system will now be described with reference to FIGS. 1 to 25.

Figure 1:
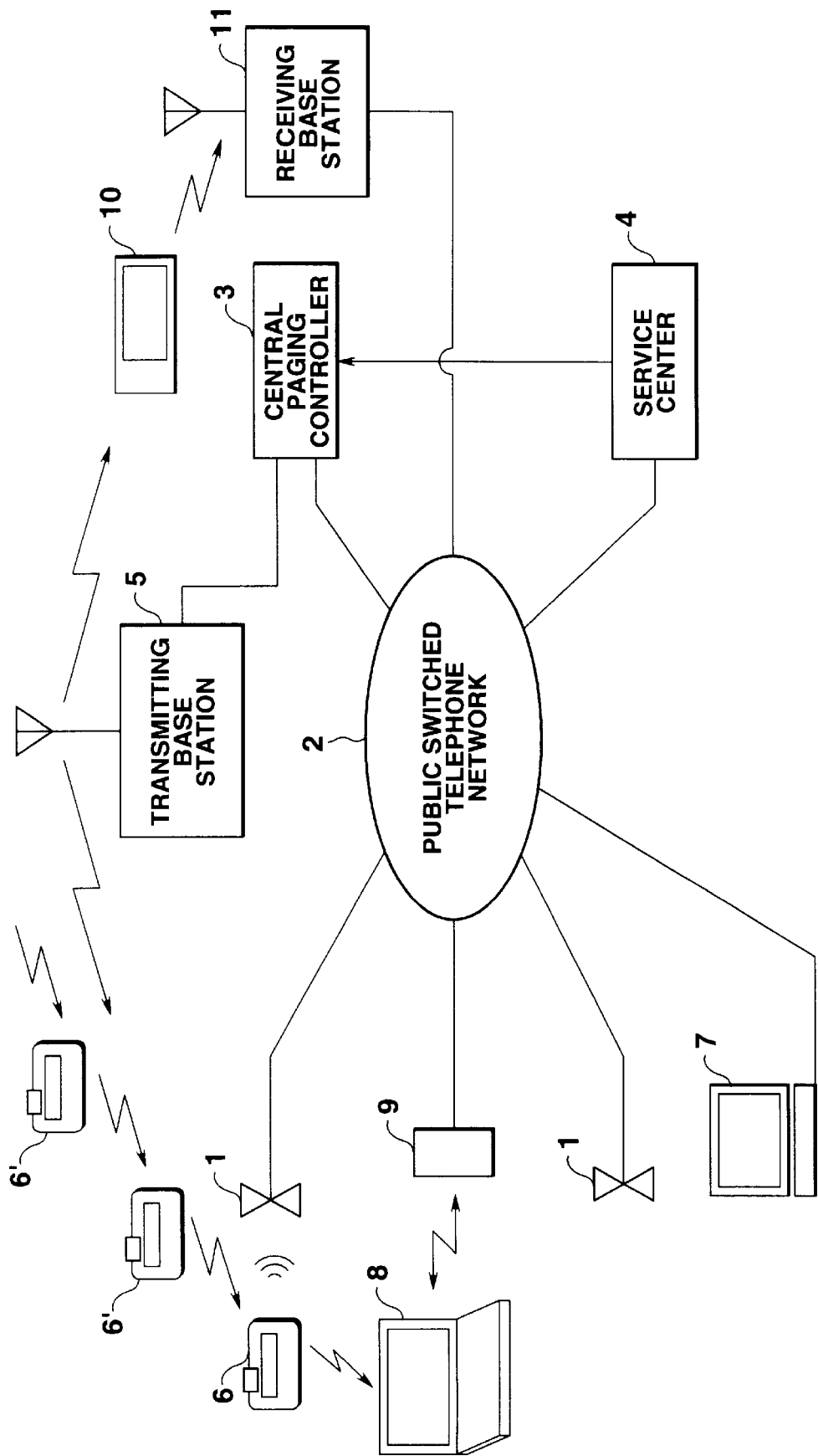
FIG. 1 is a diagram showing the structure of a paging system according to the first embodiment of the present invention.

FIG. 1 shows the structure of the paging system according to the first embodiment. In this paging system, information concerning concert tickets, etc. is presented in voice in relation to individual artists, as the contents of an information service.

In the paging system shown in FIG. 1, reference numeral 1 represents public telephones. The public telephones 1 are connected to the central paging controller 3, the service center 4 and a personal computer 7 via a public switched telephone network 2. When the expression " . . . connected to . . ." is hereinafter used thus, this connection indicates a physical connection. If, for example, the public telephones 1 are logically connected to the central paging controller 3 via the public switched telephone network 2, such a connection will be hereinafter referred to as a "line connection".

The central paging controller 3 is connected to a transmitting base station 5 via a private line, and is also connected to the service center 4 via another private line. A data transmission infrared-ray modem 9 and a receiving base station used for data transmission in a teleterminal or the like are also connected to the public switched telephone network 2.

Reference numerals 6 and 6' denote pagers. Reference numeral 8 represents a portable terminal (PDA) having the function of receiving data by radio and the function of communicating data by inferred rays. Reference numeral 10 denotes a portable terminal having the function of communicating data by radio.

Figure 2:
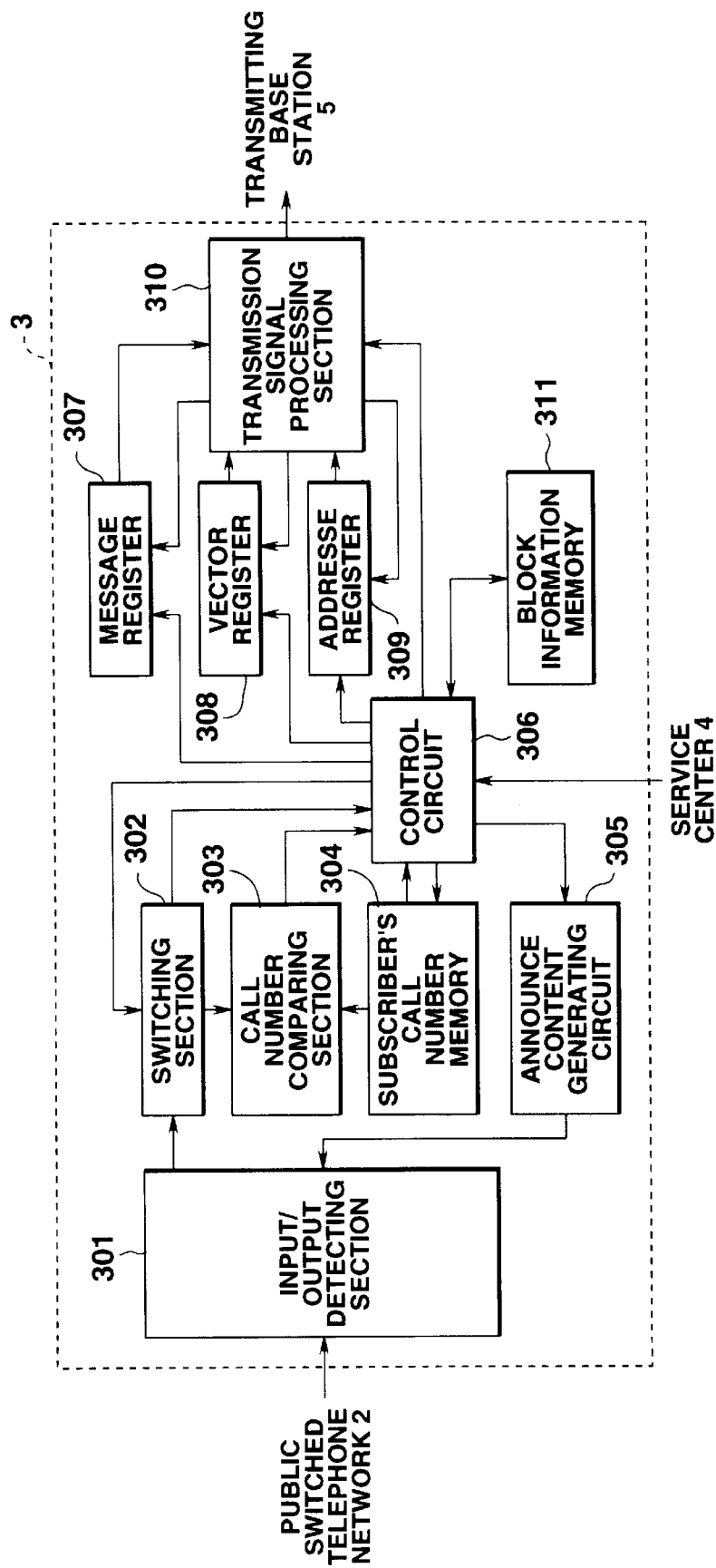
FIG. 2 is a block diagram showing the schematic internal structure of a central paging controller 3 illustrated in FIG. 1.

As shown in FIG. 2, the central paging controller 3 includes an input/output detecting section 301, a switching section 302, a call number comparing section 303, a subscriber's call number memory 304, an announce content generating circuit 305, a control circuit 306, a message register 307, a vector register 308, an address register 309, a transmission signal processing section 310 and a block information memory 311.

The input/output detecting section 301 is connected to the public switched telephone network 2. The Input/output detecting section 301 receives, from the public telephones 1 which are being line-connected to the input/output detecting section 301 via the public switched telephone network 2, the call number assigned to the pager 6 (and/or the pagers 6') to be paged and the message information to be transmitted to the pager 6 (and/or the pagers 6'). The input/output detecting section 301 also outputs, to the public telephones 1 which are being line-connected thereto, an announcement sent from the announce content generating circuit 305.

The switching section 302 is connected to the input/output detecting section 301. Of data input to the input/output detecting section 301, the call number and the message information are output from the switching section 302 to the call number comparing section 303 and the control circuit 306, respectively, in response to a control signal sent from the control circuit 306.

The call number comparing section 303 compares a call number input from the switching section 302 with the call numbers registered in advance in the subscriber's call number memory 304, and determines whether there is a coincidence between the input call number and the stored call numbers.

The subscriber's call number memory 304 stores call numbers (telephone numbers) assigned to the pagers 6 and 6', and (21-bit) ID or address data for individual and group paging, in association with individual group subscribers under contract. In the first embodiment, the subscriber's call number memory 304 also stores address data (HC) (not shown) used to receive the voice information service. The address data (HC) is read out in accordance with the control performed by the control circuit 306.

The control circuit 306 controls the operations of the entirety of the central paging controller 3 and a paging process. The control circuit 306 performs processing such as storing, in the frame information (FI) 103B, information for controlling a process for paging the pager 6 (and/or the pagers 6') in response to a request for the paging from any one of the public telephones 1. The control circuit 306 is connected to the service center 4 via the private line. Before sending information messages as the voice information service to the pagers of the contractors, address data used to provide the voice information service to the pagers are sent from the service center 4 through the private line. In accordance with call numbers corresponding to the address data and information message data, the control circuit 306 performs a paging process for transmitting the address data and the message data simultaneously to the pagers 6 and 6'.

The announce content generating circuit 305 is connected to the input/output detecting section 301, generates an announcement in accordance with the control performed by the control circuit 306, and outputs the generated announcement through the input/output detecting section to the caller (one of the public telephones 1) which is being line-connected to the central paging controller 3.

The message register 307 receives and stores the message data to be transmitted to the pager 6 (and/or the pagers 6') in accordance with the control performed by the control circuit 306, and outputs the stored message data to the transmission signal processing section 310. The message register 307 has such a memory capacity as can store message data containing a 4-bit numerical code (numeral data), and data codes (ID data) for identifying the contents of the information messages presented as the voice information service which will be described later. The message data stored in the message register 307 is set in a message field (MF) 103G of a frame structure 103 shown in FIG. 58.

The vector register 308 has such a structure that it stores vector data which forms a pair together with the address data and outputs the stored vector data to the transmission signal processing section 310, in accordance with the control performed by the control circuit 306.

In accordance with the control performed by the control circuit 306, the address register 309 receives data such as frame data and address data for paging the pagers. The address register 309 stores the data as received, and outputs the stored data to the transmission signal processing section 310. The address data and the frame data stored in the address register 309 are set respectively in the address field (AF) 103E and frame information (FI) 103B of the frame structure 103 shown in FIG. 58.

The transmission signal processing section 310 is connected to the message register 307, the vector register 308 and the address register 309. The transmission signal processing section 310 extracts data such as the message data, the vector data, the address data and the frame data, and converts them to transmission data having the format prescribed by the "RCR STD-43". The transmission signal processing section 310 outputs thus produced transmission data to the transmitting base station 5 in accordance with the control performed by the control circuit 306.

The transmitting base station 5 receives the transmission data produced by the transmission signal processing unit 310, modulates the received data, and outputs the modulated data by radio through an antenna as carrier waves to the pager 6 (and/or the pagers 6').

Figure 58:
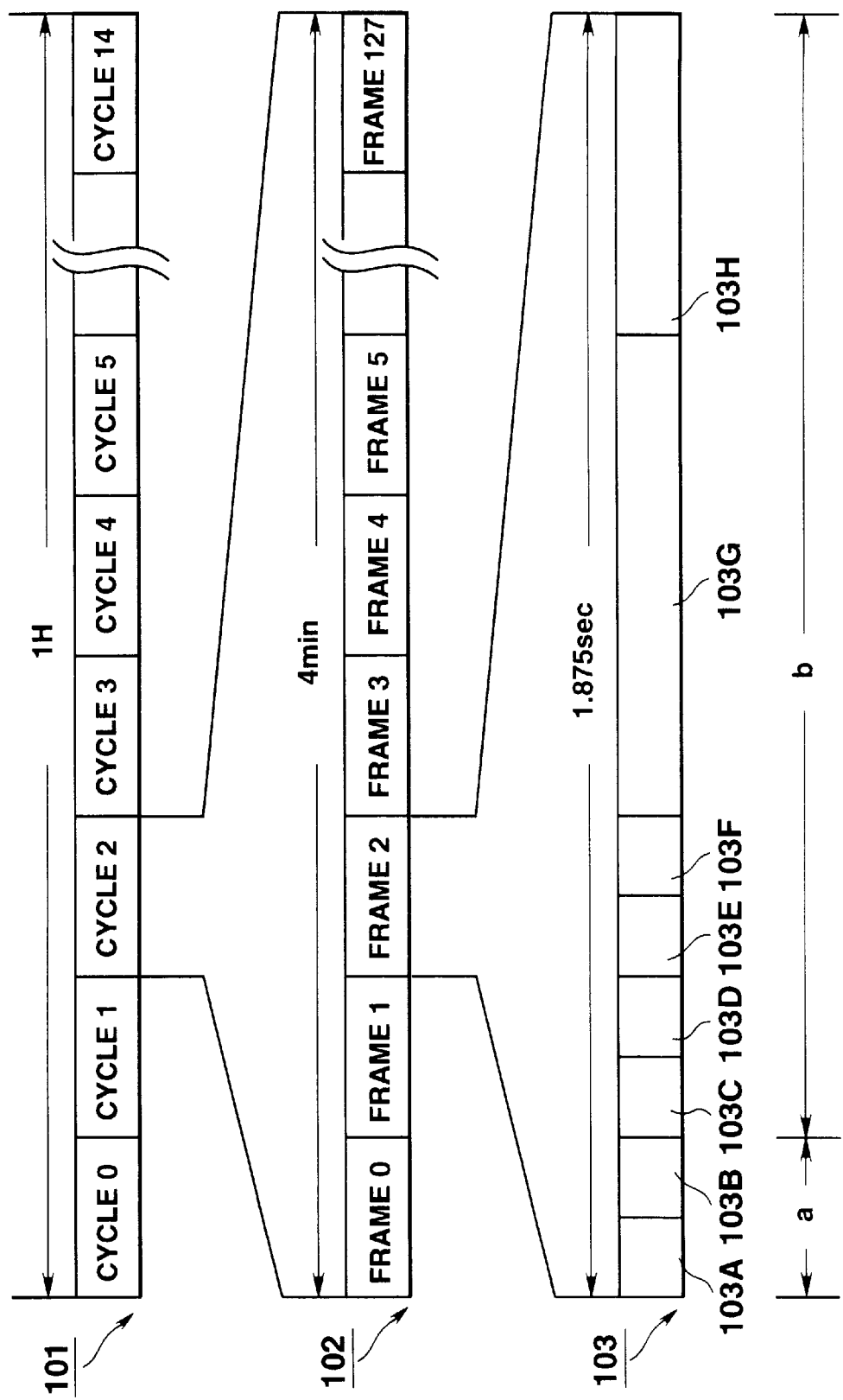
FIG. 58 is a diagram showing the data structure defined by the standard "RCR STD-43" for an advanced paging system.

The block information memory 311 stores information for setting the block information (BI) 103D of the frame structure 103 shown in FIG. 58 in accordance with the control performed by the control circuit 306. Based on the transmitted data, the block information memory 311 stores information such as the word numbers representing the starting points of the address field (AF) 103E and vector field 103F.

Figure 3:
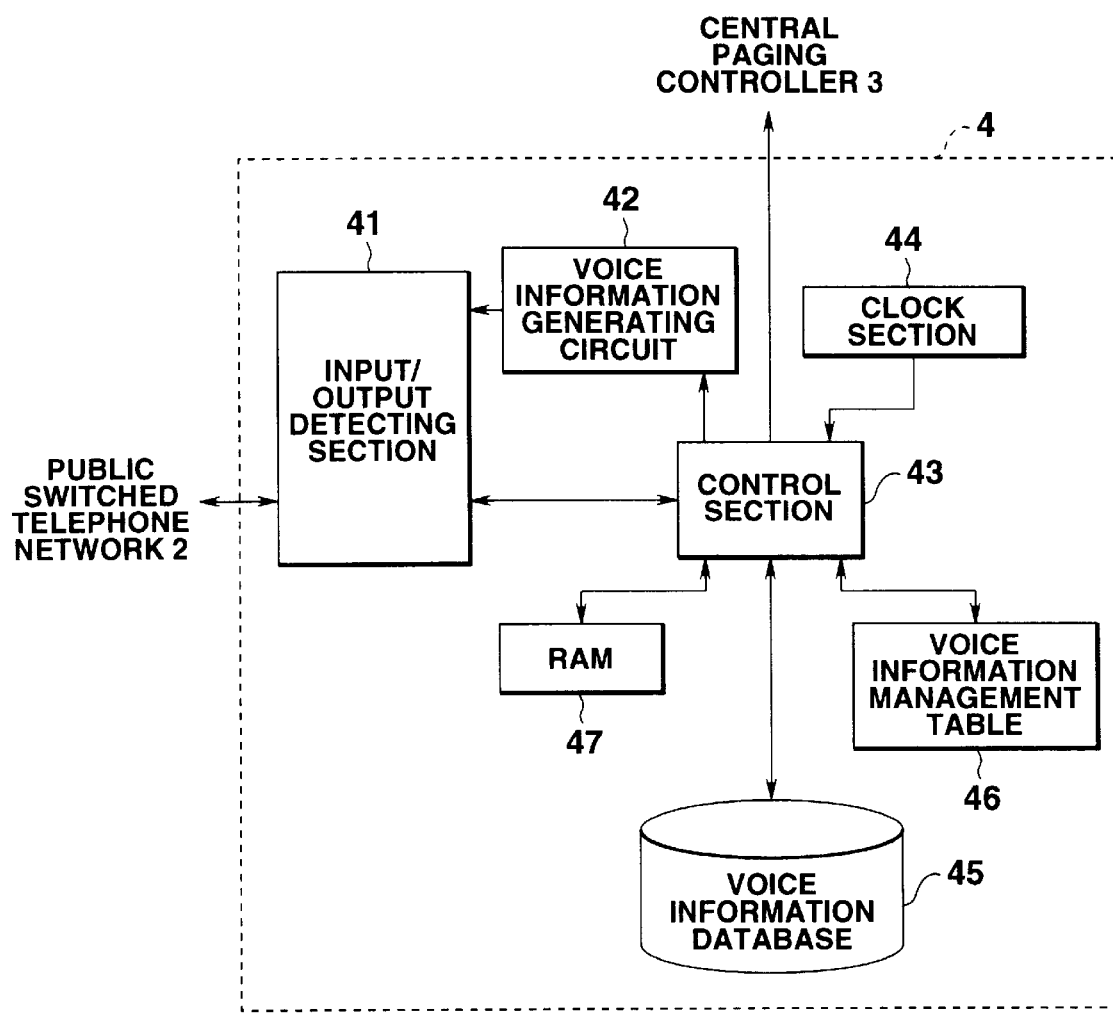
FIG. 3 is a block diagram showing the schematic internal structure of a service center 4 illustrated in FIG. 1.

The service center 4 illustrated in FIG. 1 has the function of managing the voice information and the database function of storing the voice information, in order to provide the voice information service to the users (under contract to enjoy the services) of the pagers 6 and 6'. As shown in FIG. 3, the service center 4 includes an input/output detecting section 41, a voice information generation circuit 42, a control section 43, a clock section 44, a voice information database 45, a voice information management table 46 and a RAM 47.

The input/output detecting section 41 is connected to the public switched telephone network 2. The input/output detecting section 41 receives, from one of the public telephones 1 which is being line-connected to the service center 4, code data for identifying the contents of the voice information, and message data. Further, the input/output detecting section 41 outputs the voice information, sent from the voice information generation circuit 42, to the aforementioned one of the public telephones 1 through the public switched telephone network 2.

The announce content generating circuit 42 is connected to the input/output detecting section 41. In accordance with the control performed by the control section 43, the voice information generation circuit 42 reads out the voice information stored in the voice information database 45 which will be described later, and outputs the voice information to a requester (one of the public telephones 1) who made a request for the output of the voice information. The voice information generation circuit 42 also stores voice responses or announcements (1) to (3) which are made during an accessing process which will be described later.

The control section 43 controls the operations of the entirety of the service center 4. In response to the request to transmit data as the voice information service, the control section 43 outputs the requested data simultaneously to the pagers 6 and 6' at predetermined time intervals. Furthermore, when a request associated with the voice information service, such as the request to output the voice information or the request to perform a voice information registration process, is sent from the individual public telephones 1 or the receiving base station 11, the control section 43 controls a voice information outputting process, a voice information storing process, etc. in response to the above request. The control section 43 is connected to the central paging controller 3 via the private line, and outputs ID information associated with the voice information service and a recording time to the central paging controller 3 through the private line, the ID information including a call number used to make a request for the paging with address data #C, subaddress data and code data or free word message data.

The clock section 44 measures the present time, and outputs information representing the measured time to the control section 43. The voice information, managed using management tables (TB1, TB2, TB3 . . . ) which will be described later, is stored in the voice information database 45 in the state of being digitized and compressed. In accordance with the voice information outputting process executed by the control section 43 in order to provide the voice information service to the users, the voice information requested to be output is decompressed, changed to an analog data, and is output to the public line telephone 1 which has been line-connected to the public switched telephone network 2.

In the case of the voice information storing process, the voice information requested to be registered is digitized, compressed, and is stored together with the code data, recording time and an assigned storage address in one of the management tables which is designated by the subaddress data corresponding to the access No. which has been input in advance.

Figure 4:
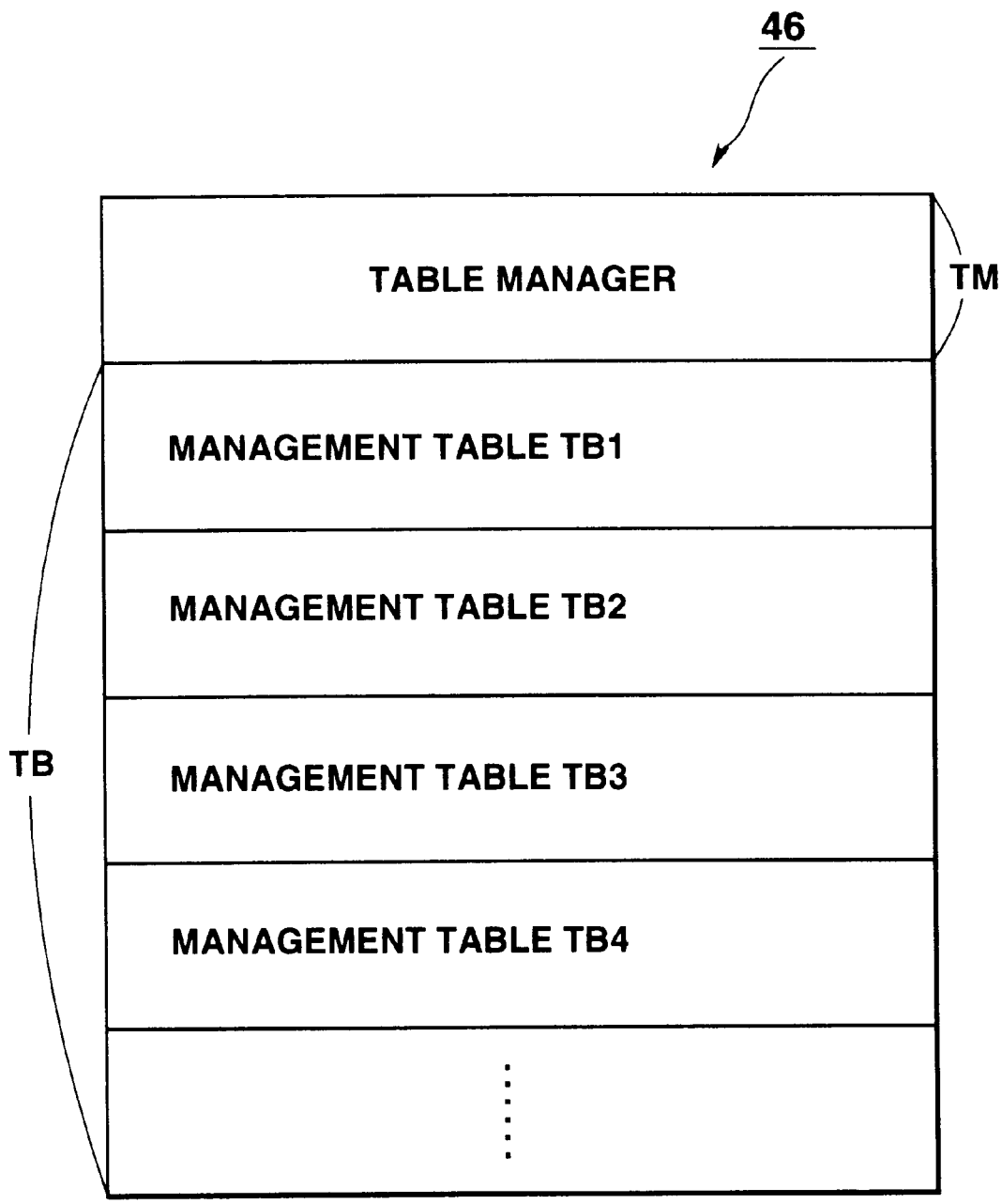
FIG. 4 is a diagram showing the structure of a voice information management table 46 illustrated in FIG. 3.

The voice information management table 46 is one for managing the voice information stored in the voice information database 45. The voice information management table 46 is stored in a memory such as a semiconductor memory. FIG. 4 shows the memory structure of the voice information management table 46. As shown in FIG. 4, the voice information management table 46 has a table manager TM and management tables TB1 to TB4 . . . . The table manager TM stores management information for managing the management tables TB1 to TB4 . . . , while the management tables TB1 to TB4 . . . store management information for managing the voice information stored in the voice information database 45.

Figure 5:
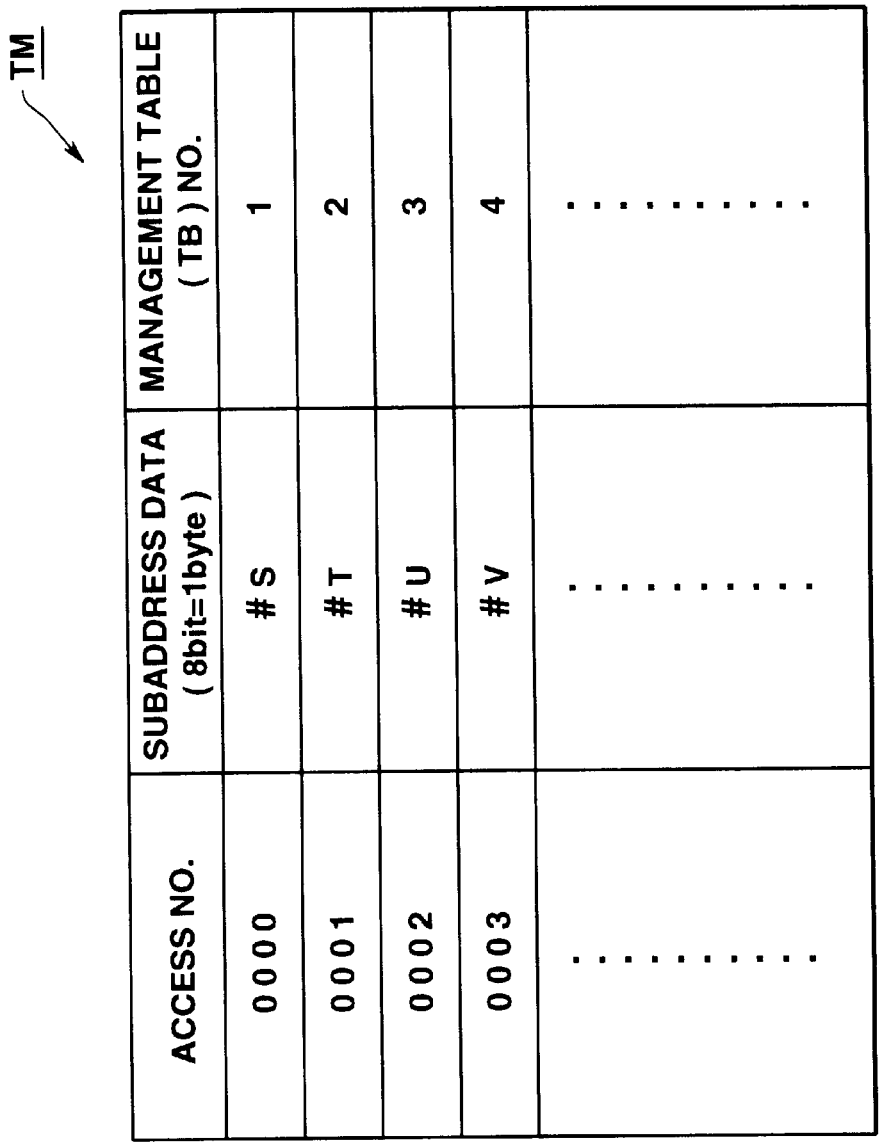
FIG. 5 is a diagram showing the storage contents of a table manager TM shown in FIG. 4.

FIG. 5 shows the storage contents of the table manager TM. The table manager TM has a "access No." column, a "subaddress data" column and a "management table No." column, all being formed in association with each other. The "access No." column stores dial No. data (four-digit numbers in the case of FIG. 5) which are input from the public telephones 1 by user's operations when the users designate a further detailed service content (e.g. the names of artists, etc.) while requesting the voice information service. The "subaddress data" column stores 8-bit subaddress data corresponding to the designated dial Nos. FIG. 5 shows the case where #S, #T, #U, #V, etc. are set as the subaddress data. The subaddress data are the information which the users, who desires to enjoy the voice information service, can set to the pagers 6, 6' . . . . It is also possible for the users to alter the subaddress data set to the pagers 6, 6' . . . . For example, when the user of the pager 6 requests the voice information service as regards the desired artist name, he/she operates a key input section (described later) to select one of the names of artists from a predetermined artist menu for the voice information service, and designates the selected name as that desired by the user, whereby subaddress data is set to the pager 6. The "management table No." column stores management table Nos. indicating in which of the management tables the voice information, corresponding to the access Nos. stored in the "Access No." column and the subaddress data stored in the "subaddress data" column, is stored.

Figure 6:
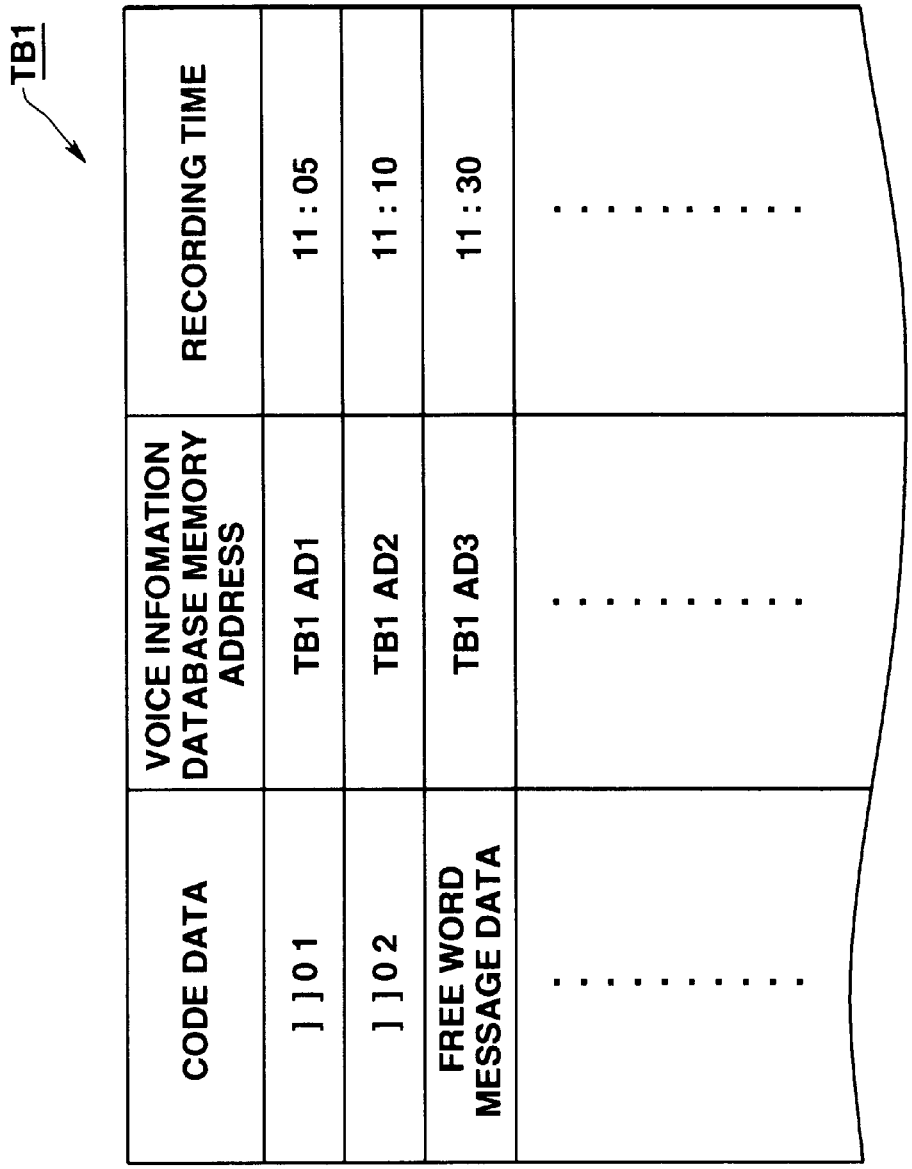
FIG. 6 is a diagram showing the storage contents of a management table TB1 in the voice information management table 46 illustrated in FIG. 4.

FIG. 6 shows the contents of the management table TB1 of the management tables TB1 to TB4 . . . . The management table TB1 shown in FIG. 6 has a "code data" column, a "voice information database memory address" column and a "recording time" column. Code data or free word message data for identifying the content of the voice information are stored in the "code data" column. In the example shown in FIG. 6, the data "] ] 0 1" representing the item "SELL YOU", the data "] ] 0 2" representing the item "SELL ME", and the free message word data (e.g. "USEFUL INFO", etc.) forming a message by designating 1 character with a two-digit numerical code, have been set in the "code data" column. Those data are used when the user of the pager 6 designates the registration of the voice information or a request for the output of the voice information, and also when the display section of the pager 6 is controlled. The memory addresses of those areas of the voice information database 45 which store the voice information corresponding to the code data stored in the "code data" column, are stored in the "voice information database memory address" column. In the example shown in FIG. 6, the data "TB1AD1", "TB1AD2" and "TB1AD3" are stored as the memory addresses. Stored in the "recording time" column are the times at which pieces of voice information, each being associated with one of code data items and one of the memory addresses have been stored. In this example, the times at which a plurality of requests to register the pieces of voice information have been made are stored as the recording times.

The management tables TB2 to TB4 . . . have the same structure as the management table TB1, and data similar to those stored in the management table TB1 are stored in association with different message services in the management tables TB1 to TB4 . . . .

The RAM (Random Access Memory) 47 is used as a work area for the control section 43. In a process for outputting data associated with the voice information service simultaneously to the pagers 6 and 6', the RAM 47 temporarily stores the call number, the subaddress data, the code data or the free word message data, and the recording time, etc., all being to be sent together to the central paging controller 3.

The appearance of the pager 6 will now be explained. FIGS. 7A to 7D show the appearance of the pager 6, and illustrate views from the front side, the left side, the bottom and the back side of the pager 6, respectively.

As seen from FIG. 7A, the front side of the pager 6 is provided with a display section 61a. A transparent touch panel 61b, on which data can be input to the pager 6 with a pen, is arranged at the surface of the display section 61a. The front side of the pager 6 is also provided with a button 61c for moving the cursor to the right, a button 61d for moving the cursor to the left, a button 61e for making the display section display an increment and next data, a button 61f for making the display section display an decrement and previous data, a dialer key 62 for starting sending tones, a function key 631 for making the display section display a menu of various processing modes, a character key 632 for making the display section display a set message, a free message, etc., a registration key 633 for designating determination and execution, and an illumination key 634 for designating the turning on of the back light.

As shown in FIG. 7B, the left side of the pager 6 is provided with a menu/power key 630 for causing the display section to display the menu and for turning the power source on/off, and an LED 76 which is lit up to inform the user that the pager 6 is being paged. As shown in FIG. 7C, a speaker 74 for alerting the user that the pager 6 is being paged is arranged at the bottom of the pager 6. As shown in FIG. 7D, the back side of the pager 6 is provided with a dialer speaker 79 for outputting a sound according to a DTMF (Dual Tone Multi-Frequency) signal, i.e., the dial signal of a touch-tone desk phone.

As shown in FIG. 8, the internal circuitry of the pager 6 includes the display section 61a, the touch panel section 61b, the dialer key 62, a key input section 63, an antenna 64, a receiving section 65, a decoder 66, a control section 67, a buffer memory 68, a deinterleave circuit 69, an ID-ROM 70, a ROM 71, a RAM 72, a driver 73, the speaker 74, a vibrator 75, the LED 76, a transmission data buffer 77, a D/A converter section 78 and the dialer speaker 79. Connected to a bus B are the display section 61a, the touch panel section 61b, the dialer key 62, the key input section 63, the decoder 66, the control section 67, the buffer memory 68, the deinterleave circuit 69, the ID-ROM70, the ROM 71, the RAM 72, the driver 73 and the transmission data buffer 77.

In response to the operations of the keys 630 to 634, the display section 61a receives display data from the control section 67 and displays images such as characters and figures. Further, the display section 61a displays the cursor with being moved in response to the operations of the cursor keys 61c to 61f. When a point designated by coordinates on that part of the display section 61a which displays the content of the desired operation is touched with a pen or the like solely for use to select items or the like on the display section 61a, the touch panel section 61b outputs an operation signal to the control section 67 through the bus B in response to the toughing operation.

In accordance with the number of times the depressing operation is performed, the dialer key 62 generates a command to cause the transmission data stored in the transmission data buffer 77 to be output from the dialer speaker 79 through the D/A converter 78. The key input section 63 has a group of keys (61c to 61f and 630 to 634) other than the dialer key. The function of the key input section 63 will not be explained herein.

The antenna 64 receives the carrier waves (the address data, the vector data, the message data, the recording time, etc.) transmitted by radio from the transmitting base station 5, and outputs them to the receiving section 65. The receiving section 65 is intermittently driven in accordance with the control performed by the decoder 66 and at the time slots according to the frame data stored in the ID-ROM 70, as will be described later. The receiving section 65 detects the waves received by the antenna 64, and demodulates a signal from the waves. The demodulated signal is converted to binary or quadrature digital data, which is then output to the decoder 66 as serial data.

The decoder 66 converts the binary or quadrature digital data to 8-bit parallel data, and outputs the parallel data to the bus B. A detection signal is output when the address data input from the control section 67 and the address data stored in the ID-ROM 70 coincide with each other. When the decoder 66 receives the detection signal, it causes the receiving section 65 to receive all data in the vector field and message field of the frame containing the address data.

The buffer memory 68 temporarily and sequentially stores, block by block, received data items forming 1 frame. The deinterleave circuit 69 deinterleaves the received data items which have been interleaved block by block in accordance with information specifying the transmission speed and the demodulation method.

The ID-ROM 70 stores 21-bit address data set to the pager 6, for example, address data #A and #B for the individual paging and group address data #C common to the pager 6 and the other pagers 6' and used to receive the voice information service. The ID-ROM 70 stores also personal information such as frame No. data representing own frame No. which indicates the intermittent reception timing.

Figures 9, 10:
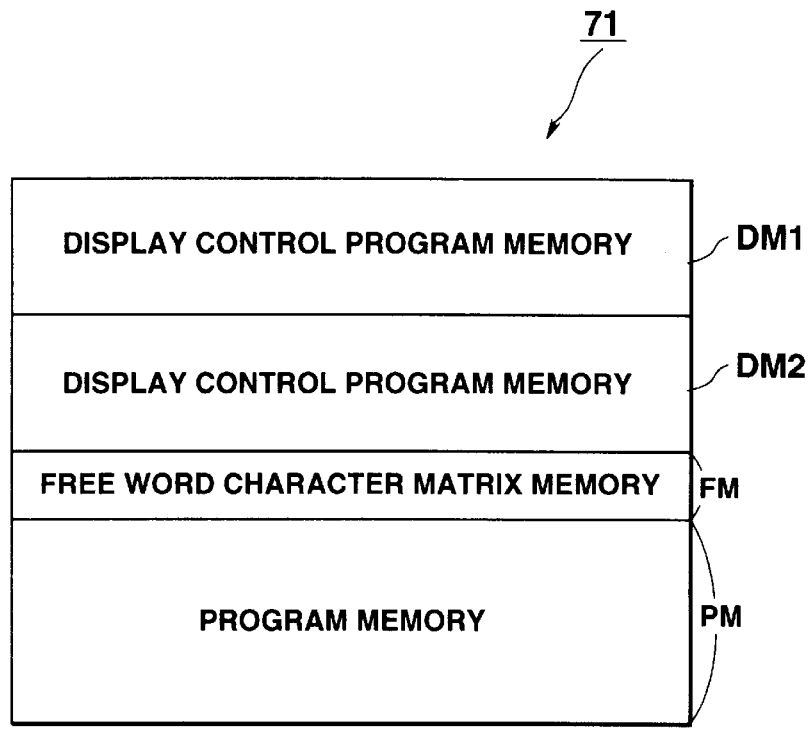
FIG. 9 is a diagram showing the structures of memory areas in a ROM 71 illustrated in FIG. 8.
FIG. 10 is a diagram showing the storage contents of a display control program memory DM 1 illustrated in FIG. 9.

The ROM (Read Only Memory) 71 is a nonvolatile memory for storing the display control program executed by the control section 67, other various programs, etc. As shown in FIG. 9, the ROM 71 has memory areas used as a display control program memories DM1 and DM2, a free word matrix memory FM and a program memory PM. Programs for controlling the circuits of the pager 6 are stored in the program memory PM.

FIG. 10 shows the storage contents of the display control program memory DM1. The display control program memory DM1 has an "address data" column, a "display control contents" column and a "tel (telephone) No." column. The address data set in the ID-ROM 70 are stored in the "address data" column. Unlike the subaddress data stored in the table manager TM shown in FIG. 5, the address data stored in the "address data" column are fixed. The display control contents corresponding to the address data are stored in the "display control contents" column. In the example shown in FIG. 10, the display control content "LIGHT UP SEGMENTüuAüv" is stored as one corresponding to the address data A#, the display control content "LIGHT UP SEGMENT üuBüv" is stored as one corresponding to the address data #B, and the display control content "display "Artist Ticket Info" on the display section 61" is stored as one corresponding to the address data #C. The outputs from the dialer speaker 79 are stored in the "tel No." column. In the example shown in FIG. 10, the outputs from the dialer speaker 79 are not stored in association with the address data #A and #B. However, in association with the address data #C, the telephone number (0000-000-0000) of the service center 4, i.e., the provider of messages such as the code data, etc., is stored.

FIG. 11 shows the storage contents of the display control program memory DM2. The display control program memory DM2 shown in FIG. 11 has a "code data" column and a "display control contents" column. The code data "] ] 0 1", "] ] 0 2" and free word message data are stored in the "code data" column. The aforementioned items "[SELL YOU]+RECORDING TIME", "[SELL ME]+RECORDING TIME" and "[FREE WORD MESSAGE DATA]+ RECORDING TIME" are stored in the "display control contents" column as the display control contents corresponding to the code data. The "FREE WORD MESSAGE DATA" shows the case where received message data is the free word message data.

The free word matrix memory FM stores the 4ü~4-bit matrix table shown in FIG. 12. When the pager 6 detects, from the message data set in the message field (MF) 193G, the ID data (which is "11011101" when represented in the form of a bit pattern, and which is "üjüj" (üû2üû2) when represented in the form of dial data) indicating that the message data is the free word message data, the subsequent bit data are converted in units of 8 bits to the characters to be displayed, with reference to the matrix table stored in the free word matrix memory FM.

Figure 13:
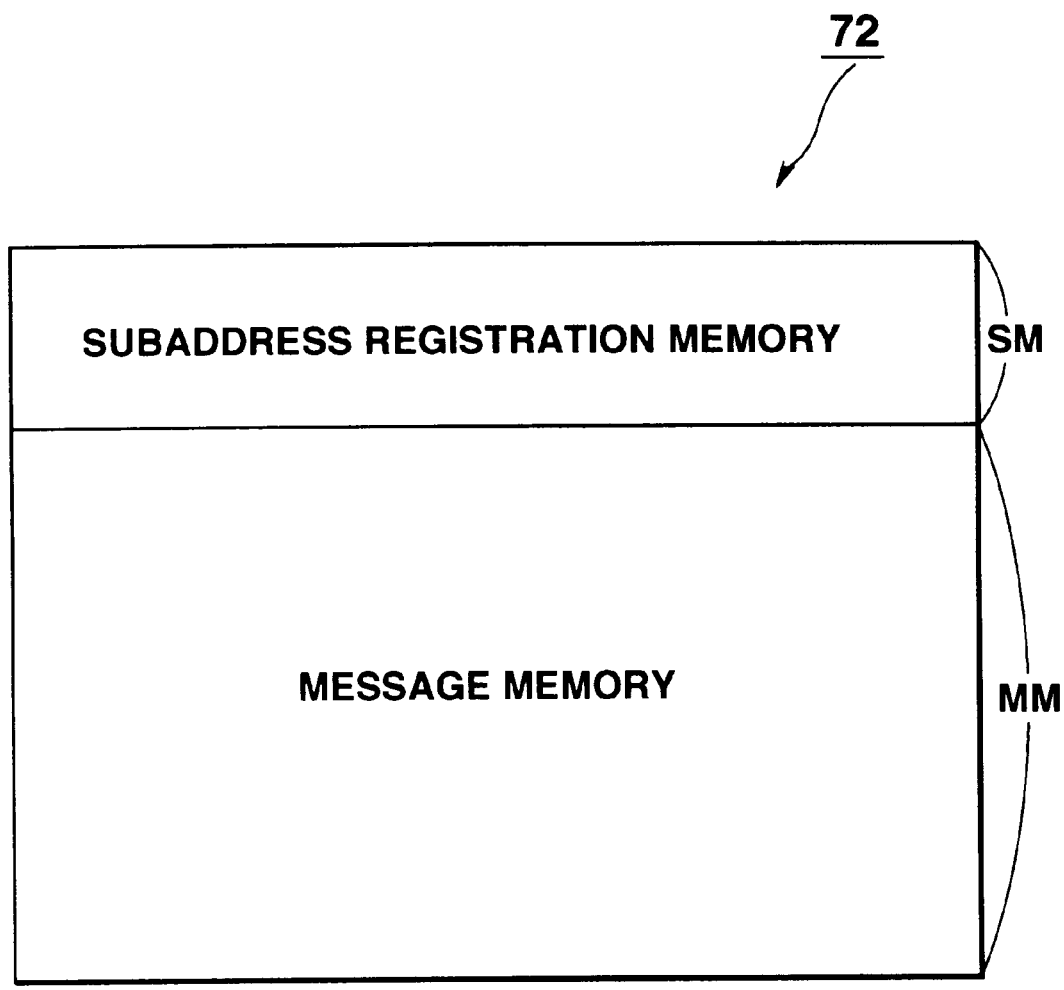
FIG. 13 is a diagram showing the structures of memory areas in a RAM 72 illustrated in FIG. 8.

The RAM 72 illustrated in FIG. 8 is an erasable storage medium for storing the contents of the voice information service, the received message data, etc. so as to be capable of being rewritten. The RAM 72 includes a subaddress registration memory SM and a message memory MM, as shown in FIG. 13.

FIG. 14 shows the storage contents of the subaddress registration memory SM. The subaddress registration memory SM illustrated in FIG. 14 has a "subaddress data" column, a "service contents to be displayed" column and a "access No." column. The subaddress data #S and #U, which are the same as those for designating the contents of the voice information service and stored in the table manager TM illustrated in FIG. 5, are stored in the "subaddress data" column. The contents of the voice information service which are to be received in association with the subaddress data #S and #U are stored in the "service contents to be displayed" column. In FIG. 14, the name of the artist "RODGER" is stored as the service content corresponding to the subaddress data #S, while the name of the artist "CATHARINE" is stored as the service content corresponding to the subaddress data #U. Four-digit access No., each being set in association with one of the contents of the voice information service, are stored in the "access No." column. In the example shown in FIG. 14, the access No. "0000" and "0002" are stored in association with the subaddress data stored in "subaddress data" column and the service contents stored in the "service contents to be displayed" column. Those access Nos. are used for accessing to the service center.

FIG. 15 shows the storage contents of the message memory MM. The message memory MM illustrated in FIG. 15 has an "received address data" column, a "subaddress data" column, a "received data" column, a "recording time" column and an "receiving time" column. Of the address data stored in the "received address data" column of the display control program memory DM1 or in the ID-ROM 70, those contained in the received message data are stored in the "address data" column of the message memory MM. Of the subaddress data stored in the subaddress registration memory SM shown in FIG. 14, those which the pager 6 has actually received are stored in the "subaddress data" column of the message memory MM. However, in the case where received data does not indicate the voice information service, no subaddress data is stored in the "subaddress data" column in association with the received message data. In the "received message data" column of the memory MM, the contents of data such as the message data transmitted with being stored in the message field (MF) 103G to the pager 6 are stored. In the "recording time" column of the message memory MM, the same recording times as those stored in the "recording time" columns of the information management table TB are stored. However, when the received data does not indicate the voice information service, no recording time is stored in association with the received data in the "recording time" column of the message memory MM. The time at which the message data has been received by the pager 6 is stored in the "receiving time" column of the message memory MM.

The driver 73 shown in FIG. 8 drives and controls the speaker 74, the vibrator 75 and the LED 76 in response to the commands to perform alerting which have been input from the control section 67 through the bus B. The transmission data buffer 77 temporarily stores DTMF data (the transmitted data) in order to output a DTMF sound from the dialer speaker 79. The D/A converter section 78 converts the digital DTMF data stored in the transmission data buffer 77 to an analog DTMF signal. The dialer speaker 79 outputs the DTMF sound corresponding to the DTMF signal.

The pagers 6' have the same structure as the pager 6 shown in FIGS. 7 and 8.

The transmitting base station 5 shown in FIG. 1 sends out paging communication signals received from the central paging controller 3 to the pagers 6 and 6' by radio. The personal computer 7 shown in FIG. 1 has various information processing functions and a communication modem function. Using the communication modem function, the personal computer 7 sends out the processed data to the public switched telephone network 2, and processes the communication data transmitted/received through the public switched telephone network 2.

Furthermore, the portable terminal 8 shown in FIG. 1 has various information processing functions. Using a radio communication function, the portable terminal 8 receives the paging signals transmitted by radio from the transmitting base station 5, and processes them. The portable terminal 8 has also a inferred-ray communication function, and transmits/receives communication data to/from the public switched telephone network 2 though the infrared-ray modem 9.

The infrared-ray modem 9 shown in FIG. 1 has the function of transmitting/receiving communication data to/from the portable terminal 8 by using the infrared-ray communication function. The infrared-ray modem 9 modulates data transmitted from the portable terminal 8, and sends out the modulated data to the public switched telephone network 2. Moreover, the infrared-ray modem 9 demodulates data transmitted from the public switched telephone network 2, and sends out the demodulated data to the portable terminal 8.

The PDA (Personal Digital Assistant) 10 shown in FIG. 1 has various information processing functions such as a memorandum function, a telephone book function, etc., and has also a radio data-communication function. Using the radio data-communication function, the PDA 10 transmits communication data to the receiving base station 11 so as to be send to the public switched telephone network 2. Further, using the radio data-communication function, the PDA 10 receives communication data from the transmitting base station 5, and processes the communication data as received.

The operations according to the first embodiment will now be described.

In the paging system according to the first embodiment, in order to provide the voice information service to the owners of the pagers 6 and 6' having a dialer function, the service center 4 is provided with the function (database) of storing the voice information to be provided as the voice information service and the function (processing means) of managing the voice information. In the first embodiment, the voice information service is an artist information service (of providing artist ticket information such as "SELL ME", "SELL YOU", etc.) which is presented to the users in the form of the voice information.

The display section 61a of the pager 6 (and the pagers 6') displays a menu on which either the item "REGISTRATION OF VOICE INFORMATION" or "REQUEST FOR OUTPUT OF VOICE INFORMATION" can be selected as an application corresponding to the voice information service. The "REGISTRATION OF VOICE INFORMATION" indicates that the users of the pagers 6 and 6' register information concerning the sales/purchase of objects, etc. in the service center 4 as the voice information. The "REQUEST FOR OUTPUT OF VOICE INFORMATION" indicates that the users operate their pagers 6 and 6' so that the recording time corresponding to the desired voice information is transmitted to the service center 4, thus requesting the service center 4 to output the voice information.

Figure 16:
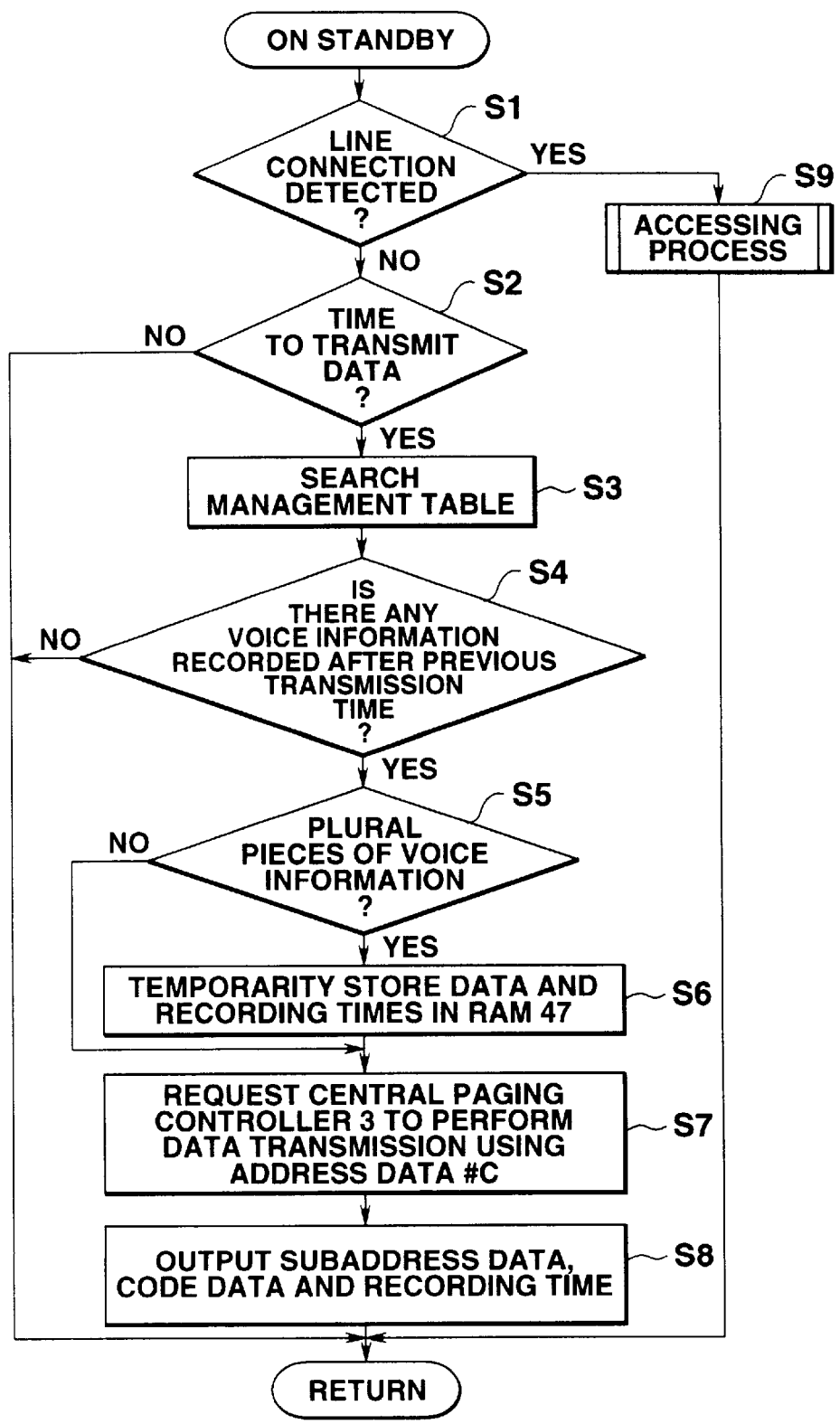
FIG. 16 is a flowchart showing a control process executed by the control section of the service center 4 illustrated in FIG. 3.

A control process which the control section 43 of the service center 4 shown in FIG. 3 executes in order to provide the voice information to the users will now be described with reference to the flowchart shown in FIG. 16.

The circuits included in the service center 4 are controlled so as to operate constantly, and are always in the standby state of waiting for the public telephones 1 being line-connected to the service center 4 via the public switched telephone network 2. The transmission data corresponding to the voice information stored in the voice information database 45 is transmitted simultaneously to the destinations or the pagers 6 and 6' through the central paging controller 3 and the transmitting base station 5 at predetermined time intervals (of one hour, for example), based on the management information (the code data, the voice information database memory addresses and the recording times) stored in the table manager TM and management tables TB1, TB2, TB3 . . . of the voice information management table 46.

In the service center 4, the control section 43 in the aforementioned standby state detects from the input/output detecting section 41 whether the line connection has been established (step S1). When the control section 43 does not detect the line connection in the step S1, then the control section 43 determines whether it is the time to transmit information service data simultaneously to the pagers 6 and 6' as the voice information (step S2). When the intervals between the transmission times to transmit the information service data are set at one hour and when the previous transmission time is 11:00, for example, the control section 43 determines whether the present time is 12:00, with reference to the clock section 44. When the control section 43 determines in the step S2 that it is not the time to transmit the information service data simultaneously to the pagers 6 and 6', the control section 43 returns to the standby state. When the control section 43 determines in the step S2 that it is the time to transmit the information service data simultaneously to the pagers 6 and 6', the control section 43 searches the management table 46 (step S3). By searching the management table 46, the control section 43 determines whether there is any voice information newly recorded in the voice information database 45 after the previous transmission time (11:00) (step S4). Specifically, the control section 43 refers to the recording times stored in the management table TB in the management table 46, and determines in association with each table No. whether there is any voice information recorded after the previous transmission time (11:00).

When the control section 43 determines in the step S4 that there is no voice information recorded after the previous transmission time (11:00), it returns to the standby state. When the control section 43 determines in the step S4 that there is any voice information recorded after the previous transmission time (11:00), then it determines whether there are plural pieces of voice information recorded after the previous transmission time (11:00), with reference to the management table TB (step S5). When the control section 43 determines in the step S5 that there are not such plural pieces of voice information as a result of the reference to the management table TB, the control section 43 goes to step S7. When the control section 43 determines that there are plural pieces of voice information recorded after the previous transmission time (11:00), it causes the RAM 47 to temporarily store, in association with the individual subaddress data corresponding to the table Nos., the data to be transmitted and which have been stored in the management table TB (step S6). The aforementioned data to be transmitted are plural code data or free word message data and the recording times.

Let it be assumed that the management table TB of the voice information management table 46 at that time (12:00) is in the state of storing, together with the voice information database memory addresses and the recording times, four code data items (including the free word message data) to be transmitted simultaneously to the pagers 6 and 6'. Of those four code data items, three are associated with the subaddress data #S, while the remaining one is associated with the subaddress data #U. The three code data items associated with the subaddress data #S are "] ] 0 1", "] ] 0 2" and the free word message data "USEFUL INFO" (which is "ü¦ü¦( üû2üû2) 30281415302136182315 24" when represented in the form of the dial data), and their recording times are "11:05", "11:10" and "11:30", respectively. The code data item associated with the subaddress data #U is "]]0 2", and its recording time is "11:25".

Then, the service center 4 sends out data requesting the central paging controller 3 to perform the data transmission using the address data #C (indicating the voice information service) to the central paging controller 3 through the private line (step S7). The service center 4 reads out the subaddress data, the code data or the free word message data, and the recording times from the management table TB in correspondence with four voice information service contents detected in the step S5. The control section 43 produces, from those read-out data, a single message data item having the structure shown in FIG. 17, and sends out the produced data item to the central paging controller 3, together with the address data #C indicating the voice information service (step S8). Then, the process shown in the flowchart of FIG. 16 ends.

Figure 17:
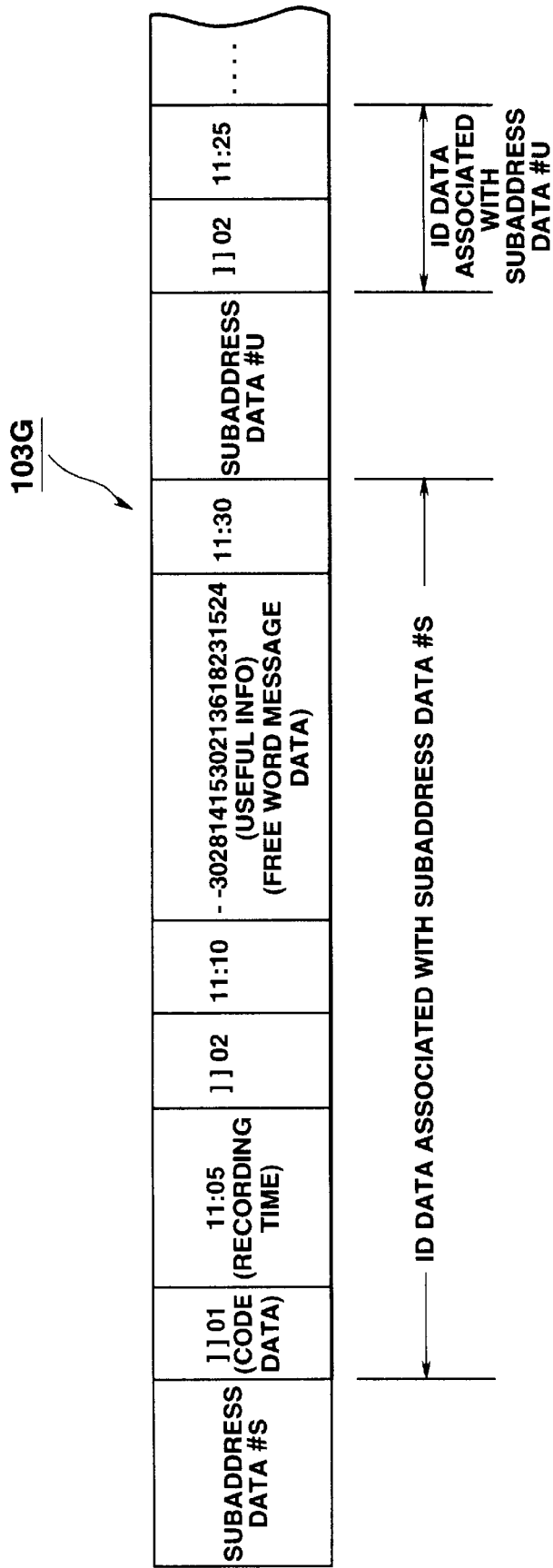
FIG. 17 is a diagram showing the content of data which is output from the service center 4 to the central paging controller 3 in accordance with a control process executed by the service center 4 illustrated in FIG. 16, and which is stored in the message field (MF) 103G.

When the central paging controller 3 receives the message data item having the structure shown in FIG. 17 from the service center 4, the central paging controller 3 stores the message data item in the message field (MF) 103G shown in FIG. 58, thus producing data which accord with the "RCR STD-43". The central paging controller 3 sends out the produced data to the transmitting base station 5. Then, the transmitting base station 5 transmits the produced data having the structure shown in FIG. 17 simultaneously to the pagers 6 and 6' which store the address data #C indicating the voice information service.

A receiving process which the control section 67 executes when the pager 6 is paged by the central paging controller 3 and receives the transmitted data mentioned above, will now be described with reference to the flowchart shown in FIG. 18.

After the power is turned on by the operation of the menu/power key 630, the control section 67 executes the setting of control data and the initialization of the individual circuits, and enters the standby state. The antenna 64 receives the modulated waves (the address data, the message data, the recording times, etc.) transmitted by radio from the central paging controller 3 through the transmitting base station 5, and outputs them to the receiving section 65. In accordance with the control performed by the decoder 66, the recording section 65 is intermittently driven at the time slots corresponding to the frame No. data stored in the ID-ROM 70. The receiving section 65 detects the waves received by the antenna 64, demodulates a signal from the waves, and outputs the demodulated signal to the decoder 66. The decoder 66 rearranges the data input from the receiving section 65 into 8-bit parallel data, and outputs the parallel data to the bus B. The control section 67 compares the address data registered in the ID-ROM 70 with the data stored in the address field (AF) 103E and deinterleaved by the deinterleave circuit 69. When the address data registered in the ID-ROM 70 coincides with the data stored in the address field (AF) 103E and deinterleaved by the deinterleave circuit 69, the control section 67 outputs a coincidence signal to the decoder 66 in order to continue the receiving operation of the receiving section 65 until all data in the frame are fetched.

Figure 18:
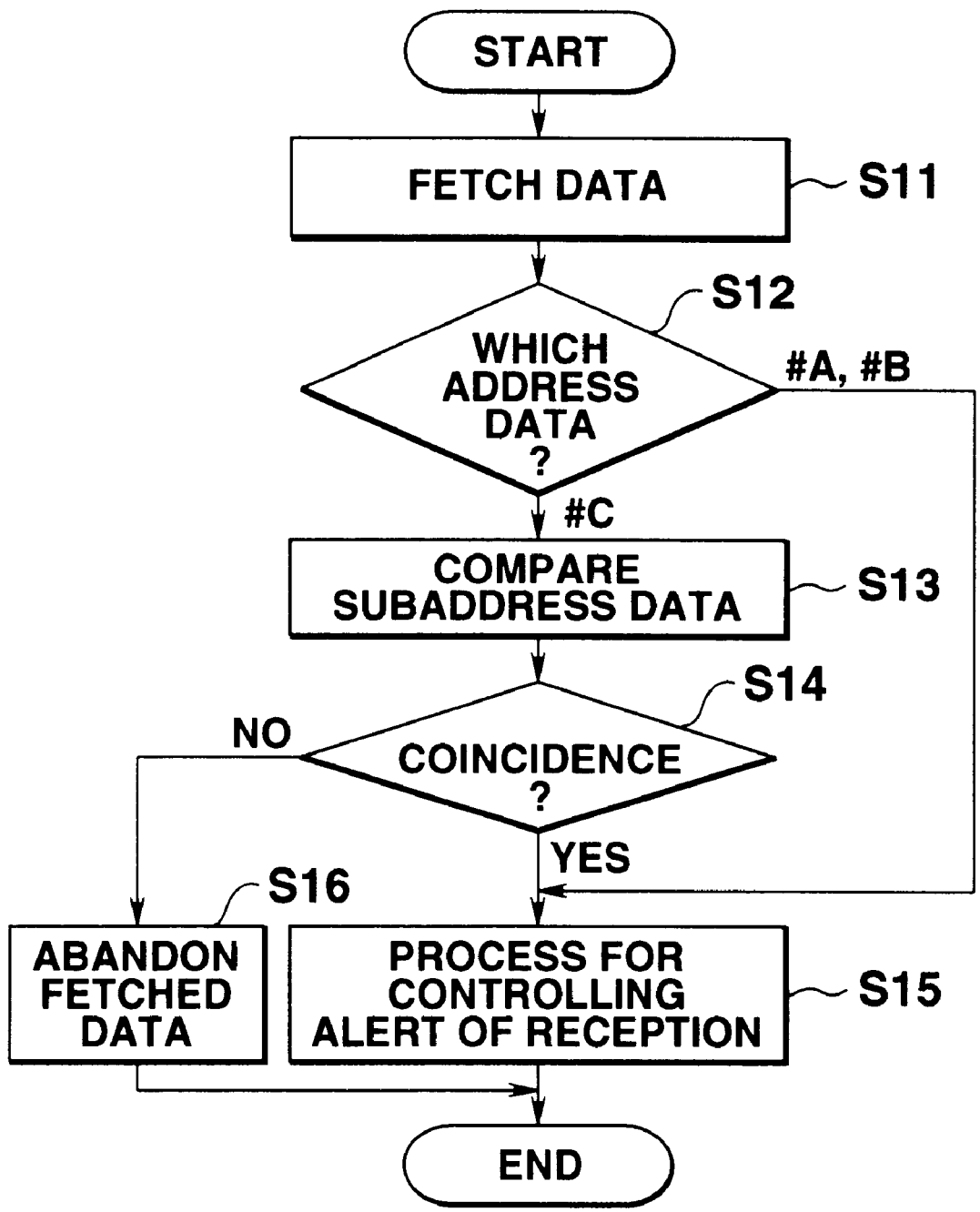
FIG. 18 is a flowchart showing a receiving process executed by the pager 6 illustrated in FIG. 8.

In this case, the control section 67 performs the process shown in the flowchart of FIG. 18.

The control section 67 completely fetches 1-frame data transmitted from the central paging controller 3 through the transmitting base station 5 (step S11), and determines whether address data included in the fetched data is #A, #B or #C (indicating the information service) (step S12). When it is determined in the step S12 that the address data is #A or #B, the control section 67 makes the fetched data deinterleaved, and causes the message memory MM to store the deinterleaved data. Thereafter, the control section 67 causes the speaker 74 to generate an alerting sound, or makes the vibrator 75 vibrate, or lights up the LED 79, thus alerting that the pager 6 has received the data. Moreover, the control section 67 causes the display section 61b to display the segmentüuAüvorüuBüv, in accordance with the display control content "LIGHT UP SEGMENTüuAüv" or "LIGHT UP SEGMENTüuBüv" stored in association with the address data #A or #B in the "display control contents" column of the display control program memory DM1 shown in FIG. 10, thus displaying on the display section 61b a message based on the fetched data as stored (step S15). Then, the control section 67 ends the process shown in the flowchart of FIG. 15.

Of the subaddress data and the code data or the free word message data, all of which are pieces of ID information contained in the message field (MF) 103G of the received data as fetched and deinterleaved, the subaddress data are sequentially compared with the subaddress data (#S or #U) stored in the subaddress registration memory SM shown in FIG. 14 (step S13) when the control section 67 determines in the step S12 that the address data is #C (indicating the information service). Then, the control section 67 determines whether there is a coincidence between the subaddress data contained in the message field (MF) 103G and the subaddress data stored in the subaddress registration memory SM (step S14). As regards the subaddress data determined in the step S14 as having no coincidence with the subaddress data stored in the subaddress registration memory SM, the control section 67 abandons those data which follow the subaddress data having no coincidence and which precede the next subaddress data (step S16). Then, the control section 67 ends the process shown in the flowchart of FIG. 18.

As regards the subaddress data determined in the step S14 as having a coincidence with the subaddress data stored in the subaddress registration memory SM, the control section 67 transfers the data following the subaddress data to the message memory MM. Based on the transferred data (the code data or the free word message data, and a recording time), the control section 67 causes the display section 61a to display the content to be displayed. In the case of FIG. 14, for example, the control section 67 causes the message memory MM to store only those data of the received message data which follow the subaddress data identical with #S or #U stored in the subaddress registration memory SM. Then, based on the content "RODGER" or "CATHARINE" stored in association with the subaddress data #S or #U in the "service contents to be displayed" column, the control section 67 causes the display section 61a to display the name "RODGER" or "CATHARINE" (step S15). Then, the control section 67 ends the process shown in the flowchart of FIG. 18.

In other words, when the pager 6 (and/or the pagers 6') is paged using the address data #C indicating the voice information service, the control section 67 fetches all data contained in the message field. After this, the control section 67 causes the message memory MM to store only those data which follow the subaddress data having a coincidence with the subaddress data set in the pager 6, and abandons the others.

As described above, the pagers 6 and 6' perform the receiving process with respect to the data transmitted from the central paging controller 3 through the transmitting base station 5. By this receiving process, the pagers 6 and 6' fetches the data contained in the message field (MF) 103G of the data transmitted from the service center 4. The fetched data are classified according to the ID data and stored in the message memory MM of the RAM 72. FIG. 19 shows the content of the data stored in the message memory MM.

FIG. 19 shows the content of the received data stored in the same message memory MM as that shown in FIG. 15. In FIG. 19, however, four data items which have been received together with the address data #C in the "address data" column are newly stored in accordance with the flowchart of the receiving process shown in FIG. 18. In the case of FIG. 19, the subaddress #S and #U are stored in the "subaddress data" column, since the they have been set to the received data items which are those transferred from the central paging controller 3 simultaneously as the voice information service. In association with the subaddress data #S, the ID data designating the contents of the voice information service, i.e., the code data "] ] 0 1", "] ] 0 2" and "USEFUL INFO" (the free word message data), and the recording times "11:05", "11:10" and "11:30" at which those pieces of voice information have been recorded at the service center 4, are stored in the "data content" column. In association with the subaddress data #U, the code data "] ] 0 2" and its recording time "11:25" are stored in the "data content" column. Further, ,the time (12:00) at which the pager 6 has received the above data is stored in the "receiving time" column.

With reference to the flowchart shown in FIG. 20, explanations will now be made in regard to a process which the control section 67 of the pager 6 executes in accordance with a user's operation in the case where the pager 6 presents voice information associated with the voice information service to the service center 4 through the public switched telephone network 2 or in the case where the pager 6 requests the service center 4 to output voice information.

Figure 20:
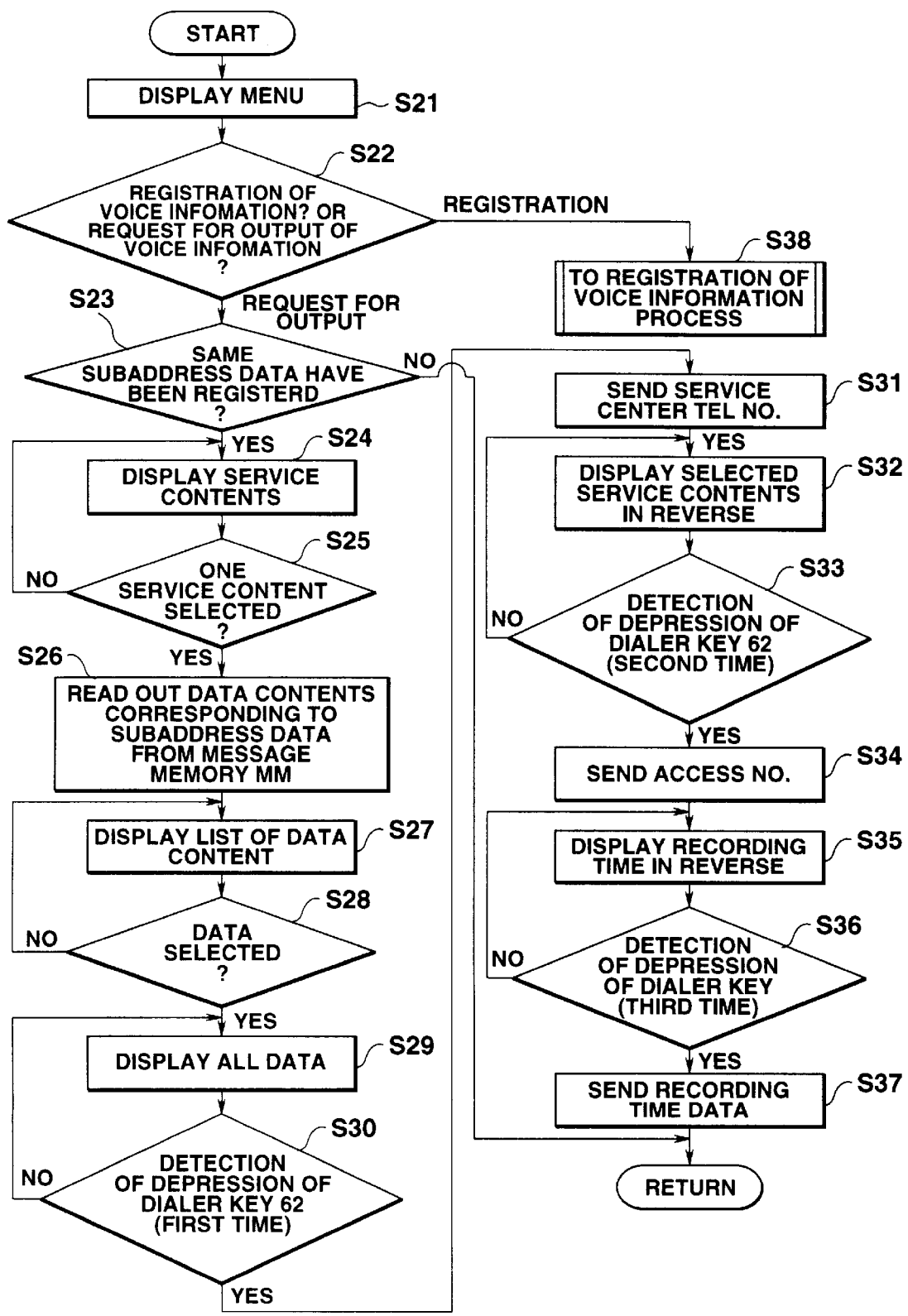
FIG. 20 is a flowchart of a control process, executed by the control section illustrated in FIG. 8, for requesting that the voice information be output.

When the user selects a voice information service mode by operating the menu/power key 630 of the key input section 63, the control section 67 starts the process shown in the flowchart of FIG. 20. Upon starting the process, the control section 67 causes the display section 61a to display the voice information service menu shown in FIG. 21 (step S21). The voice information service menu shown in FIG. 21 includes a choice "1. REGISTRATION OF VOICE INFORMATION" which indicates the REGISTRATION OF VOICE INFORMATION from the user, and a choice "2. REQUEST FOR OUTPUT OF VOICE INFORMATION" (voice information outputting request) which indicates a user's request for the output of voice information. The user selects desired one of the above choices by touching the corresponding part of the touch panel 61b on the display section 61a, and the control section 67 detects this selection.

Figure 21:
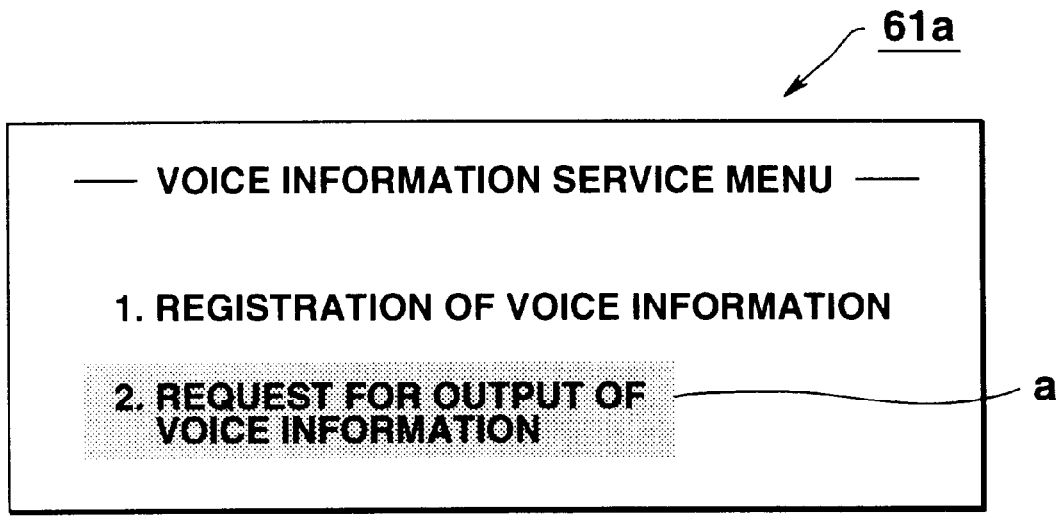
FIG. 21 is a diagram showing an example of a voice information service menu which is displayed on a display section 61a illustrated in FIG. 8 during the control process shown in FIG. 20.
Figure 22:
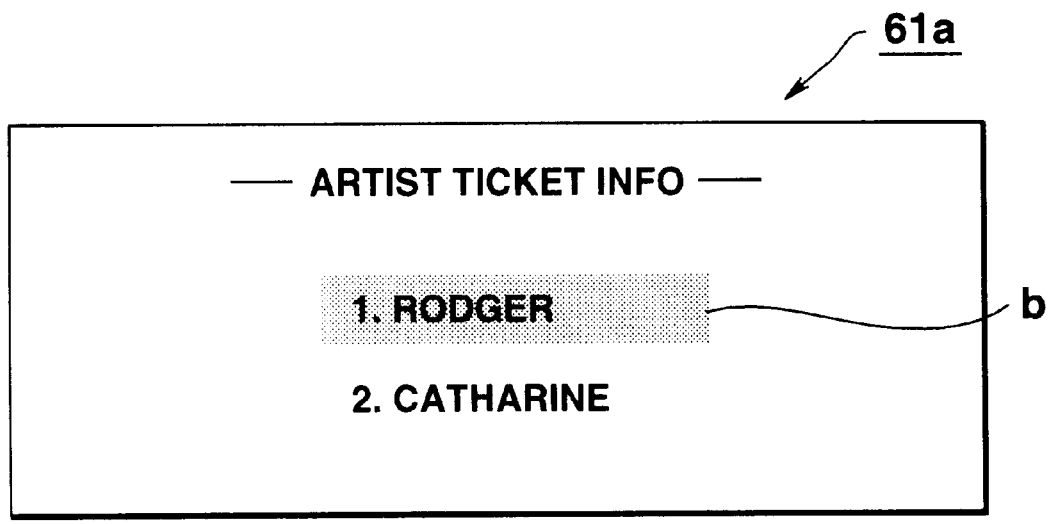
FIG. 22 is a diagram showing an example of a service content which is displayed on the display section 61a illustrated in FIG. 8 in the case where the service content is selected on the voice information service menu shown in FIG. 21.

Then, the control section 67 determines whether the choice selected on the voice information service menu displayed on the display section 61a is the "REGISTRATION OF VOICE INFORMATION" or the "REQUEST FOR OUTPUT OF VOICE INFORMATION" (voice information outputting request) (step S22). The example of the display of the display section 61a, which is shown in FIG. 21, corresponds to the step S22, and the selected choice "REQUEST FOR OUTPUT OF VOICE INFORMATION", represented by a reference character "a", is displayed in reverse. Next, in order to search for the selected choice, the control section 67 refers to the "subaddress data" column of the subaddress registration memory SM of the RAM 72 shown in FIG. 14 and determines if the same subaddress data as received subaddress data have been registered in the subaddress registration memory SM (step S23). As a result of the reference, when the control section 67 determines that the same subaddress data have not been registered, the process shown in FIG. 20 is terminated. When the control section 67 determines that the same subaddress data have been registered, it causes the display section 61a to display a plurality of service contents stored in association with the subaddress data in the "service contents to be displayed" column of the subaddress registration memory SM (step S24). More specifically, as shown in FIG. 22, the item "ARTIST TICKET INFO" stored in association with the address data #C in the "display control contents" column of the display control program memory DM2 shown in FIG. 10, and the names "RODGER" and "CATHARINE" both stored as the choices for the artist ticket information in the "service contents to be displayed" column of the subaddress registration memory SM shown in FIG. 14, are displayed on the display section 61a.

Figure 23:
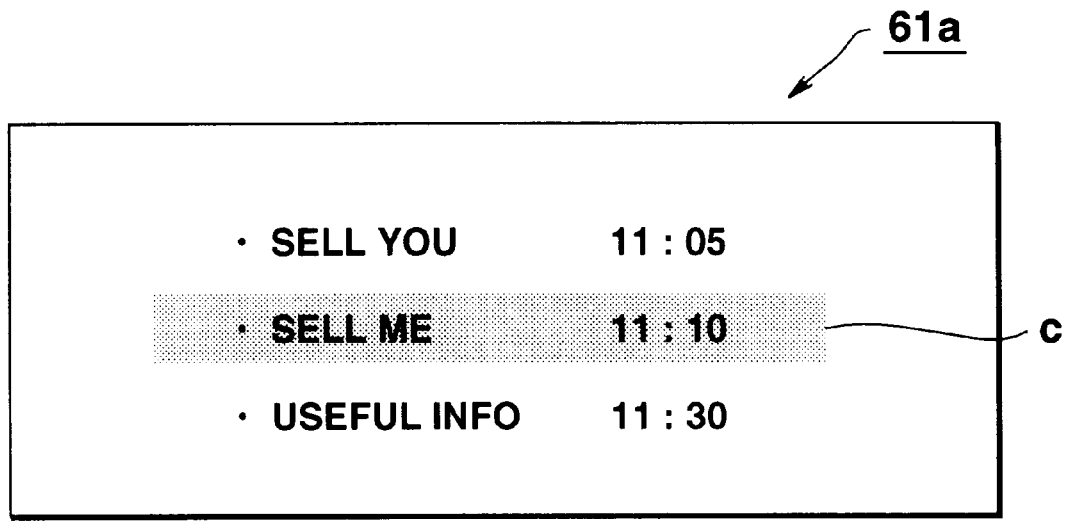
FIG. 23 is a diagram showing the state wherein portions of the received data corresponding to the service content selected in FIG. 22 and the recording times at which the above-mentioned portions have been recorded are being displayed on the display section illustrated in FIG. 8.

Next the control section 67 determines whether a specific one of the service contents displayed on the display section 61a has been selected by a user's operation (step S25). When the control section 67 determines in the step S25 that a specific one of the service contents has been selected (in the example shown in FIG. 23, the choice "1. RODGER" represented by a reference character "b" is selected and displayed in reverse), the control section 67 reads out the subaddress data corresponding to the specific service content (the subaddress data #S corresponding to the selected choice "1. RODGER") from the subaddress registration memory M shown in FIG. 14. The control section 67 reads out the data contents corresponding to the read-out subaddress data from the message memory MM shown in FIG. 19 (the step 26). Specifically, the control section 67 reads out the code data "] ] 0 1", "] ] 0 2" and the free word message data "USEFUL INFO" from the "data content" column of the message memory MM. Then, in accordance with the display control contents stored in the display control program memory DM2 shown in FIG. 11, the control section 67 causes the display section 61a to display a list of portions of the above-described data contents as shown in FIG. 23 (step S27).

To be specific, the heading portions and recording times of the data contents are displayed on the display section 61a in correspondence with the code data "] ] 0 1", "] ] 0 2" and "FREE WORD MESSAGE DATA" stored in the "data content" column in association with the subaddress data #S, and on the basis of the data display contents "[SELL YOU]+RECORDING TIME", "[SELL ME]+RECORDING TIME" and "[USEFUL INFO]+RECORDING TIME" which correspond to the code data "] ] 0 1", "] ] 0 2" and "FREE WORD MESSAGE DATA" stored in the display control memory DM 2 shown in FIG. 11.

Next the control section 67 detects whether one of the data items displayed on the display section 61a is selected (step S28). FIG. 23 shows the case where the data item "SELL ME. 11:00", represented by a reference character "c", is selected and displayed in reverse. In this case, the user needs only touch, with the pen, that part of the touch panel 61a which corresponds to either "SELL YOU. 11:05" or "SELL ME. 11:00" on a data selection menu. When the control section 67 detects the above-described selecting operation, it sets the telephone number "0000-000-0000" of the service center 4, the access No. "0000" and the recording time "11:10 in the transmission data buffer 77 as the firstly transmitted data, the secondly transmitted data and the thirdly transmitted data, respectively. The telephone number "0000-000-0000" is one stored in the display control program memory DM1 of the ROM 71 in association with the address data #C. The access No. "0000" corresponds to the service content (artist name) corresponding to the subaddress data #S read out from the subaddress registration memory SM of the RAM 72. The recording time "11:10" represents the time at which the selected and displayed data item "SELL ME. 11:10" has been recorded.

Then, the control section 67 causes the display section 61a to display all of the data ("ARTIST TICKET INFO", "RODGER" and "SELL ME. 11:00") corresponding to the selected data item "SELL ME. 11:00" (step S29), and determines whether the first depression of the dialer key 62 has been detected (step S30). When the control section 67 detects the first depression of the dialer key 62 in the step S30, it causes the transmission data buffer 77 to output the telephone number "0000-000-000" of the service center 4 which is stored in the transmission data buffer 77. The output telephone number is output as a DTMF sound from the dialer speaker 79 through the D/A converter section 78. The DTMF sound corresponding to the telephone number is sent to the service center 4 through one of the public telephones 1 and the public switched telephone network 2 (step S31).

In response to a calling signal (the DTMF sound corresponding to the telephone number) output from the pager 6, the aforementioned one public telephone 1 and the service center 4 are line-connected via the public switched telephone network 2. When they are line-connected, the service center 4 outputs, to the public telephone 1, the announcement (1): "This is the artist ticket voice information service center. Please input the access No. associated with the desired artist name."

Figure 24:
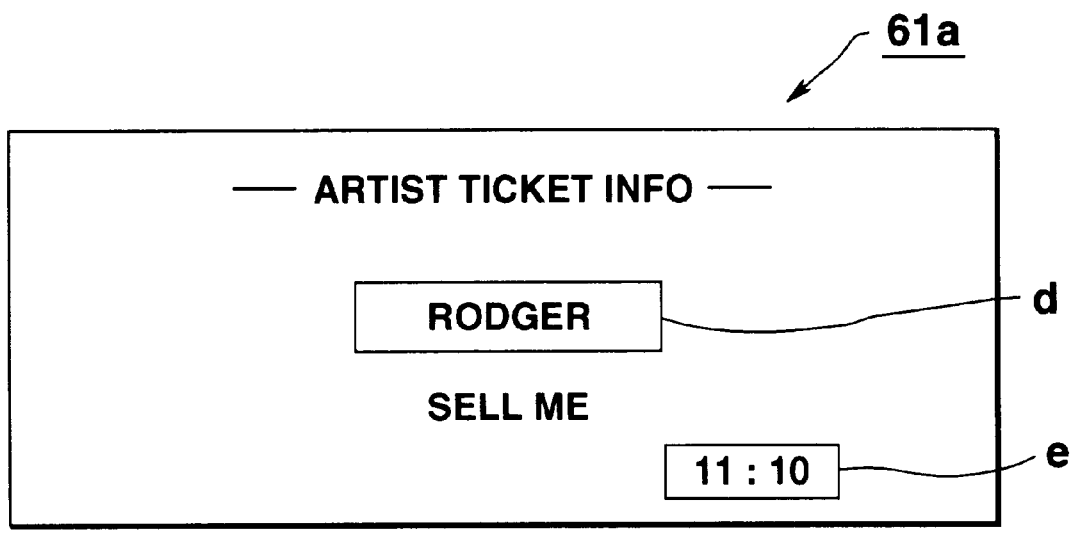
FIG. 24 is a diagram showing what is displayed on the display section 61a illustrated in FIG. 8 on the basis of the service content selected by the steps shown in FIG. 20 and the received data.

Then, the control section 67 causes the service content "RODGER", selected in the step S25 and shown by the reference character "d" on the displayed menu illustrated in FIG. 24, to be displayed in reverse (step S32). After this, the control section 67 determines whether the second depression of the dialer key 62 by the user who listened to the announcement (1) has been detected (step S33). When the control section 67 determines in the step S33 that the second depression of the dialer key 62 has been detected, it causes the transmission data buffer 77 to output the access No. "0000" which is stored in the transmission data buffer 77. The output access No. is output as the DTMF sound from the dialer speaker 79 through the D/A converter 78. The DTMF sound corresponding to the access No. is sent to the service center 4 through the public telephone 1 and the public switched telephone network 2 (step S34).

The service center 4 waits for the input of the access No. from the pager 6 for a predetermined period of time. When the service center 4 detects the output of the access No. from the pager 6, it searches the table memory TM of the voice information management table 46 for the access No. "0000". When the access No. "0000" is not present in the table memory TM, the service center 4 outputs the announcement "there is no corresponding voice information", and ends the processing. When the access No. "0000" is present in the table memory TM, the service center 4 outputs the announcement (2): "Would you please input message or a recording time?".

Following the above, the control section 67 causes the recording time "11:10", represented by the reference character (e) on the displayed menu shown in FIG. 24, to be displayed in reverse (step S35), and determines whether the third depression of the dialer key 62 by the user who listened to the announcement (2) has been detected (step S36). When the control section 67 detects the third depression of the dialer key 62 in the step S36, it causes the transmission data buffer 77 to output the ID data "1110" corresponding to the recording time which is stored therein. The output ID data "1110" is output as the DTMF sound from the dialer speaker 79 through the D/A converter section 78. The DTMF sound corresponding to the ID data is sent to the service center 4 through the public telephone 1 and the public switched telephone network 2 (step S37). Then, the control section 67 ends the process shown in the flowchart.

When the service center 4 receives the ID data corresponding to the recording time from the pager 6, it searches the management table TB1 of the voice information management table 46 for the recording time "11:10". When the recording time "11:10" is not detected in the management table TB1, the service center outputs the announcement "there is no corresponding voice information", and ends the processing. When the recording time "11:10" is detected in the management table TB1, the service center 4 reads out the voice information stored in the voice information database 45, in accordance with a memory address TB1AD2 stored in the "voice information database memory address" column of the management table TB1.

The user of the pager 6 can listen to the voice information concerning "RODGER" by the voice information being received by the public telephone 1 from the service center 4.

In short, when the user of the pager 6 desires to make a request that the service center 4 output the voice information, the line connection to the service center 4, the transmission of the access No. and the transmission of the recording time are automatically performed simply by:

(1) displaying the voice information service menu on the display section 61a by operating the menu/power key 630;
(2) selecting the request for the output of the voice information (the item "REQUEST FOR OUTPUT OF VOICE INFORMATION") by operating the touch panel 61a; and
(3) operating the dialer key 62 three times. Thus, according to the system of the first embodiment, user's operations to make a request for the output of the voice information and to present the voice information are simplified.

In the first embodiment, a request for the output of the voice information as the voice information service is output from the pager 6 to the service center 4. However, the users of the other pages 6' storing the subaddress data #C can also enjoy the voice information service by performing the same operations as those described above.

Thus, in the paging system of the first embodiment, the voice information is stored in the voice information database 45, and the service center 4 having the function of providing the voice information service is newly employed. By using this function, the service center 4 can output the artist ticket voice information "SELL YOU" or "SELL ME" in response to ID information transmitted in the prescribed format.

Moreover, in the first embodiment, the service utilizing two types of code data ("] ] 0 1" and "] ] 0 2") as the ID data have been explained. However, the present invention is not limited to the service utilizing the code data. In the case where such message data as to specify the content of the service information is stored in and managed by both of the service center 4 and the pager 6, the message data selected as the thirdly transmitted data can be set in the transmission data buffer 77 in place of the above-described recording time. In other words, any format of ID data can be used if it can specify the content of the voice information. For example, a keyword and the like can also be adopted. A voice information database memory address which designates the voice information stored in the voice information database 45 of the service center 4 can also be used as the ID data.

In the pager 6 according to the first embodiment, the ROM 71 is provided with the display control program memory DM2 having the "code data" column and the "display control contents" column, and the code data and the display control contents are stored in association with each other. However, it is also possible to provide the RAM 72 with the display control program memory DM2 and to store reception control information in association with the code data desired by the user so that the pager 6 receives the desired code data.

FIG. 25 shows an example of the storage contents of the display control program memory DM2 which are used in that case. In the display control program memory DM2 shown in FIG. 25, the code data "] ] 0 1" and "] ] 0 2" and the "FREE WORD MESSAGE DATA" are stored in a "code data" column, while the flags "1" and "0" are stored in a "reception control flag" column. In this case, the pager 6 can receive only the code data "] ] 0 1" ("SELL YOU") in association with which the reception control flag "1" has been set in the "reception control flag" column. In other words, in the case where the pager 6 receives the code data "] ] 0 1", the item "SELL YOU" is displayed, and code data other than "] ] 0 1" are abandoned.

Moreover, alert control flags corresponding to code data types can be stored, and the alert can be controlled in accordance with the type of the code data set in the subaddress data received by the pager 6. This makes it possible to perform an alert control such as informing the user of the reception of the code data "] ] 0 1" ("SELL YOU") and the reception of the code data "] ] 0 2" ("SELL ME") with different alerting sounds (melodies).

Further, in the case where the voice information is newly registered in the voice information database 45, the time (the output time) which will be required to output that voice information may be measured, and the measured output time may also be transmitted when transmitting the code data. From the output time as transmitted, the user can understand how long the voice information desired by him/her is.

Second Embodiment

The communication system according to the second embodiment of the present invention will now be described with reference to FIGS. 26 to 57.

In the communication system of the second embodiment, a user can confirm, through utilization of the paging system, what data has been directed to the user and stored in a database of the office in which the user is employed, and can download the data stored in the database to a portable terminal or the like after he/she confirms the content of the data.

Figure 26:
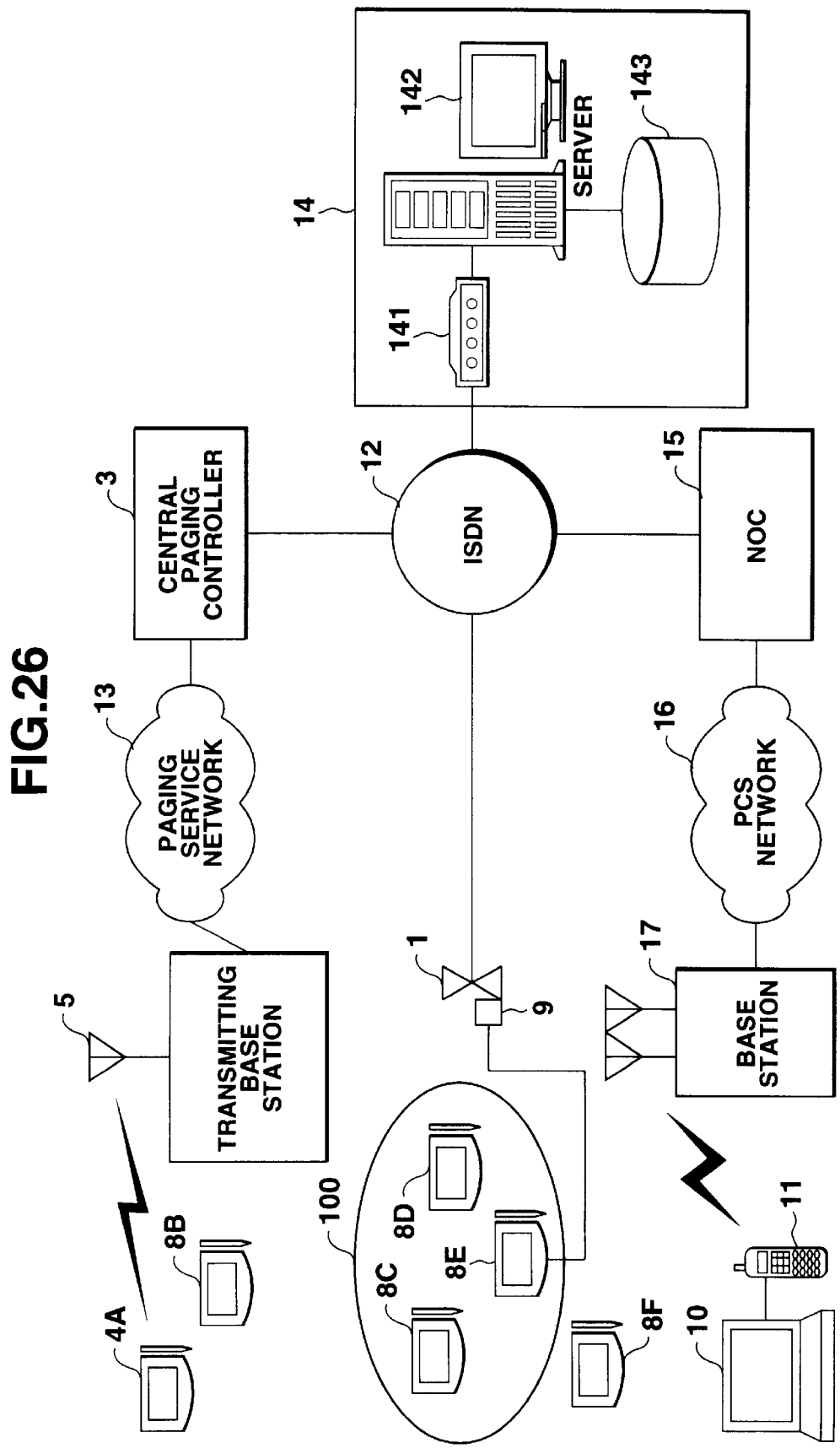
FIG. 26 is a diagram showing the structure of a communication system according to the second embodiment of the present invention.

FIG. 26 is a diagram showing the structure of the communication system according to the second embodiment.

In this communication system, a public telephone 1, a central paging controller 3, an office (data processing system) 14 and an NOC (Network Operating Center) 15 are connected to each other through an IDSN (Integrated Services Digital Network) 12. When the expression " . . . connected to . . . " is hereinafter used thus, this connection indicates a physical connection. If the public telephone 1 and the central paging controller 3, for example, are logically connected to each other via the IDSN 12, such a connection will be hereinafter referred to as the "line connection", as well as in the case of the first embodiment.

Reference characters 8A to 8F represent portable terminals having the functions of pagers and used by staff members of the office 14. The portable terminals 8A to 8F have the same group address. Each of the portable terminals 8A to 8F has at least one subaddress. As will be described later, the portable terminals 8A to 8F determine whether message data transmitted from the server 142 of the office 14 are directed to themselves. When the portable terminals 8A to 8F determines that the message data are directed to themselves, they display messages based on the message data on their display sections. The portable terminals 8C to 8E in a circle represented by reference numeral 100 are used by staff members of sales department 1 of the office 14, and stores the same subaddress (the structure of the portable terminals 8A to 8F will be described later).

Reference numeral 10 denotes a notebook-type personal computer (hereinafter referred to simply as the PC), and a PC card having a paging function is inserted in a PC card slot (not shown). Reference numeral 11 denotes a cellular phone. The PC 10 and the cellular phone 11 are both used by a staff member of the office 14. Reference numeral 9 denotes a modem which enables a data communication between the portable terminal 8E and a server 142.

Figure 27:
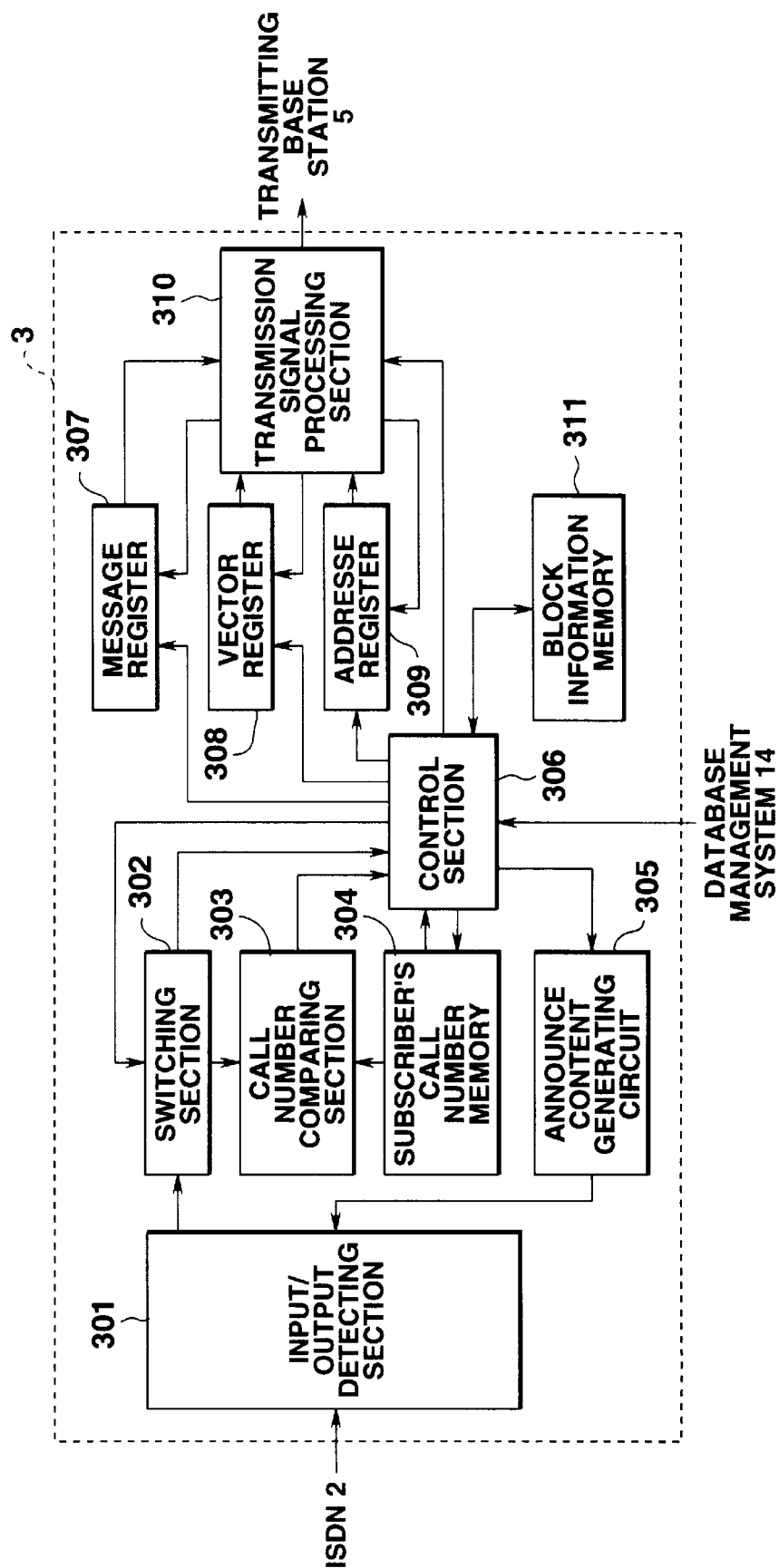
FIG. 27 is a block diagram showing the schematic internal structure of the central paging controller 3 illustrated in FIG. 26.

The central paging controller 3 is connected to the transmitting base station 5 via a paging service network 13. As shown in FIG. 27, the structure of the central paging controller 3 of the second embodiment is substantially the same as that of the first embodiment. However, in the communication system of the second embodiment, when the central paging controller 3 receives a call from the office 14 or is requested to transmit message data, the central paging controller 3 is accessed using a call number corresponding to IP address data with which alphanumeric message data can be transmitted. Referring to the subscriber's call number memory 304, the control circuit 306 determines whether the input/output detecting section 301 has received the IP address. When the control circuit 306 determines that the central paging controller 3 has been accessed using the call number corresponding to the IP address data, the control circuit 306 does not perform any step subsequent to the determining step without outputting an announcement to the announce content generating circuit 305. The input/output detecting section 301 is connected to the ISDN 12, and the control circuit 306 is connected to the modem 141 of the office 14.

The NOC 15 is connected to a base station 17 via a PCS network 16. Therefore, by connecting the cellular telephone 11 and the server 142 to each other, a line connection between the PC 10 and the server 142 is established so that a data communication can be performed between the PC 10 and the server 142.

The office 14 has a data processing system which centrally processes data dealt with in the office 14 and includes the modem 141, the server 142 and the database 143. The server 142, whose main frame is an existing office computer or the like, has the function of managing the database 143 and the function of performing communication through the modem 141.

Figure 28:
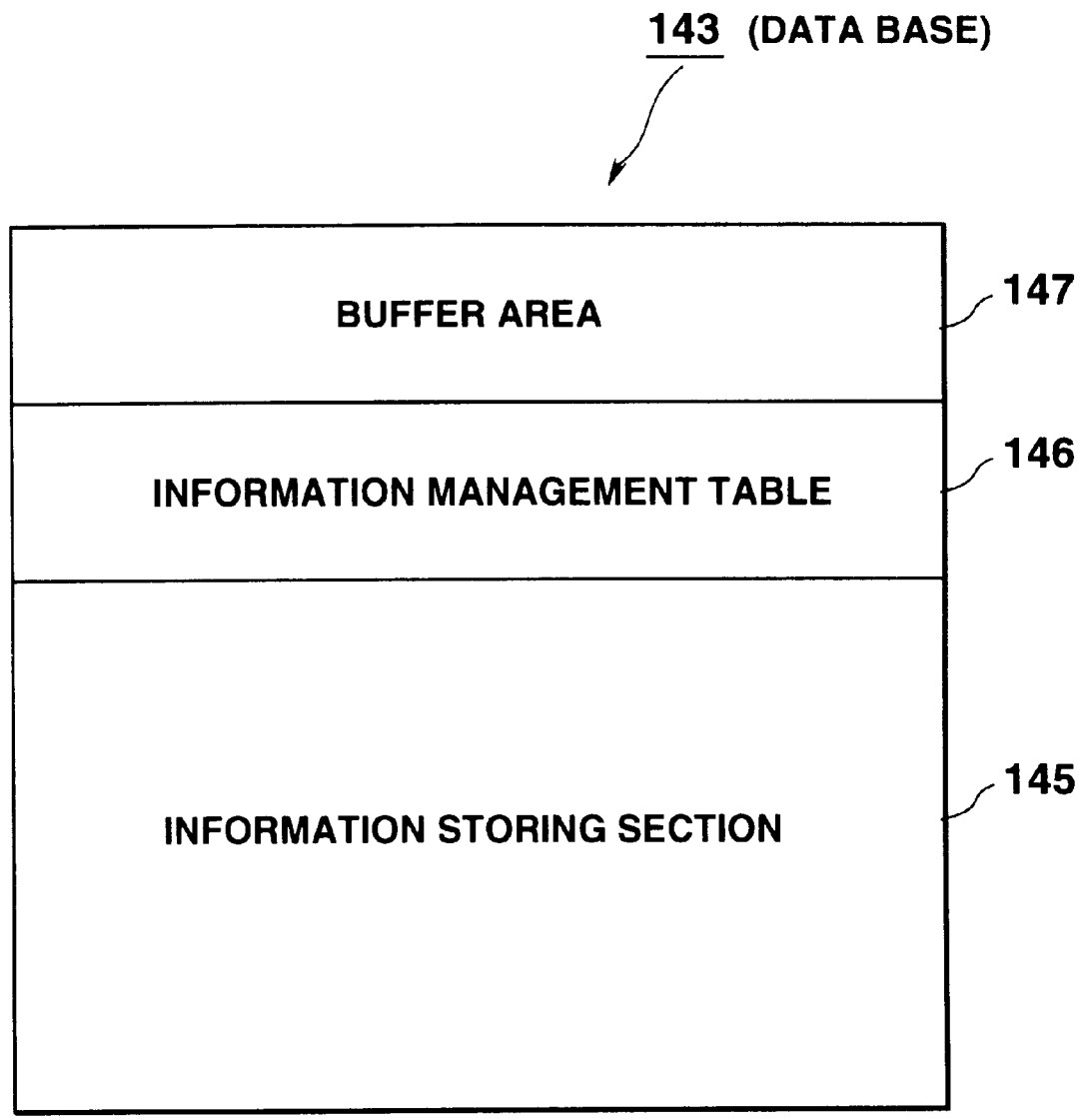
FIG. 28 is a diagram showing the storage contents of a database 143 illustrated in FIG. 26.

As shown in FIG. 28, the database 143 has an information storing section 145, an information management table 146 and a buffer area 147. The information storing section 145 is an area for storing files addressed by the information management table 146 as will be described later, and the area is divided into parts according to the attributes of data files. The buffer area 147 is used to temporarily store data.

Figure 29:
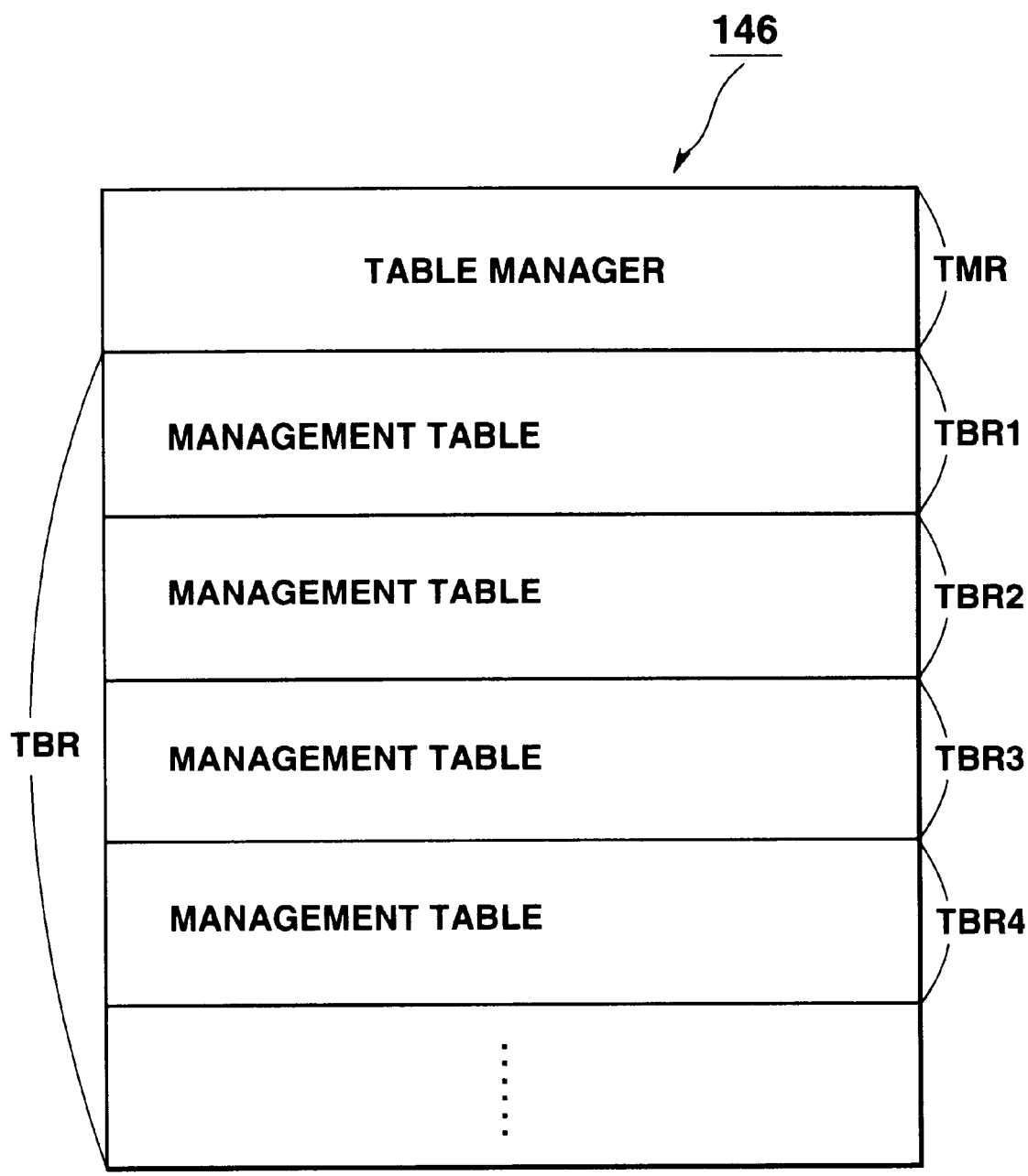
FIG. 29 is a diagram showing the storage contents of an information management table 146 in the database illustrated in FIG. 28.

FIG. 29 shows the storage contents of the information management table 146. As shown in this drawing, the information management table 146 includes areas serving as a table manager TMR and management tables TBR1 to TBR4. The table manager TMR stores management information for managing the management tables TBR1 to TBR4, and the management tables TBR1 to TBR4 store management information for managing the information stored in the information storing section 145. The management tables TBR1 to TBR4 are those divided according to the attributes of the data files to be stored.

FIG. 30 shows the storage contents of the table manager TMR. The table manager TMR has a "code data" column, a "management table No." column and a "data file attribute" column. The "code data" column stores code data serving as ID data for identifying the attributes of the data files. In the example shown in FIG. 30, the code data "]]0 1", "]]0 2", "]]0 3" and "]]0 4" . . . indicate respectively the attributes "sound", "document", "graph" and "image". . . . The "management table No." column stores management table Nos. showing in which of the management tables the information corresponding to the code data stored in the "code data" column is stored. The "data file attribute" column stores the data file attributes ("sound", "document", "table", "image", etc.) corresponding to the code data stored in the "code data" column and the management table Nos. stored in the "management table No." column.

FIG. 31 shows the storage contents of the management table TBR1. The management table TBR1 shown in FIG. 31 is one for managing data files having the attribute "sound", and includes an "access number (2)" column, a "message data" column an "attached file storage address" column, a "filename" column, a "size" column and a "recording time" column. The "access number (2)" column stores access numbers (2) determined in correspondence with the subaddress data as will be explained later. The management table TBR1 is divided into areas in accordance with the access numbers (2). The "message data" column of the management table TBR1 stores the contents of a message data to be transmitted to the portable terminals 8A to 8F. The "attached file storage address" column stores the addresses at which files corresponding to the message data stored in the "message data" column are stored in the information storing section 145. The "filename" column stores the names of the aforementioned files. The "size" column stores information representing the data sizes of the files which are expressed in KB. The "recording time" column stores the times at which the above files have been stored. FIG. 31 shows the condition wherein the file corresponding to the message data "SAMPLING DATA WILL BE SENT" and having a data size of 70 KB was stored at 11:05 in an address of TB1AD1 and as the filename "SAM.WAV". This file name is stored in association with the above message data, the access number (2) "0001", the data size and the recording time.

FIG. 32 shows the storage contents of the management table TBR2. The management table TBR2 of FIG. 32 is one for managing data files having the attribute "document", and includes an "access number (2)" column, a "message data" column, an "attached file storage address" column, a "filename" column, a "size" column and a "recording time" column. The "access number (2)" column of the management table TBR2 stores the access numbers (2). The management table TBR2 is divided into areas in accordance with the access numbers (2). The "message data" column of the management table TBR2 stores the contents of message data to be transmitted to the portable terminals 8A to 8F. The "attached file storage address" column stores the addresses at which files corresponding to the message data stored in the "message data" column are stored in the information storing section 145. The "filename" column stores the names of the aforementioned files. The "size" column stores information representing the data sizes of the files which are expressed in KB. The "recording time" column stores the times at which the above files have been stored. FIG. 32 shows the condition wherein the file corresponding to the message data "CONTENTS OF JUL. 1 E-MAIL" and having a data size of 10 KB was stored at 11:10 in an address of TB2AD1 and as the filename "MAIL.TXT". This filename is stored in association with the above message data, the access number (2) "0001", the data size and the recording time.

FIG. 33 shows the storage contents of the management table TBR3. The management table TBR3 of FIG. 33 is one for managing data files having the attribute "graph" (table calculation), and includes an "access number (2)" column, a "message data" column, an "attached file storage address" column, a "filename" column and a "recording time" column. The "access number (2)" column of the management table TBR3 stores the access numbers (2). The management tableTBR3 is divided into areas in accordance with the access numbers (2). The "message data" column of the management table TBR3 stores the contents of message data to be transmitted to the portable terminals 8A to 8F. The "attached file storage address" column stores the addresses at which files corresponding to the message data stored in the "message data" column are stored in the information storing section 145. The "filename" column stores the names of the aforementioned files. The "size" column stores information representing the data sizes of the files which are expressed in KB. The "recording time" column stores the times at which the above files have been stored. FIG. 33 shows the condition wherein the file corresponding to the message data "CUSTOMER MANAGEMENT TABLE" and having a data size of 10 KB was stored at 11:30 in an address of TB3AD2 and as the filename "CUST.TBL". This filename is stored in association with the above message data, the access number (2) "0001" and the recording time. FIG. 33 also shows the condition wherein the file corresponding to the message data "SALES EVALUATION" and having a data size of 20 KB was stored at 11:25 in an address of TB3AD1 and as the filename "QUO.XLS". This filename is stored in association with the above message data, the access number (2) "0002", the data size and the recording time.

Figure 34:
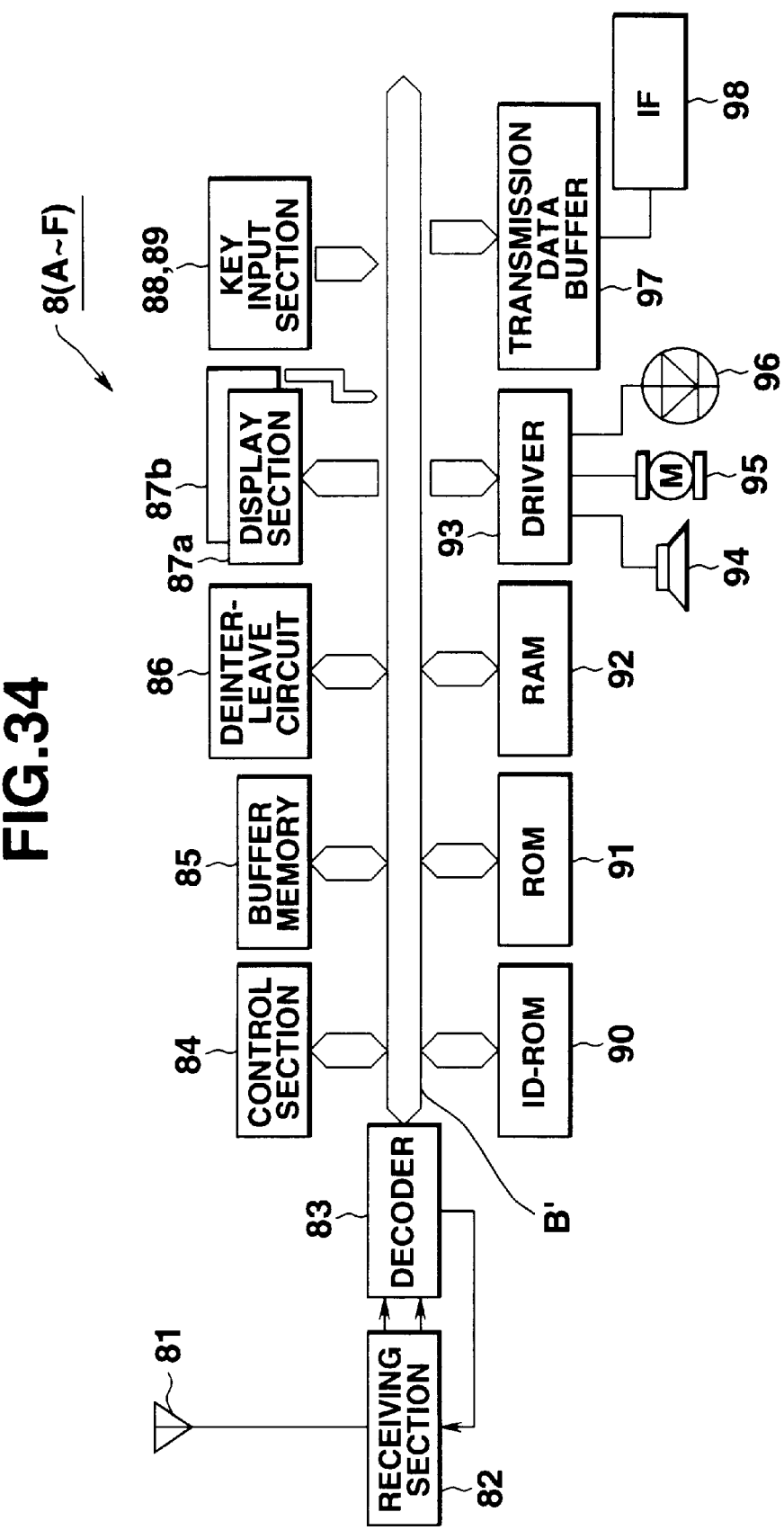
FIG. 34 is a block diagram showing the schematic internal structure of portable terminals 8 illustrated in FIG. 26.

As shown in FIG. 34, each of the portable terminals 8A to 8F includes an antenna 81, a receiving section 82, a decoder 83, a control section 84, a buffer memory 85, a deinterleave circuit 86, a display section 87a, a touch panel section 87b, key input sections 88 and 89, an ID-ROM 90, a ROM 91, a RAM 92, a driver 93, a speaker 94, a vibrator 95, an LED 96, a transmission data buffer 97 and an interface (IF) 98. Connected to a bus B are the decoder 83, the control section 84, the buffer memory 85, the deinterleave circuit 86, the display section 87a, the touch panel section 87b, the key input sections 88 and 89, the ID-ROM 90, the ROM 91, the RAM 92, the driver 93 and the transmission data buffer 77.

The key input section 88 includes a power source key, while the key input section 89 includes a group of mode setting keys for setting the modes of the portable terminals 8, such as a message mode which will be described later.

In response to the operations of the touch panel section 87b and the key input sections 88 and 89, the display section 87a receives display data from the control section 84 and displays images such as characters and figures. When a point designated by coordinates on that part of the display section 87a which displays the content of the desired operation is touched with a pen or the like solely for use to select items or the like on the display section 87a, the touch panel section 87b outputs an operation signal to the control section 84 through the bus B in response to the toughing operation.

Figures 35, 36:
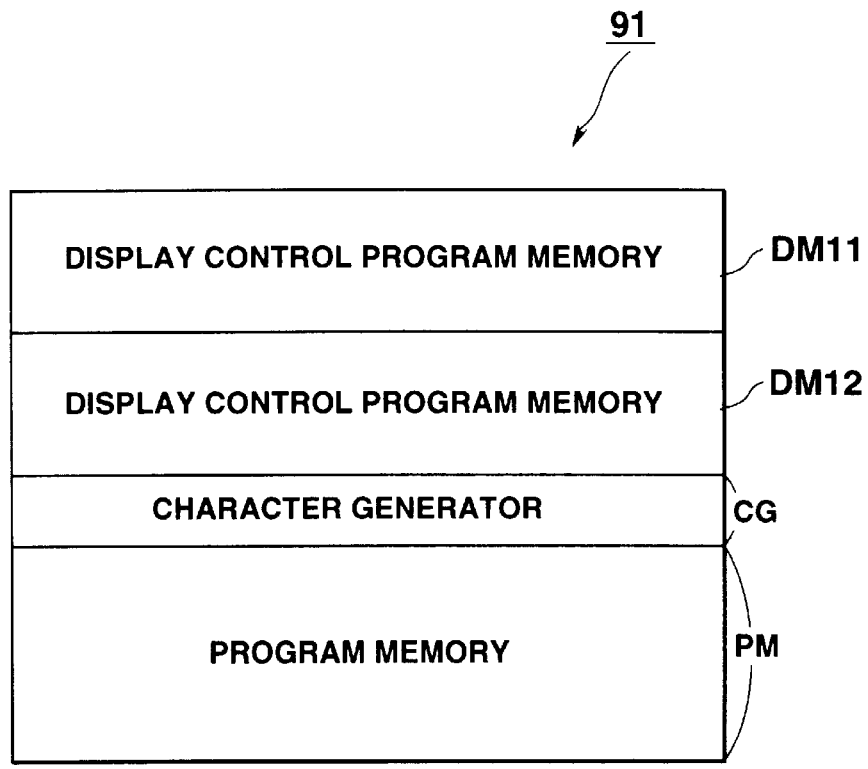
FIG. 35 is a diagram showing the structure of memory areas in a ROM 91 illustrated in FIG. 34.
FIG. 36 is a diagram showing the storage contents of a display control program memory DM11 illustrated in FIG. 35.

The ROM 91 is a nonvolatile memory for storing the display control program executed by the control section 67, other various programs, etc. As shown in FIG. 35, the ROM 91 has memory areas used as a display control program memories DM1 and DM2, a character generator CG and a program memory PM. Not only a processing program shown in a flowchart which will be explained later, but also an application program for the portable terminals 8 is stored in the program memory PM.

FIG. 36 shows the storage contents of the display control program memory DM1. The display control program memory DM1 has an "address data" column, a "display control contents" column and an "access number (1)" column. The address data set in the ID-ROM 70 are stored in the "address data" column. The display control contents corresponding to the received address data are stored in the "display control contents" column. In the example shown in FIG. 36, the display control content "LIGHT UP SEGMENT üuAüv" is stored as one corresponding to the address data A#, the display control content "LIGHT UP SEGMENTüuB üv" is stored as one corresponding to the address data #B, and the display control content "display "intra-office" on the display section 87a " is stored as one corresponding to the address data #C. An access number (1) used to access the database 145 of the office 14 is stored in the "access number (1)" column. In the example shown in FIG. 36, no access numbers (1) are stored in association with the address data #A and #B. However, in association with the address data #C, the line connection number (0000-000-000) used to access the database 145 is stored.

FIG. 37 shows the storage contents of the display control program memory DM2. The display control program memory DM2 shown in FIG. 37 has a "code data" column and a "display control contents" column. The code data "] ] 0 1" to "] ] 0 6" . . . are stored in the "code data" column. Stored in the "display control contents" column are the display control contents "ICON SHOWING SOUND DATA FILE+FILENAME+SIZE (KB)+RECORDING TIME", "ICON SHOWING DOCUMENT DATA FILE+ FILENAME+SIZE (KB)+RECORDING TIME", "ICON SHOWING GRAPH DATA FILE+FILENAME+SIZE (KB)+RECORDING TIME", "ICON SHOWING STILL IMAGE DATA FILE+FILENAME+SIZE (KB)+ RECORDING TIME", "ICON SHOWING MOVING IMAGE DATA FILE+FILENAME+SIZE (KB)+ RECORDING TIME", "ICON SHOWING COMPRESSED LIBRARY DATA FILE+FILENAME+SIZE (KB)+ EXPANDED FILE SIZE (KB)+RECORDING TIME".

Figure 38:
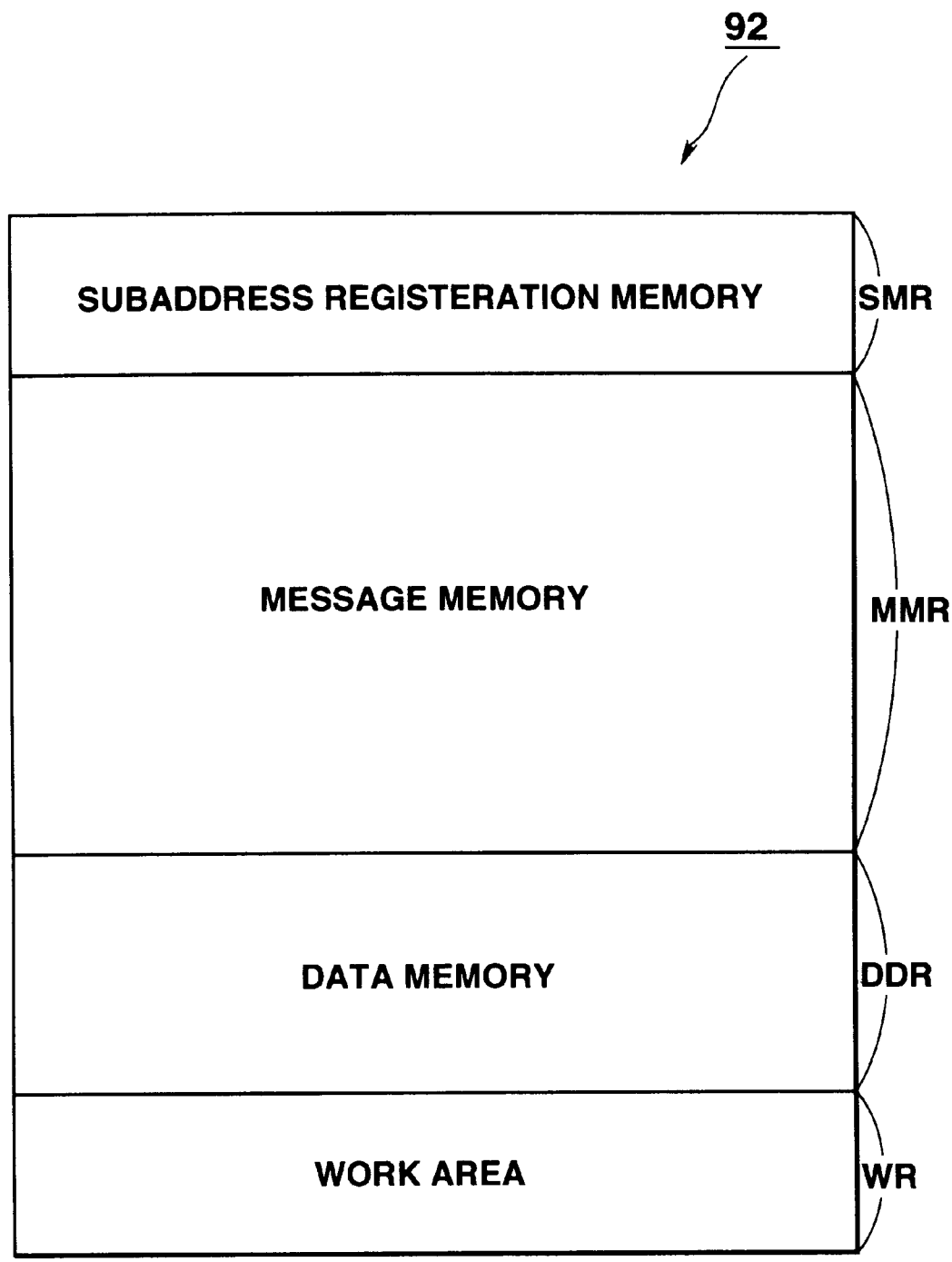
FIG. 38 is a diagram showing the structures of memory areas in a RAM 92 illustrated in FIG. 34.

The RAM 92 illustrated in FIG. 34 is not only used as a work area for the control section 84, but also serves as a storage medium for storing the service contents, received messages, etc. so as to be capable of being rewritten. The RAM 72 includes a subaddress registration memory SMR, a message memory MMR, a data memory DDR and an work area WR, as shown in FIG. 38.

FIG. 39 shows the storage contents of the subaddress registration memory SMR. The subaddress registration memory SMR illustrated in FIG. 39 has a "subaddress data" column, a "contents to be displayed" column and an "access number (2)" column. Subaddress data #S, #T and #U set in the portable terminals 8A to 8F are stored in the "subaddress data" column. The subaddress data stored in that column are all the subaddress data set in the portable terminals 8A to 8F. Part (destination) of a message, displayed as an image as will be described later, is stored in the "contents to be displayed" column. Four-digit access numbers, set in association with the subaddress data and used by the portable terminals 8A to 8F when accessing the server 142 in order to make the server 142 control the management table TB for managing the files stored in the database 143, are stored in the "access number (2)" column.

FIG. 40 shows the storage contents of the message memory MMR. The message memory MMR illustrated in FIG. 40 has a "received address data" column, a "subaddress data" column, a "download confirmation flag" column, a "code data" column, a "filename" column, a "size" column, a "recording time" column, an "receiving time" column and a "message data" column. Of the address data stored in the "address data" column of the display control program memory DM11 or in the ID-ROM 90, those contained in the received message data are stored in the "address data" column of the message memory MMR. Of the subaddress data stored in the subaddress registration memory SMR shown in FIG. 39, those which have been actually received are stored in the "subaddress data" column of the message memory MMR. However, in the case where message data is not that sent from the office 14, no subaddress data is not contained therein and is therefore stored in the "subaddress data" column of the message memory MMR. A flag, which specifies whether a file whose name is stored in the "filename" column has been downloaded to the terminals 8A to 8F from the database 143, is stored in the "download confirmation flag" column of the message memory MMR. The code data corresponding to the message data contained in the message field (MF) 103G transmitted to the portable terminals 8A to 8F are stored In the "code data" column. A filename corresponding to the message data is stored in the "filename" column. The data size of the file having the filename stored in the "filename" column is stored in the "size data" column. The same recording times as those stored in the "recording time" columns of the management tables TBR1 to TBR4 are stored in the "recording time" column. The receiving time at which the message data has been received by the portable terminals 8A to 8F is stored in the "receiving time" column. The contents of a message transmitted to the portable terminals 8A to 8F is stored in the "message data" column of the message memory MMR.

The data memory DDR stores data created/processed by the portable terminals 8A to 8F, with a filename being assigned to the data. Moreover, the data memory DDR has an area for storing a file (attached file) downloaded from the database 143 by a download process which will be described later. This area also stores a data file created/processed by the portable terminals 8A to 8F and which is to be uploaded to the database 143.

The work area WR is one for temporarily storing data which is being processed. In the portable terminals 8, each of the antenna 81, the receiving section 82, the decoder 83, the buffer memory 85, the deinterleave circuit 86, the ID-ROM 90, the driver 93, the speaker 94, the vibrator 95 and the LED 96 has substantially the same structure as its corresponding part of the pager 6 according to the first embodiment.

The operations according to the second embodiment will now be described.

In the second embodiment relating to the communication system, a process for transmitting a message indicating that information has been stored in the database 143 of the office 14 to the portable terminals 8A to 8F and for downloading which the information to the portable terminals 8A to 8F will be explained as an example. Moreover, an explanation will also be made to the case where a message, in the form of an electronic mail or the like in connection with the downloaded information, is uploaded to the database 143 by accessing the server 142.

Figure 41:
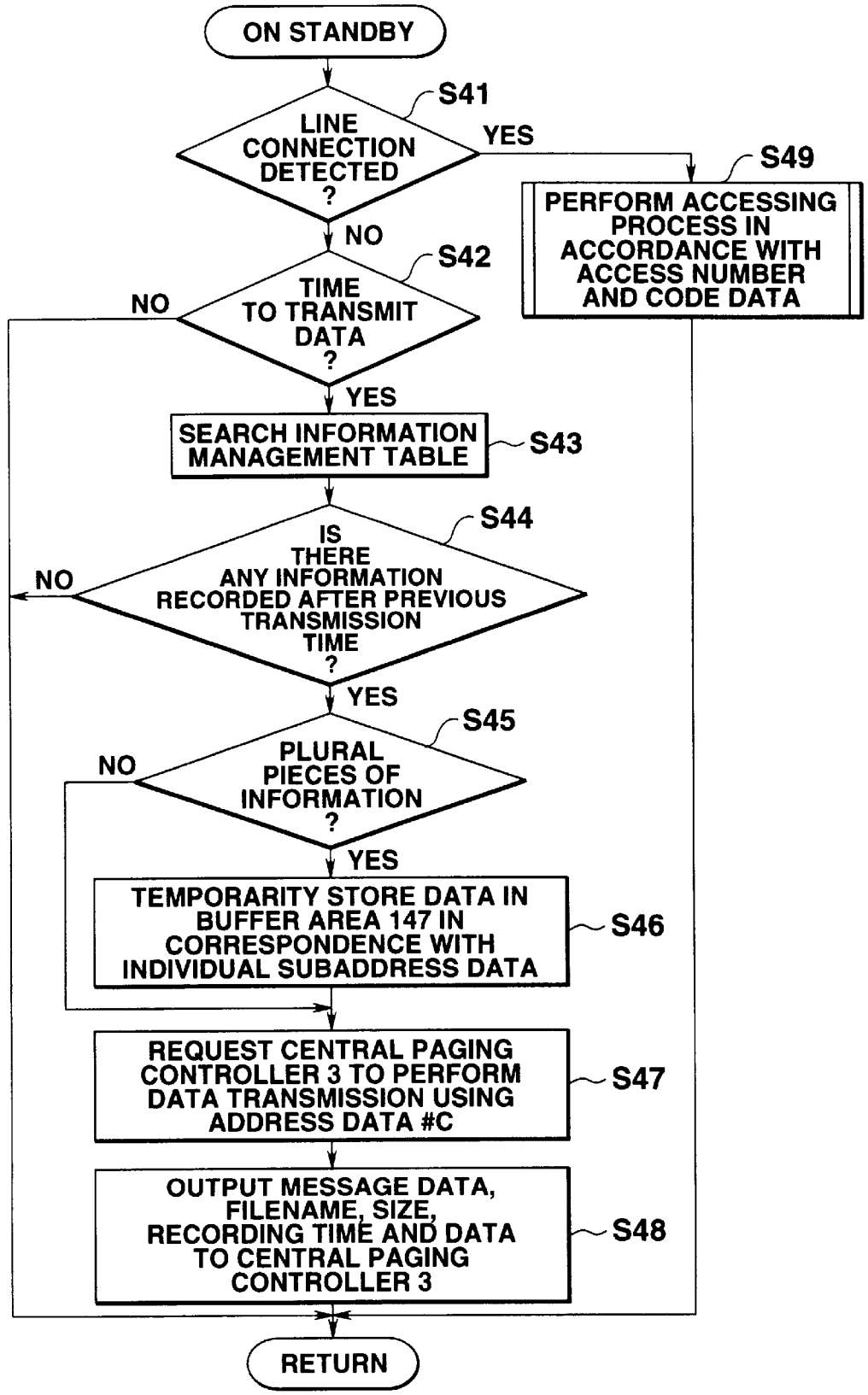
FIG. 41 is a flowchart showing a process executed by a server 142 of an office 14 illustrated in FIG. 26.

First of all, steps automatically executed by the server 142 in the office 14 illustrated in FIG. 26 will be described as a process executed in the communication system, with reference to the flowchart shown in FIG. 41.

The server 142 is operating constantly and are in the standby state of waiting for the ISDN 12 being line-connected thereto. Based on the management information stored in the table manager TMR and management tables TBR of the information management table 14, message data corresponding to the information stored in the information storing section 145 is transmitted simultaneously to the portable terminals 8A to 8C through the central paging controller 3, the paging service network 13 and the transmitting base station 5 at predetermined intervals (of one hour, for example).

The server 142 of the office 14, which is in the above-described standby state in the office 14 determines whether the line connection has been established via the ISDN 12, by determining whether the access number (1) has been input from the input/output detecting section 41 (step S41). When the server 142 does not detect the line connection in the step S41, then the server 142 determines whether it is the time to transmit the code data simultaneously to the portable terminals 8A to 8F (step S42). In the case where the previous transmission time is 11:00, for example, the server 142 determines with reference to the clock section 44 whether it is 12:00. When the server 142 determines in the step S42 that it is not the time to transmit the code data simultaneously to the portable terminals 8A to 8F, the server 142 returns to the standby state. When the server 142 determines in the step S42 that it is the time to transmit the code data simultaneously to the portable terminals 8A to 8F, the control section 43 searches the information management table 146 (step S43). Having searched the information management table 146, the server 142 determines whether there is any information recorded after the previous transmission time (11:00) in the information storing section 145 (step S44). Specifically, the server 142 refers to the recording times stored in the management tables TBR1 to TBR4 . . . , and determines in association with each table whether there is any information recorded after the previous transmission time (11:00).

When the server 142 determines in the step S44 that there is no information recorded after the previous transmission time (11:00), it returns to the standby state. When the server 142 determines in the step S44 that there is any information recorded after the previous transmission time (11:00), then it determines whether there are plural pieces of information recorded after the previous transmission time (11:00), with reference to the management tables TBR1 to TBR4 . . . (step S45). When the server 142 determines in the step S45 that there are not such plural pieces of voice information as a result of the reference to the management tables TBR, the server 142 goes to step S47. When the server 142 determines that there are plural pieces of voice information recorded after the previous transmission time (11:00), it causes the buffer area 147 to temporarily store, in association with the individual subaddress data, the data corresponding to the plural pieces of information and code data stored in the table manager TMR (step S46). The above-mentioned data corresponding to the plural pieces of information are message data, filenames, data sizes and recording times, all being stored in the management table TBR.

Let it be assumed that the management tables TB1 to TB4 . . . of the management table 146 at that time (12:00) are in the state of having stored newly recorded message data, attached file storage addresses, filenames, data sizes and recording times as shown in FIGS. 31 to 33.

The server 142 sends out data requesting the central paging controller 3 to perform the data transmission using the address data #C (IP address and the group address assigned to the portable terminals 8A to 8F) to the central paging controller 3 through an ISDN 12 (step S47). The message data, the filenames, the data sizes, the recording times and the code data, which have been all stored in the transmission data buffer 147 in the step S46, are sent to the central paging controller 3 (step S48). Then, the process shown in the flowchart of FIG. 41 ends.

The central paging controller 3 processes serial data transmitted from the data processing system in the step S4, and transmits the processed data through the transmitting station 5 to the portable terminals 8A to 8F storing the address data #C.

Figure 42:
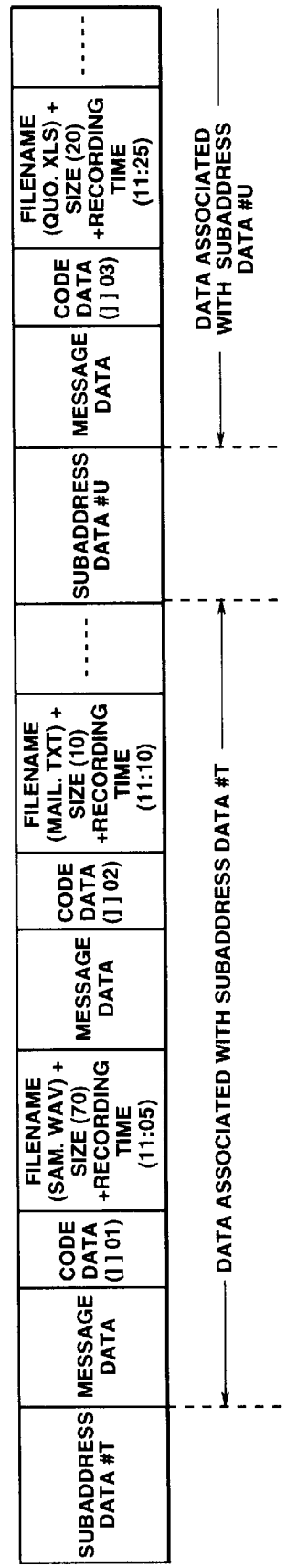
FIG. 42 is a diagram showing the content of data output from the office 14 to the central paging controller 3 and stored in the message field (MF) 103G, in accordance with the processing performed by the server 142 illustrated in FIG. 41.

FIG. 42 shows the data structure of the message field (MF) 103G transmitted from the central paging controller 3. As shown in this drawing, data items each consisting of at least one group, which is formed of message data, code data, a filename, size data and a recording time, are stored each in association with one of subaddresses.

The portable terminals 8A to 8F receive data transmitted from the central paging controller 3. The data receiving process performed by the portable terminals 8A to 8F is substantially the same as that (FIG. 18) performed by the pagers 6 and 6' in the first embodiment.

Figure 44:
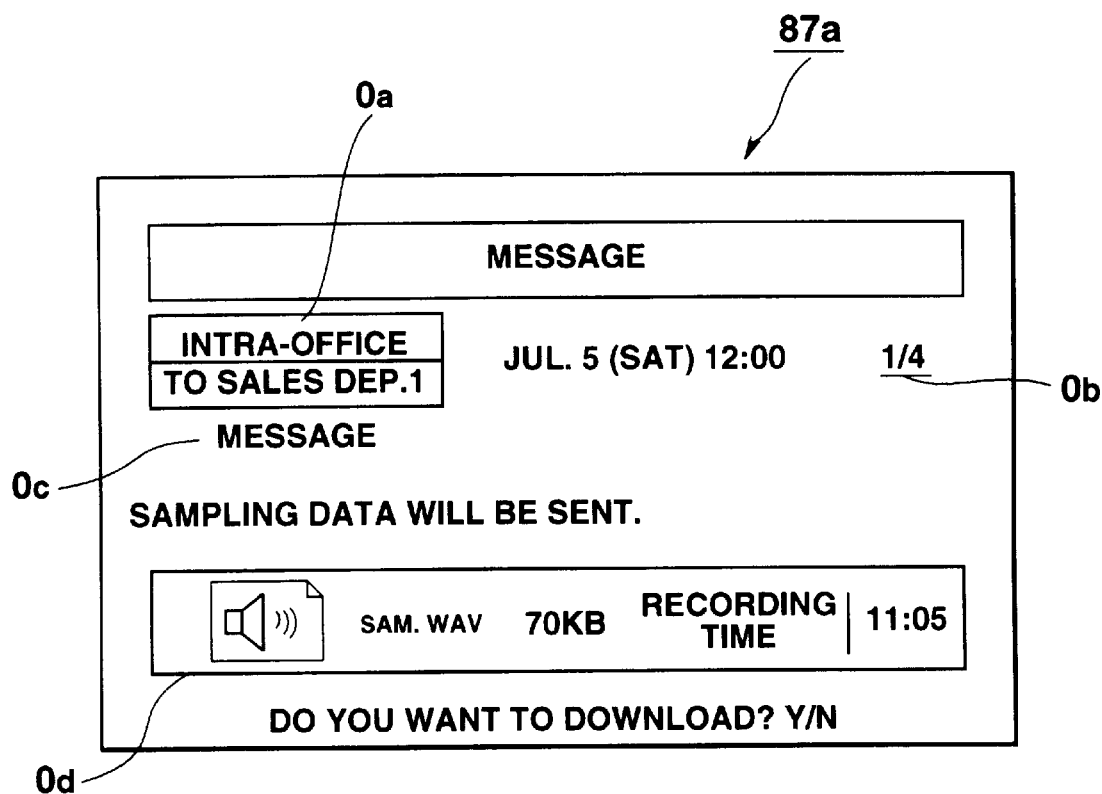
FIG. 44 is a diagram showing an example of a message displayed on a display section 87a illustrated in FIG. 34 during the receiving process performed by a control section illustrated in FIG. 34.

In the above receiving process, data such as those shown in FIG. 43 are stored in the message memory MMR of the RAM 92 in the portable terminal 8E, for example. The portable terminal 8E performs the display control process (FIG. 18; the step S15) on the basis of the data stored in the message memory MMR as shown in FIG. 43, and the display section 87a of the portable terminal 8E displays the image shown in FIG. 44. The image displayed based on the received data will now be explained. In FIG. 44, reference character Oa indicates the destination of a message (in the example shown in FIG. 44, the message is directed to the staff members of sales department 1), based on the subaddress data. Reference character 0b indicates the number of messages which have arrived the portable terminal 8E simultaneously and the ordinal number of the message which is being currently displayed (in the example shown in FIG. 44, the currently displayed message is the first one of four messages). Reference character 0c indicates the content of the received message data (in the example shown in FIG. 44, the display section 87a displays the content "SAMPLING DATA WILL BE SENT"). Reference character 0d indicates, of the display control contents stored in the display control memory DM12, the display control content corresponding to the received code data. In the example shown in FIG. 14, the display section 87a displays an icon representing sound data, the filename "SAM.WAV", the data size "70 KB" and the recording time "11:05." Moreover, the display section 87a displays the title "MESSAGE" the message reception date and a sentence for designating the download of information from the database 43 in the readout mode which will be described later.

A process for downloading the file stored in the database 143 to the portable terminals 8A to 8F which have received a message and a process for uploading data such as another message to the database 143 from the portable terminals 8A to 8F in response to the downloaded data will now be described. In the following, the portable terminal 8E is exemplified as one which performs the above-mentioned processes. However, the other portable terminals can also perform the above processes.

Figure 45:
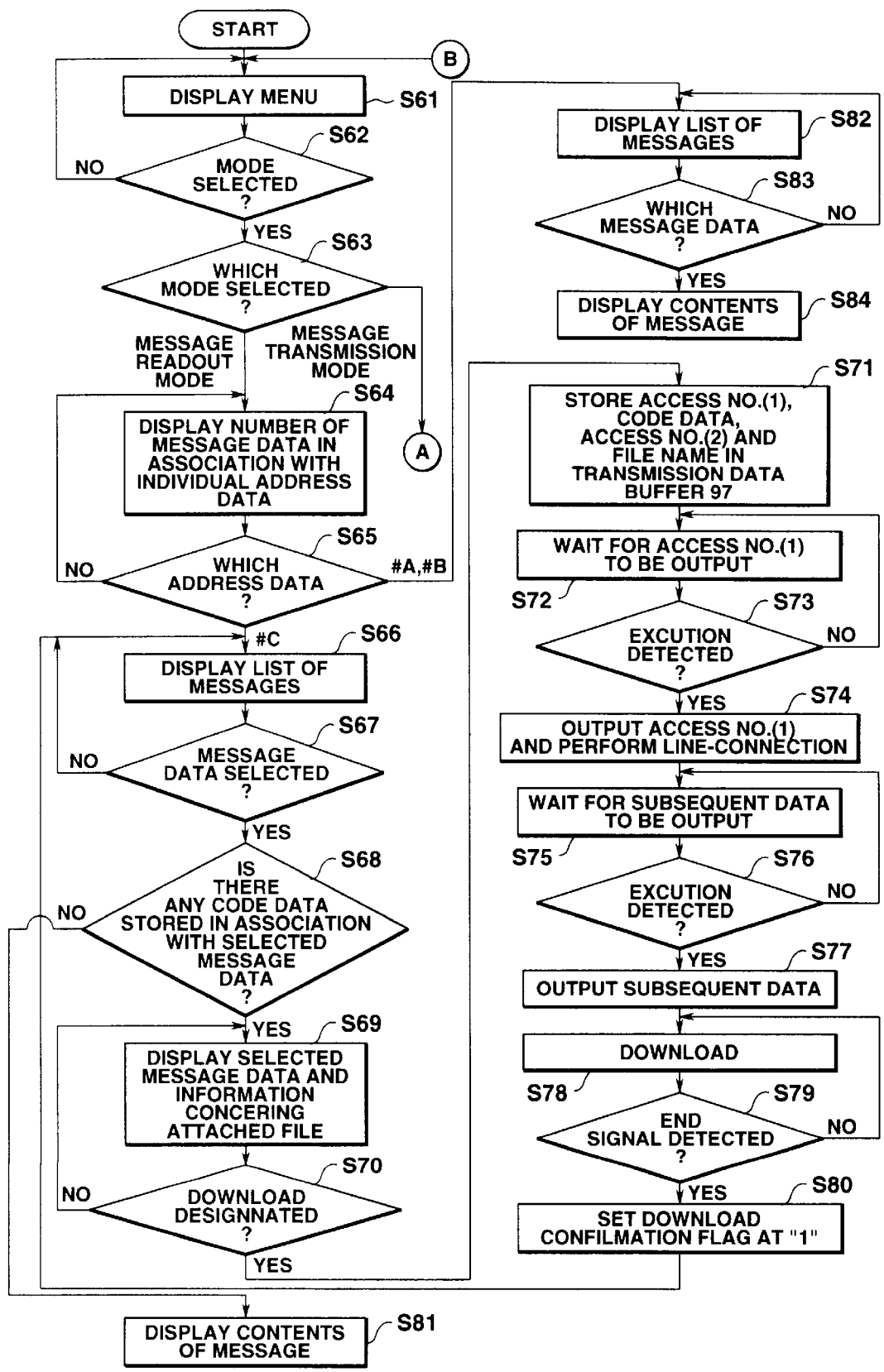
FIG. 45 is a flowchart showing what steps the control section illustrated in FIG. 34 executes when detecting a mode selection and what steps the above control section executes during a readout mode.
Figure 46:
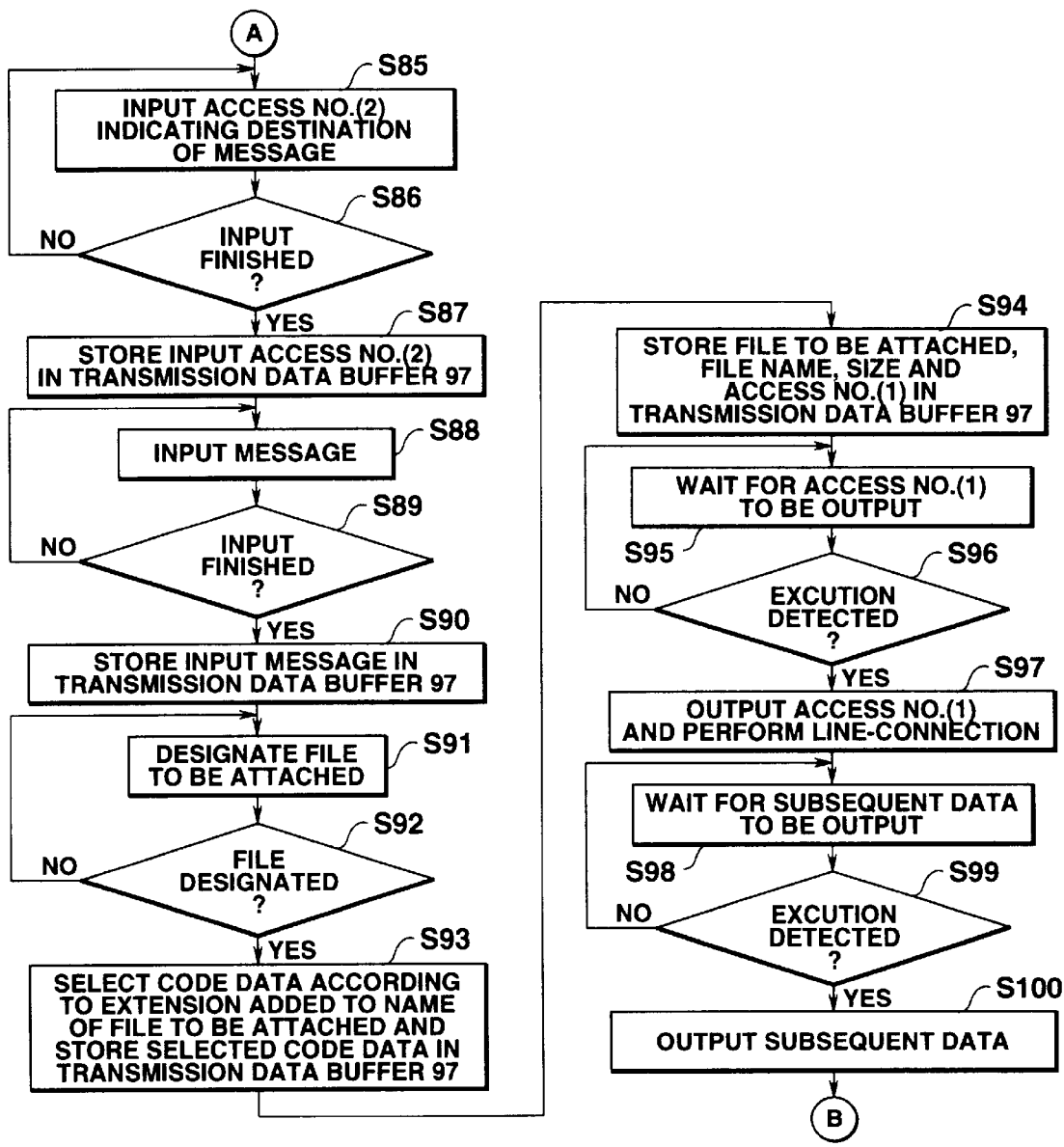
FIG. 46 is a flowchart showing what steps the control section illustrated in FIG. 34 executes during a message transmission mode.

FIG. 45 is a flowchart showing what steps the control section 84 of the portable terminal 8E executes when detecting a mode selection and what steps the above control section executes during the message readout mode. FIG. 46 is a flowchart showing what steps the control section 84 of the portable terminal 8E executes during the message transmission mode. The processes shown in those flowcharts start when the user of the portable terminal 8E operates the key input section 89. Let it be assumed that the portable terminal 8E at that time is in the state of being connected to the ISDN 12 through the modem 9. Further, let it be assumed that the file to be transmitted to the server 142 has already been created and stored in the data memory DDR of the RAM 92 of the portable terminal 8E when the process shown in FIG. 46 starts.

Figure 47:
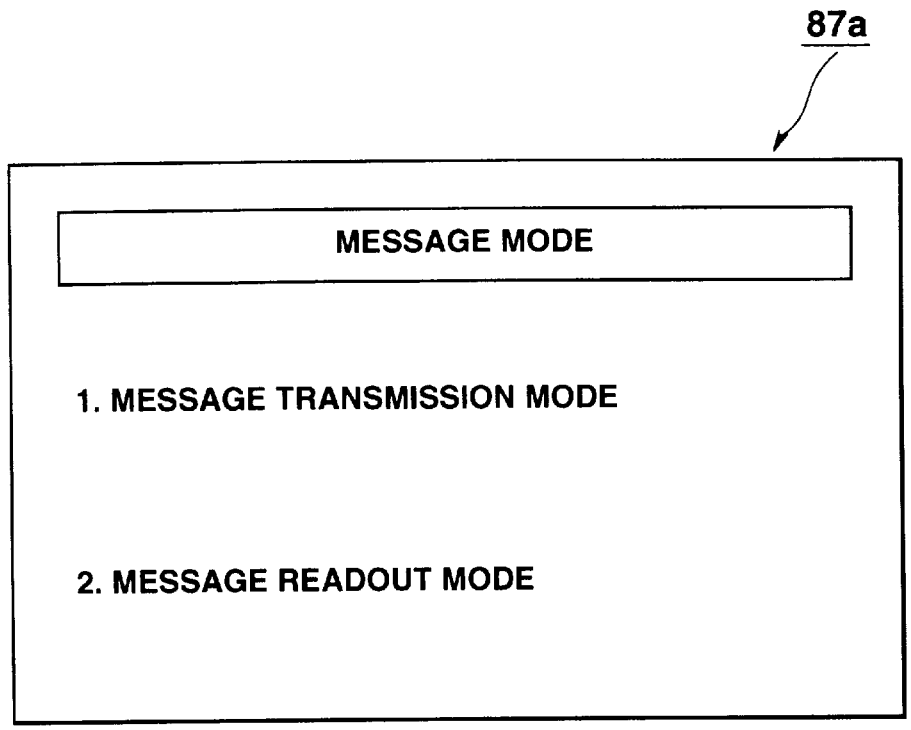
FIG. 47 is a diagram illustrating an image which is displayed on the display section 87a by step S61 shown in FIG. 45.

When the process shown in FIG. 45 starts, the control section 84 causes the display section 87a to display a menu for selecting one of the modes shown in FIG. 47, i.e., the "1. MESSAGE TRANSMISSION MODE" and the "2. MESSAGE READOUT MODE" (step S61). In this state, the control section 84 detects whether one of those portions of the touch panel 87b which display the above two modes has been touched with the pen, thereby determining whether the selection of one mode has been detected (step S62). Until determining that the mode selection has been detected, the control section 84 repeats the steps 61 and S62. When the control section 84 determines in the step S62 that the mode selection has been detected, it determines which of the "MESSAGE TRANSMISSION MODE" and the "MESSAGE READOUT MODE" has been selected (step S63). When the control section 84 determines in the step S63 that the "MESSAGE READOUT MODE" has been selected, it goes to step 64. Meanwhile, when the control section 84 determines in the step S63 that the "MESSAGE TRANSMISSION MODE" has been selected, it goes to step S85 shown in FIG. 46.

Figure 48:
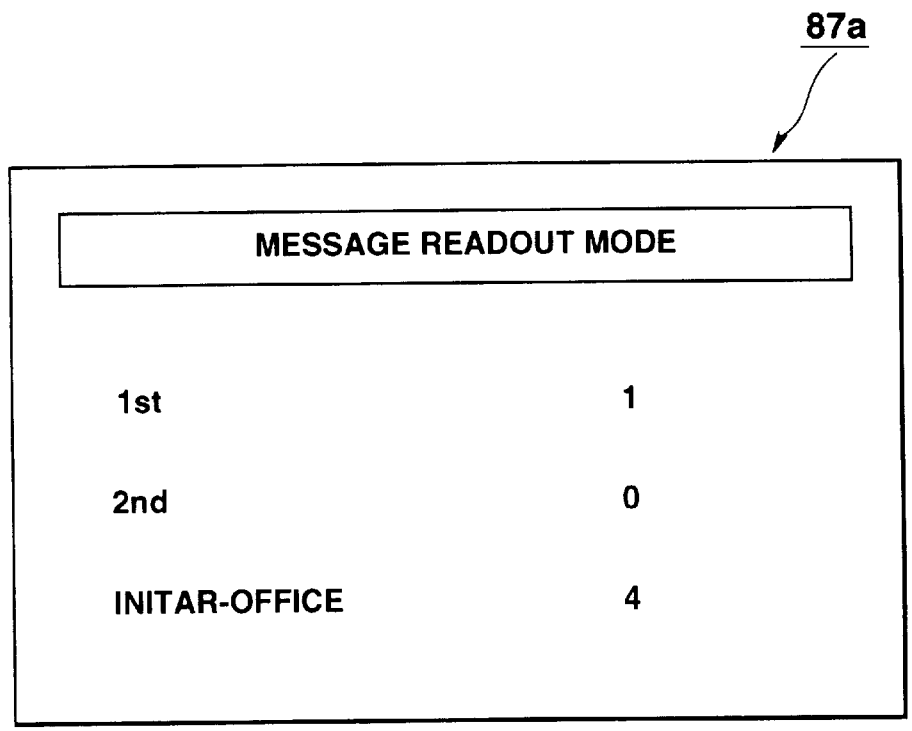
FIG. 48 is a diagram illustrating an image which is displayed on the display section 87a by step S64 shown in FIG. 45.

In the step S64, the control section 84 causes the display section 87a to display the number of received message data in association with the individual address data, as shown in FIG. 48. The message memory MMR stores the message data as shown in FIG. 43, and in the example shown in FIG. 48, the display section 87 displays that one message has been received in association with the first address data (#A), no message has been received in association with the second address data (#B), and four messages have been received in association with the intra-office address (#C). Next the control section 84 determines whether any address data has been selected from those displayed on the display section 87a, by a corresponding part of the touch panel section 87b being touched with the pen by the user of the portable terminal 8E (step S65). When the control section 84 determines in the step S65 that the address data #C has been selected, it goes to step S66. When the control section 84 determines in the step S65 that either the address data #A or #B has been selected, it goes to step S82 which will be described later. When the control section 84 determines in the step S65 that no address data has been selected, it repeats the steps S64 and S65.

In the step S66, as shown in FIG. 49, the control section 84 causes the display section 87a to display all of the messages corresponding to the selected address. data #C in the form of a list. Displayed on the left side of each message in the list are a check box and its destination A check mark is displayed in the check box in the case where a download confirmation flag has been set in the message memory MMR. One of the items "OFFICE" (all staff members), "SALES DEP.1" (sales department 1) and "PERSONAL" (the user of the portable terminal) is displayed as the destination on the basis of the subaddress data stored in the message memory MMR. Then, the control section 84 determines whether the user of the portable terminal 8E has touched that part of the touch panel section 87b which displays one of the messages with the pen, whereby determining whether one message has been selected from those displayed on the touch panel section 87b (step S67). When the control section 84 determines in the step S67 that no message data has been selected, it repeats the steps S66 and 67. When the control section 84 determines in the step S67 that one message has been selected from those displayed on the display section 87a, the control section 84 determines whether code data has been stored in the message memory MMR in association with the selected message (step S68).

When the control section 84 determines in the step S68 that such code data has been stored, it causes the display section 87a to display, together with the message selected in the step S67, the information concerning the file corresponding thereto. The image displayed on the display section 87a in that case is the same as that shown in FIG. 44 (step S69). Then, the control section 84 determines whether download has been designated, in other words, whether the user has touched that part of the touch panel section 87b which displays "Y", in response to the question that "DO YOU WANT TO DOWNLOAD?" shown in FIG. 50 (step S70). When the control section 84 determines in the step S70 that download has not been designated, it repeats the steps S69 and 70.

Figure 51:
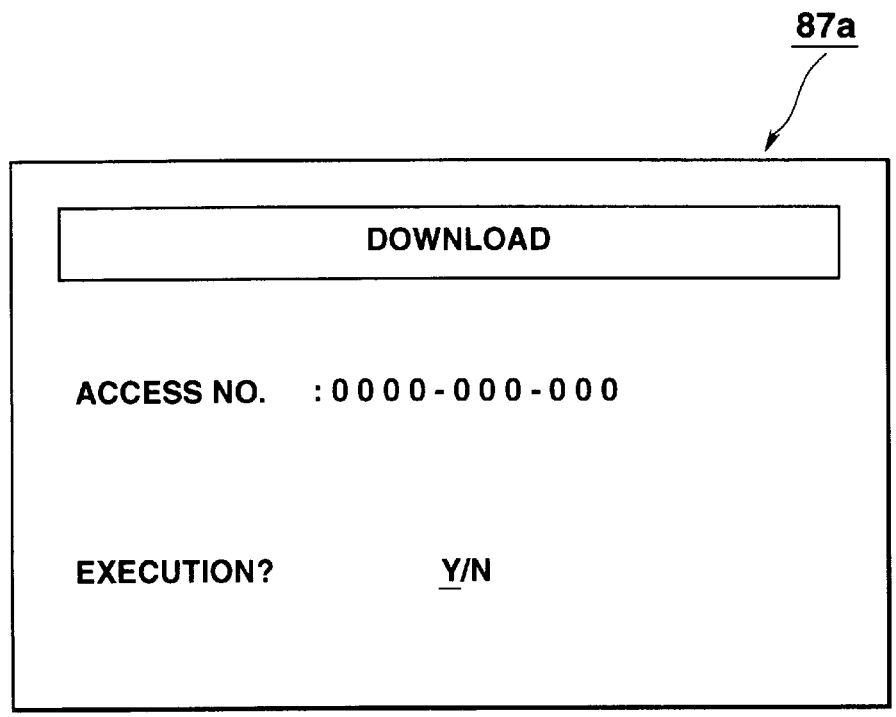
FIG. 51 is a diagram illustrating an image which is displayed on the display section 87a by steps S71 and S72 shown in FIG. 45.

When the control section 84 determines in the step S69 that download has been designated, it reads out the access number (1) "0000-000-0000" stored in the display control program memory DM11 in association with the address data #C, and causes the transmission data buffer 97 to store the read-out access number (1). Moreover, the control section 84 reads out, from the message memory MMR, the code data, access number (2) and filename which correspond to the message selected in the step S67, and causes the transmission data buffer 97 to store the read-out code data, access number (2) and filename (step S71). Next the control section 84 causes the display section 87a to display the image indicating that the portable terminal 8E is ready to output the access number (1), as shown in FIG. 51 (step S72). In this state, the control section 84 detects whether the execution of the output of the access number (1) has been determined, in other words, whether the user has touched that part of the touch panel section 87b which displays "Y" with the pen in response to the question "EXECUTION?" shown in FIG. 51 (step S73). When the control section 84 detects in the step S73 that the execution of the output of the access number (1) has not been determined, it repeats the steps S72 and S73. When the control section 84 detects in the step S73 that the execution of the output of the access number (1) has been determined, it makes the access number (1) output from the portable terminal 8E so that the portable terminal BE is line-connected to the server 142 of the office 14 via the modem 9 and the ISDN 12. When the control section 84 detects the line connection, it goes to step S74.

Figure 52:
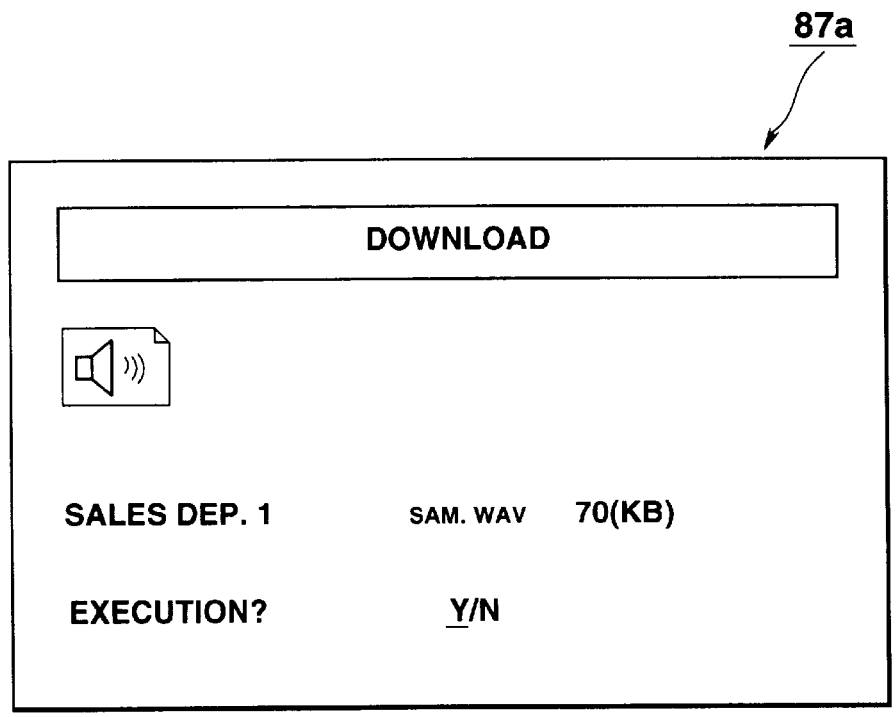
FIG. 52 is a diagram illustrating an image which is displayed on the display section 87a by steps S74 and S75 shown in FIG. 45.

In the step S74, the control section 84 causes the display section 87a to display the image indicating that the portable terminal 8E is ready to output the subsequent data, i.e., the code data, the access number (2) and the filename, as shown in FIG. 52 (step S75). In this state, the control section 84 detects whether the execution of the output of the above-described subsequent data has been determined, in other words, whether the user has touched that part of the touch panel 87b which displays "Y" with the pen in response to the question "EXECUTION?" shown in FIG. 52 (step S76). When the control section 84 detects in the step S76 that the execution of the output of the aforementioned subsequent data has not been determined, it repeats the steps S75 and S76. When the control section 84 detects in the step S76 that the execution of the output of the aforementioned subsequent data has been determined, it causes the transmission data buffer 97 to sequentially output the above subsequent data stored therein to the server 142 of the office 14 through the interface 98, the modem 9 and the ISDN 12 (step S77).

When the subsequent data is output to the server of the office 14 in the step S77, the server 142 of the office 14 reads out the corresponding file from the database 143, and starts transmitting the file through the modem 141 and the ISDN 12, thereby initiating the download of the file to the portable terminal 8E (step S78).

Figure 53:
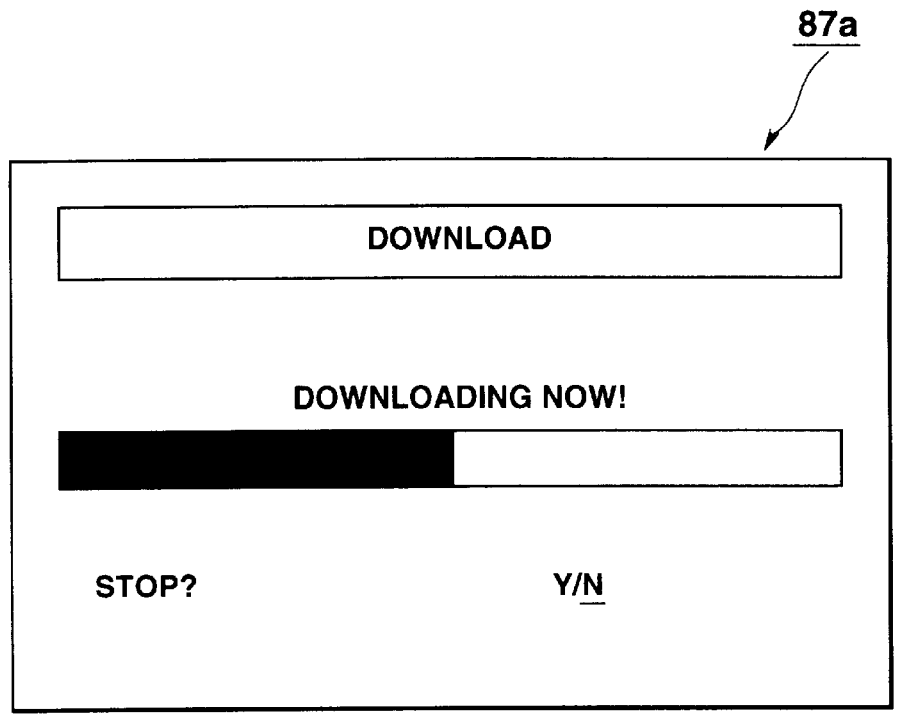
FIG. 53 is a diagram illustrating an image which is displayed on the display section 87a by step S77 shown in FIG. 45.
Figure 54:
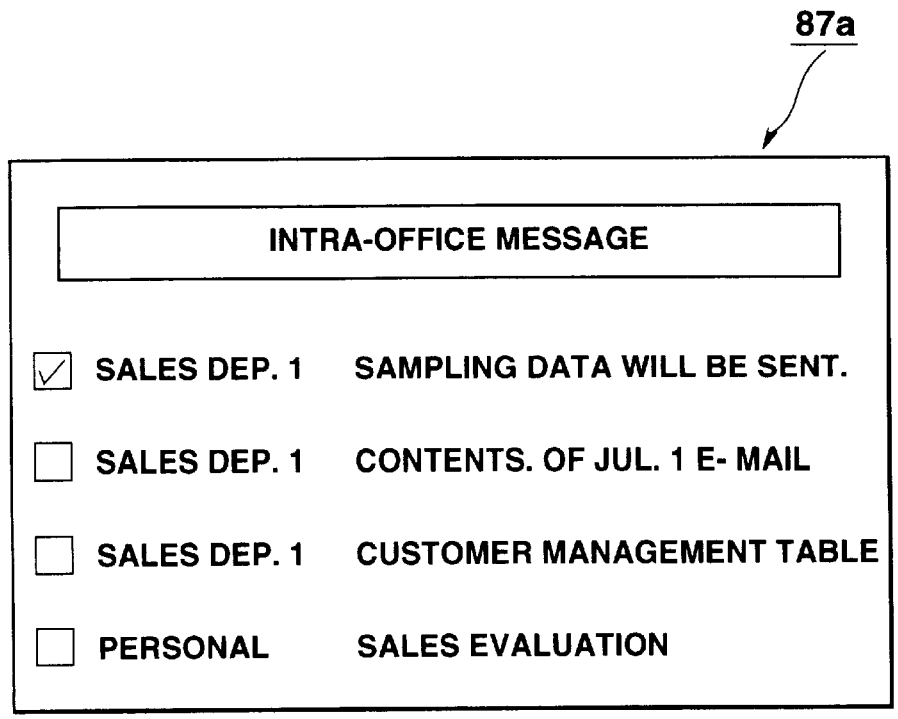
FIG. 54 is a diagram illustrating an image which is displayed on the display section 87a when returning to step S66 from step S80 shown in FIG. 45.

When the download is initiated, the control section 84 causes the display section 87a to display the image which indicates, by showing the amount of downloaded data, that the download is being executed, as shown in FIG. 53. While the display section 87a is displaying the above image, the control section 84 determines whether an end signal representing the completion of the download has been detected (step S79). When the control section 84 determines in the step S79 that the end signal has not been detected, it repeats the steps S78 and S79. When the control section 84 determines in the step S79 that the end signal has been detected, it sets the corresponding confirmation flag F stored in the message memory MMR at "1" (step S80), and returns to the step S66. At that time, as shown in FIG. 54, the check mark is marked in the check box corresponding to the message "SAMPLING DATA WILL BE SENT" in the list of the messages displayed on the display section 87a.

When the control section 84 determines in the step S68 that the code data has not been stored, it causes the display section 87a to display the contents of the message (step S81). When the key input section 89 is operated under this condition, an interruption occurs in the control section 84 such that the control section 84 ends the process shown in the flowchart of FIG. 45.

In the step S82, the control section 84 causes the display section 87a to display the list of the messages corresponding to the selected address data, as in the case of the step S66. However, as regards any message received in association with the address data #A or #B, there is no corresponding file in the database 143, and consequently no check box is displayed unlike in the case of the list shown in FIG. 49. Next the control section 84 determines whether the user of the portable terminal 8E has touched that part of the display section 87a which displays one of the messages with the pen, thereby determining whether one message has been selected from those display section 87a (step S83). When the control section 84 determines in the step S83 that no message has been selected, it repeats the steps S82 and S83. When the control section 84 determines in the step S83 that one message has been selected, it causes the display section 87a to display the contents of the message (step S84). When the key input section 89 is operated under that condition, an interruption occurs in the control section 84 such that the control section 84 ends the process shown in the flowchart of FIG. 45.

In the step S85 shown in FIG. 46, an image for inputting the access number (2) specifying the destination of a message is displayed on the display section 87a. While viewing this image, the user of the portable terminal 8E touches the touch panel section 87b with the pen, thereby inputting the access number (2) specifying the destination of the message. When finishing the input of the access number (2), the user of the portable terminal 8E touches a box indicating the completion of the input and displayed on the touch panel section 87b. The control section 84 determines whether the user has touched the box displayed on the touch panel section 87b, thereby determining whether the input has been finished (step S86). Until the control section 84 determines in the step S86 that the input has been finished, it repeats the steps S85 and S86. When the control section 84 determines in the step S86 that the input has been finished, it causes the transmission data buffer 97 to store the access number (2) input in the step S85 (step S87).

Next an image for inputting the message is displayed on the display section 87a. While viewing this image, the user of the portable terminal 8E touches the touch panel section 87b with the pen, thereby inputting the message (step S88). When finishing the input of the message, the user of the portable terminal 8E touches a box indicating the completion of the input and displayed on the touch panel section 87b. The control section 84 determines whether the user has touched the box displayed on the touch panel section 87b, thereby determining whether the input has been finished (step S89). Until the control section 84 determines in the step S89 that the input has been finished, it repeats the steps S88 and S89. When the control section 84 determines in the step S89 that the input has been finished, it causes the transmission data buffer 97 to store the message input in the step S88 (step S90).

Following the above, an image for designating the file to be attached is displayed on the display section 87a. This image is a list of all files stored in the data memory DDR. The user of the portable terminal 8E selects the file to be attached from the list, and touches the corresponding part of the touch panel section 87b, thereby designating the file to be attached (step S91). In step S92, the control section 84 determines whether the file to be attached has been designated in the step S91. Until the control section 84 determines in the step S92 that the file to be attached has been designated, it repeats the steps S91 and S92. When the control section 84 determines in the step S92 that the file to be attached has been designated, it selects the code data according to the extension assigned to the file. When the extension is "TXT", for example, the file is document data, and accordingly the control section 84 selects the code data "] ] 0 2". Then, the control section 84 causes the transmission data buffer 97 to store the selected code data (step S93). Further, the control section 84 causes the transmission buffer 97 to store the file to be attached, the filename and the data size of the file. Moreover, the control section 84 reads out the access number (1) from the ID-ROM 90, and causes the transmission data buffer 97 to store the read-out access number (1) (step S94).

Next the control section 84 causes the display section 87a to display an image indicating that the portable terminal 8E is ready to output the access number (1) representing the same access number as that shown in FIG. 51 (step S95). In this state, the controls section 84 detects whether the execution of the output of the access number (1) has been determined, in other words, whether the user has touched that part of the display panel section 87b which displays "Y" with the pen, in response to the question "EXECUTION?" (step S96). When the control section 84 detects in the step S96 that the execution of the output of the access number (1) has not been determined, it repeats the steps S95 and S96. When the control section 84 detects in the step S96 that the execution of the output of the access number (1) has been determined, it makes the access number (1) output from the portable terminal 8E so that the portable terminal 8E is line-connected to the server 142 of the office 14 via the modem 9 and the ISDN 12 (step S97). When the control section 84 detects the line connection, it goes to step S98.

In the step S98, the control section 84 causes the display section 87a to display an image indicating that the portable terminal 8E is ready to output the subsequent data, i.e., the message, the code data, the access number (2), the file to be attached, the filename and the data size. In this state, the control section 84 detects whether the execution of the output of the subsequent data has been determined, in other words, whether the user has touched that part of the touch panel section 87b which displays "Y" with the pen, in response to the question "EXECUTION?" (step S99). When the control section 84 detects in the step S99 that the execution of the output of the subsequent data has not been determined, it repeats the steps S98 and S99. When the control section 84 detects in the step S99 that the execution of the output of the subsequent data has been determined, it causes the transmission data buffer 97 to sequentially output the subsequent data stored therein to the server 142 of office 14 through the interface 98, the modem 9 and the ISDN. 12 (step S100). Consequently, the subsequent data is uploaded to the database 143 of the office 14, and the message, the file name, the data size and the attached file are stored in the database 143 in accordance with the access number (2) and the code data.

In the communication system of the second embodiment, as described above, data such as a message specifying what data has been stored in the database 143 is transmitted from the server 142 of the office 14 to the portable terminals 8A to 8F through utilization of the paging system. Therefore, before downloading the stored data file, the users (staff members) of the portable terminals 8A to 8F can confirm, for example, the attribute and size of the stored data. This prevents the occurrence of the problem that the user of a portable terminal downloads the stored data from the database, but cannot store the downloaded data in a memory of the portable terminal due to the shortage of the remaining memory capacity.

Similarly in the case of downloading the data stored in the database 143 to the portable terminals 8a to 8F, the portable terminals 8A to 8F are line-connected to the server 142 of the office 14 and the stored data is downloaded, simply by executing the following while viewing an image displayed on the display section 87a:

(1) designating the download of the data by operating the touch panel 87b;

(2) outputting the access number (1) by operating the touch panel 87b; and (3) outputting the subsequent data by operating the touch panel 87b.

Thus, the data stored in the database 143 can be downloaded by simple operations to the portable terminals 8A to 8F. It is also possible to upload the data to be stored in the database 143 from the portable terminals 8A to 8F. This enables data to be exchanged between the portable terminals 8A to 8F.

In this embodiment, the ROM 91 includes the display control program memory DM11, the display control program memory DM12, the character generator CG and the program memory PM. However, the ROM 91 may further include another memory, and (application) programs and data other than those stored in the memory DM11, the memory DM12, the character generator CG and the program memory PM may be stored in the aforementioned another memory.

Figure 55:
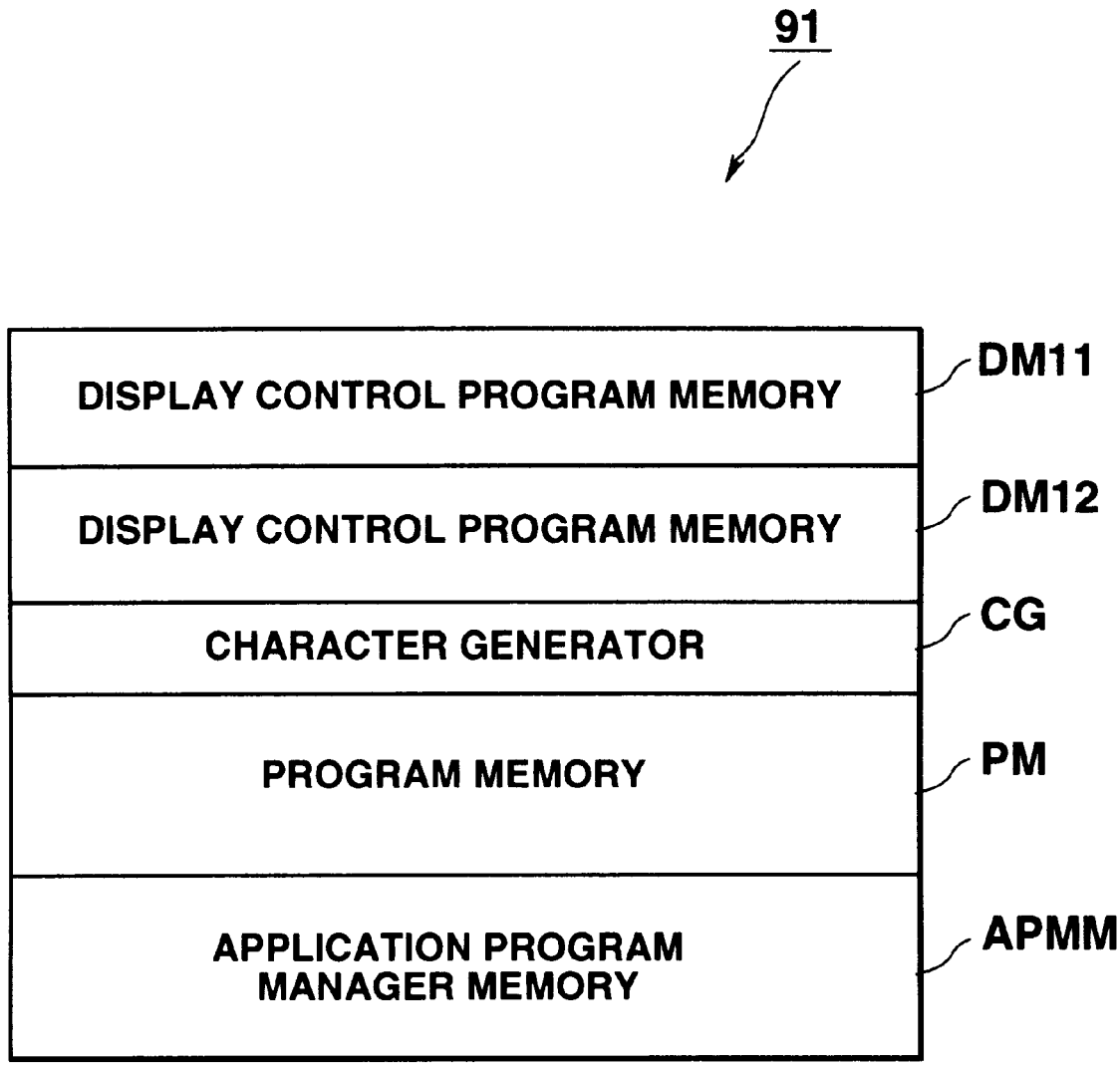
FIG. 55 is a diagram showing the storage contents of the ROM 91 when provided with an application program manager memory.

FIG. 55 is a diagram showing the storage contents of the ROM 91 when provided with an application program manager memory APMM as a modification of the second embodiment. Based on the code data affixed to the message data and indicating the data file attribute and/or the extension assigned to the name of a file, an application program manager stored in the application program manager memory APMM determines whether the portable terminals 8A to 8F store any application program for running the file. When the application manager memory APMM determines that the portable terminals 8A to 8F do not store such an application program, the display section 87a displays an message or image in which the part "DO YOU WANT TO DOWNLOAD? Y/N" illustrated in FIG. 44 has been changed to "NO APPLICATION PROGRAM FOR RUNNING FILE". This prevents the remaining memory capacity from being consumed by unnecessary data.

Figure 56:
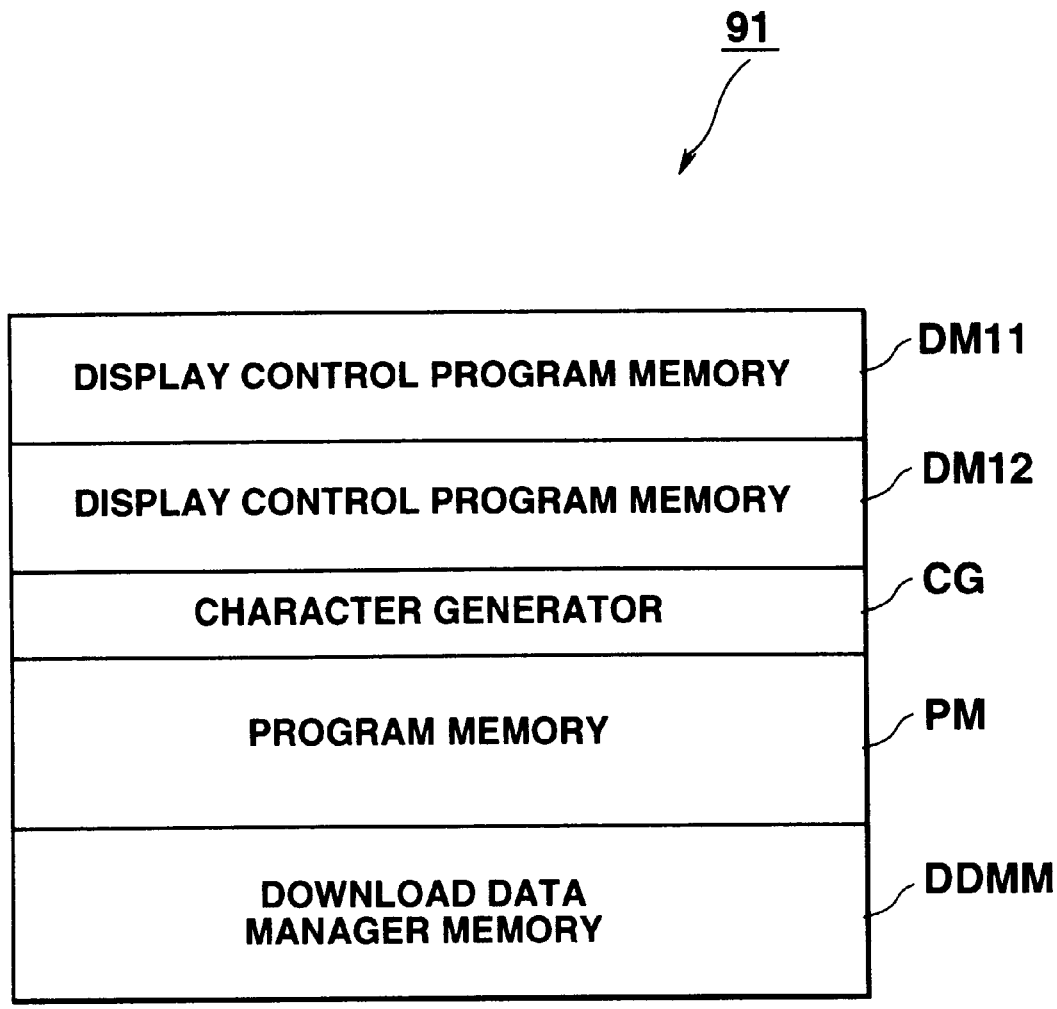
FIG. 56 is a diagram showing the storage contents of the ROM 91 when provided with a download data manager memory.

FIG. 56 is a diagram showing the storage contents of the ROM 91 when provided with a download data manager memory DDMM as another modification of the second embodiment. A download data manager stored in the download data manager memory DDMM compares the data size affixed as data to the message data with the remaining capacity of the data memory DDR of the RAM 92. As a result of the comparison, when the remaining capacity of the data memory DDR is not sufficient to store data having the above data size, the display control section 87a displays a message or image in which the part "DO YOU WANT TO DOWNLOAD? Y/N" illustrated in FIG. 44 has been changed to "REMAINING MEMORY CAPACITY IS NOT SUFFICIENT". This permits the users of the portable terminals 8A to 8F to download the data after deleting any unnecessary file. In the case where the portable terminals 8A to 8F satisfy all conditions which enable a file corresponding to the message data to be downloaded, i.e., the conditions that the remaining capacity of the data memory DDR is satisfactory and that the portable terminals 8A to 8F store an application program for running the file, the file can be downloaded without waiting for the users to confirm whether to download the file.

In the portable terminals 8A to 8F of the second embodiment, as well as in the case of the pager 6 of the first embodiment, the reception control flags can be stored in association with the code data desired by the users, and only message data showing that data from any specific portable terminal has been stored in the database 143 may be displayed on the display section 87a. FIG. 57 exemplifies the storage contents of the display control program memory DM12 when used in that case. In the program memory DM12 shown in FIG. 57, the code data "] ] 0 1" to "] ] 0 5" are stored in the "code data" column, while the flags "1", "0", "0", "1" and "0" are stored in the "reception control flag" column. In this case, only when the database 143 stores the code data "] ] 0 1" and "] ] 0 4" which correspond respectively to sound data and still image data and whose associated reception control flags have been set at "1", the message data is displayed on the display section 87a.

In the second embodiment, the portable terminals 8A to 8F have the functions of pagers, and information concerning the data stored in the database is transmitted using those functions. However, the portable terminals may not have the functions of pagers. Even in this case, the information concerning the data stored in the database can be transmitted to pagers of the staff members who use a PC and/or a portable terminal which do not have the functions of pagers Moreover, according to the second embodiment, when a new data file is stored in the database 143, the server 142 transmits ID information together with a simple message to any portable terminal designated by subaddress data, thus asking for an instruction concerning the download of the data stored in the database 143. However, the operation of the server 142 is not limited to the above, and when the server 142 detects the occurrence of processing like the deleting or copying of a data file, it may select a subaddress from its own tables, and may inform any portable terminal designated by the subaddress about the occurrence of such processing.

Furthermore, according to the first and second embodiments, ID information such as a subaddress, code data, etc. is transmitted utilizing the paging system. However, the first and second embodiments are not limited thereto, and the ID information can be transmitted utilizing a control channel employed in a PCS system and used to establish a line connection.

What is claimed is:

1. A database system comprising:
   a database for storing data items;
   management means, connected to said database and to a communication line network, for managing said database; and at least one communication terminal to be connected to said communication line network;
   said management means comprising:
      means for causing said database to store pieces of ID information identifying the data items in association with the data items, and
      transmission means for transmitting one of said pieces of ID information stored in said database to said at least one communication terminal through a radio communication line without a request from said at least one communication terminal; and
   said communication terminal comprising:
      reception means for receiving said one piece of ID information transmitted from said transmission means, and
      control means, which links up with said management means in accordance with said one piece of ID information received by said reception means, for controlling said database so as to output, of the data items stored therein, one data item corresponding to said one piece of ID information.

2. The database system according to claim 1, wherein said management means further comprises:
   detection means for detecting storage times at which said data items have been stored in said database,
   means for causing said database to store the storage times detected by said detection means, in association with said pieces of ID information, and
   first transmission control means for controlling said transmission means so as to transmit, of the storage times stored in said database, one storage time corresponding to said one piece of ID information to said at least one communication terminal, together with said one piece of ID information.

3. The database system according to claim 1, wherein said management system further comprises:
   size detection means for detecting sizes of the data items stored in said database, and
   second transmission control means for controlling said transmission means so as to transmit of the sizes detected by said size detection means, one size corresponding to said one piece of ID information to said at least one communication terminal, together with said one piece of ID information.

4. The database system according to claim 1, wherein said at least one communication terminal further comprises first storage means for storing said one data item corresponding to said one piece of ID information and output from said database.

5. The database system according to claim 4, wherein:
   said management means further comprises:
      size detection means for detecting sizes of the data items stored in said database, and
      second transmission control means for controlling said transmission means so as to transmit, of the sizes detected by said size detection means, one size corresponding to said one piece of ID information to said at least one communication terminal, together with said one piece of ID information; and
   said at least one communication terminal further comprises:
      measurement means for measuring a remaining capacity of said first storage means,
      comparison means for comparing the size received together with said one piece of ID information by said reception means, and the remaining capacity measured by said measurement means, and
      first inhibition means for inhibiting said control means from causing said database to output said one data item corresponding to said one piece of ID information.

6. The database system according to claim 4, wherein:
   said management means further comprises:
      means for causing said database to store pieces of attribute information specifying the attributes of the data items, in association with said pieces of ID information, and
      third transmission control means for controlling said transmission means so as to transmit, of said pieces of attribute information, one piece of attribute information corresponding to said one piece of ID information; and
   said at least one communication terminal further comprises:
      second storage means for storing a data processing program together with attributes of data which can be processed using said data processing program,
      third storage means for storing said one piece of attribute information corresponding to said one piece of ID information and received together with said one piece of ID information by said reception means,
      determination means for reading out, from said third storage means, said one piece of attribute information received by said reception means, and for determining whether the data item corresponding to said one piece of ID information can be processed using the data processing program stored in said second storage means, based on said read-out one piece of attribute information, and second inhibition means for inhibiting said control means from causing said database to output the data item corresponding to said one piece of ID information when said determination means determines that the data item corresponding to said one piece of ID information cannot be processed using the data processing program.

7. The database system according to claim 1, wherein said management system further comprises fourth transmission control means for controlling said transmission means so as to transmit said one piece of ID information simultaneously to a group which includes said at least one communication terminal.

8. The database system according to claim 1, wherein said at least one communication terminal further comprises fourth storage means for storing, in association with said pieces of ID information, pieces of reception control information for controlling said reception means.

9. The database system according to claim 1, wherein said at least one communication terminal further comprises:
   display means for displaying information,
   fifth storage means for storing pieces of display control information in association with pieces of ID information which are substantially same as said pieces of information stored in said database, and
   display control means for reading out, of said pieces of display control information stored in said fifth storage means, one piece of display control information corresponding to said one piece of ID information received by said reception means, and for controlling said display means.

10. The database system according to claim 1, wherein said at least one communication terminal further comprises:
   alert means for alerting the user of said communication terminal when said reception means receives said one piece of ID information,
   sixth storage means for storing pieces of alert control information in association with pieces of ID information which are substantially same as said pieces of information stored in said database, and
   alert control means for reading out, of said pieces of alert control information stored in said sixth storage means, one piece of alert control information corresponding to said one piece of ID information received by said reception means, and for controlling said alert means.

11. The database system according to claim 1, wherein said transmission means transmits the one piece of ID information at predetermined intervals.

12. A data management system for managing a database storing data items and connected to a communication line network to which at least one terminal is connected, said data management system comprising:
   means for causing said database to store pieces of ID information identifying said data items, in association with the data items,
   transmission means for transmitting one of said pieces of ID information stored in said database to said at least one terminal through said communication line network without a request from said at least one terminal,
   reception means for receiving said one piece of ID information transmitted from said at least one terminal through said communication line network, and
   transmission means for transmitting, of said data items stored in said database, one data item corresponding to said one piece of ID information received by said reception means to said at least one terminal from which said one piece of ID information is transmitted.

13. The data management system according to claim 12, further comprising:
   detection means for detecting storage times at which said data items have been stored in said database;
   means for causing said database to store the storage times detected by said detection means, in association with said pieces of ID information; and
   first transmission control means for controlling said transmission means so as to transmit, of the storage times stored in said database, one storage time corresponding to said one piece of ID information to said at least one terminal, together with said one piece of ID information.

14. The data management system according to claim 12, further comprising:
   size detection means for detecting sizes of the data items stored in said database; and
   second transmission control means for controlling said transmission means so as to transmit, of the sizes detected by said size detection means, one size corresponding to said one piece of ID information to said at least one terminal, together with said one piece of ID information.

15. The data management system according to claim 12, further comprising:
   third control means for controlling said transmission means so as to transmit said one piece of ID information simultaneously to a group which consists of said at least one terminal.

16. The data management system according to claim 12, wherein said transmission means for transmitting one of said pieces of ID information transmits the one piece of ID information at predetermined intervals.

17. A communication terminal, connected to a database through a communication line, for extracting a desired one of data items from said database, said communication terminal comprising:
   reception means for receiving pieces of ID information transmitted by radio, each of said pieces of ID information identifying one of the data items stored in said database, and
   extraction means, which links up with said database in accordance with desired one of said pieces of ID information received by said reception means, for extracting a data item identified by said desired one of pieces of ID information from said database.

18. The communication terminal according to claim 17, further comprising:
   first storage means for storing the data item extracted from said database by said extraction means.

19. The communication terminal according to claim 18, further comprising:
   measurement means for measuring a remaining capacity of said first storage means;
   detection means for detecting a size of a desired data item identified by one of said pieces of ID information received by said reception means;
   comparison means for comparing the size detected by said detection means with the remaining capacity measured by said measurement means; and
   first inhibition means for inhibiting said extraction means from extracting the data item when the size is greater than the remaining capacity as a result of the comparison performed by said comparison means.

20. The communication terminal according to claim 18, further comprising:

second storage means for storing a data processing program together with attributes of data which can be processed using said data processing program;

third storage means for storing pieces of attribute information in association with said pieces of ID information, each of said pieces of attribute information specifying an attribute of one of said data items identified by said pieces of ID information;

determination means for reading out, from said third storage means, one of said pieces of attribute information received by said reception means, and for determining whether the data item corresponding to said one piece of attribute information can be processed using the program stored in said second storage means; and second inhibition means for inhibiting said extraction means from extracting the data item when said determination means determines that the data item corresponding to said one piece of attribute information cannot be processed using the data processing program stored in said second storage means.

21. The communication terminal according to claim 17, further comprising:

fourth storage means for storing, in association with said pieces of ID information, pieces of reception control information for controlling said reception means.

22. The communication terminal according to claim 17, further comprising:

display means for displaying information;

fifth storage means for storing pieces of display control information in association with pieces of ID information which are substantially same as said pieces of information received by said reception means; and display control means for reading out said pieces of display control information from said fifth storage means in accordance with said pieces of ID information received by said reception means, and for controlling said display means.

23. The communication terminal according to claim 17, further comprising:

alert means for alerting the user of said at least one communication terminal when said reception means receives said pieces of ID information;

sixth storage means for storing pieces of alert control information in association with pieces of ID information which are substantially same as said pieces of information received by said reception means; and alert control means for reading out said pieces of alert control information from said sixth storage means in accordance with said pieces of ID information received by said reception means, and for controlling said alert means.

24. The communication terminal according to claim 17, further comprising:

seventh storage means for storing, in association with each other, said pieces of ID information and pieces of link information to establish links with said database.

25. A method for obtaining desired information from a system including a database and connected to a communication line network to which at least one terminal is to be connected, said method comprising:

a transmitting step of transmitting pieces of ID information, identifying data items stored in said database, to said at least one terminal through said communication line network without a request from said at least one terminal;

a receiving step of receiving said pieces of ID information transmitted in said transmitting step;

a selecting step of selecting one of said pieces of ID information received in said receiving step;

an accessing step of accessing said database in accordance with said selected piece of ID information selected in said selecting step; and a data obtaining step of obtaining the data item identified by said selected piece of ID information from said database; wherein said receiving step, said accessing step and said obtaining step are performed on the part of said at least one terminal.

26. The method according to claim 25, wherein said transmitting step of transmitting pieces of ID information is executed at predetermined intervals.

* * * * *